(12) United States Patent
Wu

(10) Patent No.: US 8,548,997 B1
(45) Date of Patent: Oct. 1, 2013

(54) DISCOVERY INFORMATION MANAGEMENT SYSTEM

(76) Inventor: Jianqing Wu, Beltsville, MD (US)

(*) Notice: Subject to any disclaimer, the term of this patent is extended or adjusted under 35 U.S.C. 154(b) by 839 days.

(21) Appl. No.: 12/420,817

(22) Filed: Apr. 8, 2009

(51) Int. Cl.
    *G06F 17/30* (2006.01)

(52) U.S. Cl.
    USPC ............................................ 707/736; 709/218

(58) Field of Classification Search
    USPC ................ 707/736, 740; 705/7, 9; 709/223, 709/218
    See application file for complete search history.

(56) References Cited

U.S. PATENT DOCUMENTS

| | | | |
|---|---|---|---|
| 7,506,040 B1* | 3/2009 | Rabe et al. | 709/223 |
| 8,285,578 B2* | 10/2012 | Sheppard | 705/7.13 |
| 8,291,477 B2* | 10/2012 | Lunt | 726/4 |
| 8,316,128 B2* | 11/2012 | Beck et al. | 709/226 |
| 8,380,630 B2* | 2/2013 | Felsher | 705/50 |
| 2002/0029255 A1* | 3/2002 | Glynias et al. | 709/218 |
| 2003/0135565 A1* | 7/2003 | Estrada | 709/206 |
| 2005/0038687 A1* | 2/2005 | Galdes | 705/9 |
| 2006/0178917 A1* | 8/2006 | Merriam et al. | 705/7 |
| 2007/0038494 A1* | 2/2007 | Kreitzberg et al. | 705/8 |
| 2010/0070448 A1* | 3/2010 | Omoigui | 706/47 |
| 2012/0191716 A1* | 7/2012 | Omoigui | 707/740 |
| 2012/0215816 A1* | 8/2012 | Kidron | 707/803 |
| 2012/0254053 A1* | 10/2012 | Joa et al. | 705/319 |
| 2012/0300758 A1* | 11/2012 | Turunen et al. | 370/338 |
| 2012/0311665 A1* | 12/2012 | Lim | 726/1 |

* cited by examiner

*Primary Examiner* — Jean M Corrielus
(74) *Attorney, Agent, or Firm* — Jianqing Wu

(57) ABSTRACT

A discovery information management system, which can be easily configured, instantly reset, and run by project managers, is disclosed for use in discovery processes. The system allows users to post information on a discussion board, exchange email between members, add information to plural configurable database tables, validate information in different routes by different methods, move information between tables, share real-time information by using local search method, project-wide search method, and interactive data retrieving tools. The system also allows the users to process information by using interactive server pads, investigative identity data search algorithm, identity data processing algorithm, configurable interactive data entry tool, and phrase construction tool.

44 Claims, 35 Drawing Sheets

| Assign Project Manager | View Project Managers | Project Discussion Board | E-mail | Log out |
|---|---|---|---|---|

| Project Code | Project Full Name | Project Manager | Password | E-mail | Actions |
|---|---|---|---|---|---|
| glg | Corporate Litigation Site | g-admin2 | 222222 | manager@test.com | View Modify Delete |
| mdg | My discussion Group | g-admin1 | 111111 | gbp@test.com | View Modify Delete |

FIG. 3A

| Assign Project Manager | View Project Managers | Project Discussion Board | E-mail | Log out |
|---|---|---|---|---|

| Project Manager | Project Code | Project Full Name | |
|---|---|---|---|
| g-admin1 | mdg | My Discussion Group | Open View  Conventional View |
| g-admin2 | glg | Corporate Litigation Site | Open View  Conventional View |

FIG. 3B

| Assign Project Manager | View Project Manager | Assign Project Manager | Discussion Board | E-mail | Log out |

Assign Project Manager

Login name [          ] (1-20 letters)
Password [          ] (6-20 letters)
Confirm Password [          ]
Email Address (opt) [          ]

[Submit]

FIG. 3C

Change Manager Account

*E-mail [manager@test.com]
Prefix [          ]
*Your Initials [MAN] (2-3 letters in upper case))
*First Name [Leader]
MI [          ]
*Last Name [Clinton]
Title [          ]
Address [          ]
City [          ]
State [Select a State ▼]
Zip Code [          ]
Company Name [          ]
Country [USA]

Phone [(   )    -    ]

[Submit]

FIG. 4A

View Project Members

| Member No. | Member | Password | E-mail | | | |
|---|---|---|---|---|---|---|
| 4 | 2person1 | 2person1 | gbp@test.com | View | Modify | Delete |
| 5 | 2person2 | 2person2 | | View | Modify | Delete |
| 6 | 2person3 | 2person3 | | View | Modify | Delete |

Assign Project Members

Assign members' login name and password:

Login Name [          ] (1-20 letters)
Password [          ] (6-20 letters)

[Submit] — 205

---

Add Login names and passwords for plural members:

You may upload a text file (e.g. yourfilename. txt ) containing name-password pairs (e.g., johnsmith10, pass8759; jonstone, pass7658 ) where the name-password pairs are delimited by a carriage return or semicolon.

[                                    ] [Browse]

[Submit] — 206

FIG. 4E

Manage Project Shared Account

Group login account was modified successfully!

Shared Login Name [myglg] (1-20 letters)
Shared Password [111111] (6-20 letters)

[Submit]

FIG. 4F

Export Project

It allows you to export project data in different formats.

Please choose export file format:

○ Human friendly zip file   ◉ Database zip file

Please select tables to export:

[Export the whole project]

- [X] Group Info
- [X] Discussion
- [X] Email
- [X] Owner Pad
- [X] Member Pads
- [X] Notes
- [X] Transaction Table
- [X] Attorney Names Table
- [X] Acronym

[Export]

FIG. 4G

Import a Project Zip

Please choose your Import method

○ Replace all existing tables and data by the tables and data from imported file.
◉ Import selected tables from your project file.

Plaease select tables to import: [Select All] — 207

- [ ] Group Info
- [ ] Discussion
- [ ] Email
- [ ] Owner Pad
- [ ] Members Pad
- [ ] Notes
- [ ] Transaction Table
- [ ] Attorney Name Table
- [ ] Acronym Please Choose your importing method: — 208

◉ Import table structure and data.
○ Replace existing data in the tables by imported data.
○ Update data in the tables (Keep all existing data).

Please Select your project zip file — 209

[_____] [Browse]

[Import]

FIG. 4H

Reset Configuration By File

Please choose your option to configure your project setups:
- ○ Restore all project settings to system's default
- ○ Delete all data from all tables (including email and discussion board).
- ● Reset selected tables by configuration file.

[Select All]
- ☐ Notes
- ☐ Transaction Table
- ☐ Attorney Name Table
- ☐ Acronym

[_____] [Browse]

Other Requirement (Option):
- ☐ Delete tables, if selected tables do not match the configuration file.
- ☐ Create new tables, if select tables do not match the configuration file.

○ Reset all tables by configuration file (delete all data).

[Configuration]

FIG. 4I

| Table | Set up Tables and Boards | | | |
|---|---|---|---|---|
| Notes | Data Entry | Modify Table | Delete Table & Backup Data | Advanced Setup |
| Transaction Table | Data Entry | Modify Table | Delete Table & Backup Data | Advanced Setup |
| Attorney Names Table | Data Entry | Modify Table | Delete Table & Backup Data | Advanced Setup |
| Production | Data Entry | Modify Table | Delete Table & Backup Data | Advanced Setup |
| Table1 | Setup | | | |
| Table2 | Setup | | | |
| Pad | Modify | | | |

Set Up More Table

FIG. 5

Create Table or Board

* Board Navigation [Attorney Name]  (Fewer than 15 letters)
Table Name [Name]  (Fewer than 20 letters)

[Insert entry]  [Delete entry]

Col 1 Field [First_Name]  Type [VARCHAR ▼]  Length [30]  Not NULL ☐  Unique ☐

Col 2 Field [Last_Name]  Type [VARCHAR ▼]  Length [30]  Not NULL ☐  Unique ☐

Col 3 Field [Firm]  Type [VARCHAR ▼]  Length [100]  Not NULL ☐  Unique ☐

Col 4 Field [Notes]  Type [VARCHAR ▼]  Length [200]  Not NULL ☐  Unique ☐

[Submit]

FIG. 6A

Back to Summary Page

Modify Table for Name

| | Field | Type | Null | Unique |
|---|---|---|---|---|
| ☐ | First_Name | VARCHAR(30) | Yes | No |
| ☐ | Last_Name | VARCHAR(30) | Yes | No |
| ☐ | Firm | VARCHAR(100) | Yes | No |
| ☐ | Notes | VARCHAR(200) | Yes | No |

[Delete] [Add] [Modify]

FIG. 6B

Modify Columns for Name

Field [Last_Name]  Type [VARCHAR ▼]  Length [30]  Not NULL ☐  Unique ☐

[Submit]

FIG. 6C

Change Navigation Name, Table Name, Access Rule, Validation Route and Method Setup for Table: Transaction

| | | |
|---|---|---|
| Navigation Name | Transaction | (Fewer than 15 letters) |
| | Transaction_table | (Fewer than 20 letters) |
| Data validation Page | Via Combined Table ▼ | |
| Data Validation Method | Validation by Vote ▼ | |
| Votes | 3 | |
| Data Access Rule | Private Edit ▼ | |

[Change]

FIG. 6D

Name Search | Full Screen | Email | Set up Project | Set up Tables | Log out

My Discussion Group

Date: 4/3/2009
Manager: Manager Lastname

| Global Search | | | | | | | | | | | | | |
|---|---|---|---|---|---|---|---|---|---|---|---|---|---|
| Transaction | Attorneys | Acronym | Table1 | Table2 | Discussion | Pad | Instructions | | | | | | |
| | Validated Table | Combined Table | Tentative Table | Edit table | | | | | | | | | |

Attorney Name Table

← 210

↓ 211  Search

| Notes | No. | Email | First Name | MI | Last Name | Company | Date | Type | Comments | Entry date | Confirm date | App | Initials |
|---|---|---|---|---|---|---|---|---|---|---|---|---|---|
| ☐ | 1222 | test9999@test.com | Jack | | Smith | New Law Firm, LLP | 01/20/20081 | | This is for test. | 04/03/2009 12:10:25 | 04/03/2009 12:32:07 | VOTE | TST |
| ☐ | 1223 | test99991@test.com | Lisa | | Cars | Law House, LLP | 01/20/20080 | | This is another test,OK | 04/03/2009 12:15:10 | 04/03/2009 12:32:07 | VOTE-R | TST |
| ☐ | 12 | | | | | Large & Small PC | 11/01/20082 | | Test | 03/03/2009 08:44:52 | 03/03/2009 10:29:50 | MG | null |
| ☐ | 12 | | | | | Large & Small PC | 11/01/20082 | | Test | 03/03/2009 08:44:52 | 03/03/2009 10:29:50 | MG | null |
| ☐ | 1218 | test1218@test.com | Scott | | Foster | Large & Small PC | 11/01/20082 | | Test | 03/03/2009 08:44:52 | 03/03/2009 10:29:50 | MG | null |

Current Votes: 3

| User ID | Initials | Vote Date |
|---|---|---|
| 6 | TSF | 04-03-2009 12:32:07 |
| 5 | TST2 | 04-03-2009 12:29:18 |
| 4 | TST1 | 04-03-2009 12:21:05 |

↑ 213

↑ 212

[Enter] [Delete] [Edit] ← 214
Page 1 of 2 | Go to Page: [1] [Go] | Records Per Page: [5] [▼] Next Last ← 215

FIG. 7A

Name Search | Full Screen | Email | Set up Project | Set up Tables | Log out

My Discussion Group

Date: 3/3/2009
Manager: Manager Lastname

| Global Search | | | | | | | |
|---|---|---|---|---|---|---|---|
| Notes | Transaction | Attorneys | Acronym | Table1 | Table2 | Discussion | Pad | Instructions |

Validated Table  Combined Table  Tentative  Edit table

Attorney Name Table

On  [       ]  Search

| | No. | Email | First Name | MI | Last Name | Company | Date | Type | Comments | Entry_date | Initials |
|---|---|---|---|---|---|---|---|---|---|---|---|
| ☐ | 1170 | test1170@test.com | Jack | | Jones | Snow and Ice PC | 11/01/2008 | 2 | test | 03/03/2009 08:44:52 | null |
| ☐ | 1161 | test1161@test.com | Jennifer | | Jones | Snow and Ice PC | 11/01/2008 | 2 | test | 03/03/2009 08:44:52 | null |
| ☐ | 76 | Currant Votes: 1 | | | | East & West LLP | 12/01/2008 | 3 | company | 03/03/2009 08:44:52 | null |
| ☐ | 64 | User ID | Initials | Vote Date | | Get Cash & Stone LLC | 12/13/2008 | 3 | Data for test use only | 03/03/2009 08:44:52 | null |
| | | 3 | TST | 2009-03-03 14:28:43 | | | | | | | |

[Enter]  [Delete]  [Validate]  [Vote]  [Revoke]

FIG. 7B

| | Send Message | Sent Messages | Received Messages | |
|---|---|---|---|---|
| | | Sent Messages | | |
| ☐ Recipient | | Subject | Files | Sent Date |
| ☐ Second Lastname | | Project progress | 0 | 03-03-2009 |
| ☐ Manager Lastname | | Project progress | 0 | 03-03-2009 |
| ☐ Second Lastname | | Work hours | 1 | 03-03-2009 |
| | | [ Delete ] | | |

FIG. 7C

Send Message    Sent Messages    Received Messages

Send Message

Sender: Manager Lastname
Recepinent: [Second Lastname ▼]
Subject : [Work hours]

Message: I have attached the contact for your convenience. You are allowed to work From 50 to 100 hours per week.

Attachment: Add more file path
(accept pdf, jpg, txt, doc, ...file extensions/formats)

[/root/testfiles/contract.doc] [Browse...] Remove filepath

[ Submit ]

FIG. 7D

Change Personal Account

Change Password

Private Account Information Was Modified successively!

| Field | Value | |
|---|---|---|
| *E-mail | manager@test.com | |
| Prefix | | |
| *Your Initials | MAN | (2-3 letters in upper case)) |
| *First Name | Leader | |
| MI | | |
| *Last Name | Clinton | |
| Title | | |
| Address | | |
| City | | |
| State | Select a State ▼ | |
| Zip Code | | |
| Company Name | | |
| Country | USA | |
| Phone | ( ) | |

[Submit]

FIG. 8

| Discussion Board |||
|---|---|---|
| Open View     Conventional View |||
| Subject | Date | Users |
| Server Speed | 03/03/2009 | TST1/Tester2 |
| Server speed | 03/03/2009 | TST |
| New Law Firm | 03/03/2009 | TST2 |
| 216 →    Submit Message   Search Message |||

FIG. 9A

| Open View     Conventional View |
|---|
| ◉ Server speed |
|     Member Name: TST1/Tester2 \| Post Date: 03-03-2009 \| IP: 192.168.41.70<br>The server is really slow. Do you have any issue? |
| ◉ Server speed                          Menu.jpg |
|     Member Name: TST \| Post Date: 03-03-2009 \| IP: 192.168.41.70<br>I did not have any problem now. |
| ◉ New Law Firm |
|     Member Name: TST2 \| Post Date: 03-03-2009 \| IP: 192.168.41.70<br>I have encountered a new law firm, which is not listed in our review book. This firm appears to be an international firm who worked for or against our client. Its name is Zoolet firm. Can anyone confirm this? |
|                              Submit Message    Search Messages |

FIG. 9B

| Open View | Conventional View |
|---|---|
| New Law Firm | |

Member Names: TST2 | Post Date : 03-03-2009 | IP: 192.168.41.70

I have encountered a new law firm, which is not listed in our review book. This firm appears to be an international firm who worked for or against our client. Its name is Zoolet firm. Can anyone confirm this?

217

Back to Summary Page    See Related Messages    Submit Message    Search Messages

FIG. 9C

| Open View | Conventional View |
|---|---|

Send Member Message

*Subject: Server speed
Search Keys: Server
Your Name (opt): TST
Email Address (opt):
Phone (opt): 1112223333

*Message: I have problem with the server functions

The page at http://localhost:9080 says:    [X]

If you are satisfied with your message, please press confirm
After the message is posted, you can't withdraw it..

[Cancel]    [OK]

/root/test files/menu.jpg  [Browse...]    Remove filepath
Add more file path (pdf, jpg, txt, doc etc...file extensions/formats)

[Submit]                                    Search Messages

FIG. 9D

Open View   Conventional View

Search Member Messages

Subject [Server] [Go]

---

Subject [Server]

Date ● at any time, or ○ in the period

Between [January ▼] [1 ▼] [2007 ▼] and [January ▼] [1 ▼] [2008 ▼]

Search Key [ ]
[More Search Key] [Fewer Search Key]
(You may enter as many search keys as possible, but may leave some search-key boxes blank at the end. Blank is treated as any value.)

[Search] [Reset]

Submit Message

FIG. 9E

Name Search | Full Screen | Email | Manage Account | Log out

My Discussion Group

Date: 3/3/2009    Project Code: mdg
Member: Test Lasttest

| Notes | Transaction | Attorneys | Acronym | Table1 | Table2 | Discussion | Pad | Instructions |
|---|---|---|---|---|---|---|---|---|
| | Global Search | Validated Table | Combined Table | Tentative | Edit table | | | |

Attorney Name Table

On    Search

| | No. | Email | First Name | MI | Last Name | Company | Date | Type | Comments | Entry_date | Initials |
|---|---|---|---|---|---|---|---|---|---|---|---|
| ☐ | 1170 | test1170@test.com | Jack | | Jones | Snow and Ice PC | 11/01/2008 | 2 | test | 03/03/2009 08:44:52 | |
| ☐ | 1161 | test1161@test.com | Jennifer | | Jones | Snow and Ice PC | 11/01/2008 | 2 | test | 03/03/2009 08:44:52 | |
| ☐ | 769 | test769@test.com | Mary Sidney | | Jones | East & West LLP | 12/01/2008 | 3 | company | 03/03/2009 08:44:52 | |
| ☐ | 645 | | Betty Lynne | | Jones | Get Cash & Stone LLC | 12/13/2008 | 3 | Data for test use only | 03/03/2009 08:44:52 | |

[ Enter ]   [ Delete ]   [ Vote ]   [ Revoke ]

FIG. 10A

| Validated Table | Combined Table | Tentative Table | | | | |
|---|---|---|---|---|---|---|
| | | Name | | | Search | |
| No. | First_Name | Last_Name | Firm | Notes | Entry_date | App | Initials |
| 5 | Charles | Collard | Stone & Waters LLP | Plaintiff's first firm | 08/17/2008 13:50:43 | 0 | PET |
| 2 | Lisa | Woods | Woods & Associates LLP | Do commercial papers. | 08/17/2008 13:44:09 | 0 | TST |
| 1 | John | Smith | Black & White LLP | Plaintiff Law firm | 08/17/2008 13:43:10 | 0 | TST |

Add Entry

FIG. 10B

| Validated Table | Combined Table | Tentative Table | | | | |
|---|---|---|---|---|---|---|
| | | Name | | black | Search | |
| No. | First_Name | Last_Name | Firm | Notes | Entry_date | App | Initials |
| 7 | Lisa | Green | Black&Blue LLP | NA | 08/17/2008 15:14:13 | | MAN |
| 1 | John | Smith | Black&White LLP | Plaintiff's Law firm | 08/17/2008 13:43:10 | 0 | TST |

Add Entry

Add Record To Attorney Name Table

| | | |
|---|---|---|
| Last_name | Stone | (< 20 letters) |
| First_name | Lisa | (< 20 letters) |
| Law_firm | Stone Patent Firm | (< 50 letters) |
| Comment | This is a patent firm. | (<500 letters) |

[Submit Entry] [View the Table]

FIG. 10E

Validated Table   Combined Table   Tentative Table   Edit Table

— 220          Edit Transaction Table          — 219
                                                    [Search]

| | Transaction_name | Date | Comment |
|---|---|---|---|
| C P D | Test | 2008-12-30 | This is first test data |
| C P D | | | |

Enter Record
↙ 221                     222 ⟶  Draft agreement
              223 ↘              Public Record
                                 Press Release
              [Save Changes] [Discard Changes]  Personal Communication
                                                Email

FIG. 10F

| Notes | Transaction | Attorneys | Acronym | Table1 | Table2 | Discussion | Pad | Instructions |

Normal View    Reverse View    Alphabetic View    Reverse Alphabetic View

Land    Search

Personal Pad

Shrink Font

Bureau of Land Management, U. S. Department of the Interior.

FIG. 11C

Combined Search Result

Search Key: firm    First Display: [Name ▼] 227    Order By: [Sys_record_id ▼] 228    [Go]

1. John;;Smith;;Black & White LLP;;Plaintiff's Law Firm   [Name]

3. Tom;;Fleet;;Brown & Blue LLP;;Possibly, a law firm for the Defendant   [Name]

4. Sally;;Sads;;Caleb Law Firm;;Unknown Law Firm   [Name]

5. Charles;;Collard;;Stone & Waters LLP;;Plaintiff's First firm   [Name]

6. Unknown;;Gerossiagic;;Foreign Law Firm;;More Information is needed   [Name]

2. 127.0.0.1;;08-17-2008 14:01:21;;Foreign Law Firm Foreign Firm;;This message is concerning with a foreign law firm. [Discussion Board]

5. 127.0.0.1;;08-17-2008 14:14:43;;New Foreign Law Firm II Foreign Firm;; More information about this foreign law firm. [Discussion Board]

FIG. 12A

Search Identity Data in the Name Table

Sort Names

Enter names to be found in the attorney table in the database:

```
From:  John Smith
Sent:  November 14, 2006;
To:    Dean Smith; Snoon L. Steal; Matalish, Store; Job; black;
       ABC; X. T.; X. Y. Z.; notation99@test.com;
       "uknowntwo@test.com";
       "uknownthree@test.com"; David.Bidlow@test.com;
       David.T.Seth@test.com; David Franklin
```

◉ Default Search View Setup   ○ Current Search Setup View  ↑

⟵ 235            234

[Search]

Setup for Default Identity Data Search

Delimiter for Separating Names:

○ Comma    ◉ Semicolon    ○ Carriage Return

Mark words    [From; To;]       (Separated by Semicolon)
Ignored words [         ]       (Separated by Semicolon)

Marks for Ignored Ranges: Add a Range  Remove a Range

[Sent]        [         ]

Match Methods:

☐ Basic and reliable matches set by system

☐ Match both names, email address or acronyms (FD & C in firm/comment)
☐ Match initial & last names (J. Smith to Jon Smith; Ted Smith to T. Smith)
☐ Match keyed initials with full names (J.S. with Jon Smith or John Stone)
☐ Find derived initials in comments (for J.S. or Jo Shy, find j.s., J.M.S., JMS.)
☐ Regard small key (jo, job) as initials and find it in names & comments
☐ Match single key with first & last name (jack with Jack Smith or John Jack)
☐ Match single key with a word in firm names (black with White & Black)
☐ Match last name only (for Jo Smith, find Ted Smith and Jack Smith)
☐ Match first name only (for Jo Smith, find Woods and Jo Black)

Show Type:

☒ Law firm    ☐ Client    ☐ Partner    ☐ Other Parties

Order By:

○ Name->Firm->Email    ○ Email->Name->Firm    ○ Firm->Name->Email
○ Name->Email->Firm    ○ Email->Firm->Name    ○ Firm->Email->Name

[Save]  [Cancel]  [Revert to Common Mode]

FIG. 13B

Names not found

| Identity Data Search Results |||||||
|---|---|---|---|---|---|---|
| 236 | | 237 | | Ordered by | Name->firm->Email | |
| Source || Found Identity Data Entries |||||
| Name | Field | No | Name | Firm | Data | Comments | Email |
| John Smith | From | 1 | Fleming | Stone LLP | 11-10-08 | JS is a worker in this company. | Test3@test.com |
| Dean Smith | To | 1 | Smith, Dean | Greens, PC | 11-01-08 | For test use | Test1122@test.com |
| David Franklin <df123456@test.com> | To | 15 | Farrell, Jack | Duncans & Woods,LLP | 11-01-08 | His boss Is d.f. | Test932@test.com |
| | | | Franklin, David | Franklin & Black | 11-01-08 | For test use | Test981@test.com |
| "Dave Farr" <david.far@test.com> | To | 16 | Farrell, Jack | Duncans & Woods, LLP | 11-01-08 | His boss Is d.f. | Test932@test.com |
| ABC | To | 6 | Anderson Charlotte | Johnson Law, LLC | 11-10-08 | Data for test use only | 238 |
| | | | Vinson, Kristina | Part of ABC firm | 11-01-08 | For test purpose | Test1202@test.com |
| X.Y.Z. | To | 8 | Bumpus, Laura | Snow & Ice PC | 11-01-08 | She is married to X.Y.Z. | Test1126@test.com |
| | | | Zedon, Xerron | Private Firm | 11-01-08 | test | Test1198@test.com |

FIG. 13C

| Identity Data Search Results — 239 ||||
|---|---|---|---|
| Show names not matched | Hide names not matched | Show matched names | Hide matched names |
| Field | No | Identity Data Not Found ||
| To | 2 | Snoon L. Steal ||
| | 3 | Matalish, Store ||
| | 4 | Job ||
| | 5 | black ||
| | 6 | ABC ||
| | 7 | X.T ||
| | 8 | X.Y.Z. ||
| | 9 | notation99@test.com ||
| | 10 | "uknowntwo@test.com" ||
| | 11 | "uknownthree@test.com" ||
| | 12 | David.Biglow@test.com ||
| | 13 | David.T.Seth@test.com ||
| | 14 | Sneal,David@test.com ||
| | 17 | "Dulles,Steven M."<dulles.steven@test.com> ||
| | 18 | "Darlene Homes" "specialchars@test.com" ||
| | 19 | "Darlene Homes"<notknown@test.com> ||
| | 20 | "Dolly Dole"<notknown@test.com>[mailto:notknown@test.com] ||

FIG. 13D

Setup for Current Search and Processing

○ Current Setup  Hide

Name delimiter:
　　○ Comma　　● Semicolon　○ Carriage Return
Names in Group A grouped by more than:　[ 2 ]　Carriage returns
　　Mark words　　[ From; To; ]　(Separated by Semicolon)
　　End words　　　[ null ]　　　(Separated by Semicolon)
　　Ignored words　[　　　　 ]　(Separated by Semicolon)

Marks for Ignored Ranges: More Range  Less Range
　　[ Sent ]　　　　　　[　　　　 ]

Match Methods:

☐ Basic and reliable matches set by system

☒ Names, email & acrynom　☒ Initials & last names　☒ Find initials in comments

☐ Match inputted initials with full names　☐ Search single key in firms

☐ Find inputted singles key in first names and last names

☐ Find small initials (job)　☐ Last name only　☐ First name only

Search Scope:

☒ Law firm　☐ Client　☐ Partner　☐ Other Parties

Allowed Duplicates:

○ Delete from group A all the names that exit in group B.

● Allow duplicate names between the two groups.

Email input Format:

● Firstname, Lastname@test.com　○ Lastname, Firstname@test.com

Name Output Format:

○ Firstname Lastname　　● Firstname MI Lastname

○ Lastname Firstname　　○ Lastname Firstname MI

Group A Name Output Order:

● Names in the original order　○ Names in reverse order

Group B Name Output Order:

● Keep original subgroup order　○ Recorder all names within group B.

[ Submit ]

FIG. 14B

Identity Data Processing Result

Enter Names in Group B:

From: John Smith;
Sent: Novermber 14, 2008
To: Dean Smith; Star L, Steal; Marty, Store; xyz; X.T.; X.Y.Z.; natation11@test.com; ""; "notion009@test.com"; David.Biglow@test.com; David.T.Seth@test.com;t

[Clear Group A] [Clear Group B] [Clear All] [Submit] ← 432

Sorted Names Output: — 434

Ordered By: [first name in alphabetic order ▼]
— 433
Sorted Names from Group A:

---Select an order---
first name in alphabetic order
first name in inverse alphabe order
last name in alphabetic
last name in inverse alphabetic order ABC; Bernstein; David Franklin, Esq,; Franklin, Esq,; David Seth; Dean Smith; Blue; G.M. Homes, Esq.*; Gorger Blue; M. Howa, Esq.*; Jack, Esq; Jack Smith, Job; Joe; John Smith, Esq.*; L. Steal; L Strong; Lily Smith; Lisa Black; Esq.; Mary Stone; North Show names in table format Sorted Names from Group B: — 435

| From: | John Smith, Esq.* |
|---|---|
| To: | Darlene Homes; Darlene Homes; Dave Farr; David Biglow; David Franklin; Esq.; David T.Seth; Dean Smith; Dolly Doles; natation11@test.com notion009@test.com; nv9900@tset.com; Sneal,; Star L. Steal; Steven M. Dulles; Store Marty; X.T.; X.y>z.; xyz |

Show names in table format

FIG. 14C

| To | Darlene Homes; Darlene Homes; Dave Farr; David Biglow; David Franklin; Esq.; David T.Seth; Dean Smith; Dolly Doles; natation11@test.com notion009@test.com; nv9900@tset.com; Sneal,; Star L. Steal; Steven M. Dulles; Store Marty; X.T.; X.y.z.; xyz |
|---|---|

Hidden names in table format

| ☐ | Sorted Identity Data From Group B |
|---|---|
| ☐ | John Smith, Esq.* |
| ☐ | natation11@test.com |
| ☐ | X.T. |
| ☐ | X.Y.Z. |
| ☐ | xyz |

[Delete Selected Names]   [Add New Names]

Enter Identity Data for Processing

Enter Names in Group A:                                                     Back

```
From: Jack Smith; le Storng; Dick; ABC; Job; X.Y.Z.; Jack;
Lisa Black; Greg M. Howa; test2@test.com
Sent :   November 14, 2008
To:  Dean Smith; L, Steal; Gorger.Blue@test.com; xyz;
David Franklin; G. M. Homes; Spade, North; Mary Allen Stone;
```

Enter Names in Group B:

```
From:   John Smith;
Sent:   Novermber 14, 2008
To:     Dean Smith; Star L, Steal; Marty Store; xyz; X.T.; X.Y.Z.;
        natation11@test.com; "nv9900@test.com";
        "notion009@test.com";David.Biglow@test.com;
        David.T.Seth@test.com;         ─436
```

[Clear Group A]  [Clear Group B]  [Clear All]  [Submit]

FIG. 14E

Name Search | Full Screen | Email | Manage Account | Log out

| | Date: 3/3/2009 |
|---|---|
| My Discussion Group | Project Code: mdg |
| [Global Search] | Member: Second Lastname |

| Notes | Transaction | Attorneys | Acronym | Table1 | Table2 | Discussion | Pad | Instructions |

Send Message    Sent Messages    Received Messages

Received Messages

| ☐ | Sender | Subject | Files | Sent Date |
|---|---|---|---|---|
| ☐ | Manager Lastname | Project progress | 0 | 03-03-2009 |
| ☐ | Manager Lastname | Work hours | 1 | 03-03-2009 |

[Delete]

FIG. 15A

Send Message    Sent Messages    Received Messages

Details of Message    [Delete] [Back]

Sent Date: 08-17-2008 15:28:42
Sender: Test LastName
Subject: Test
Attachments:

This is a test.

FIG. 15B

Send Message | Sent Messages | Received Messages

Send Message

Sender: Member LastMember

Recipient: Manager LastName ▼
- Manager LastName
- Member LastMember
- John FFF
- Member Last Subject: [                    ]

*Message: [                    ]

Attachment: <u>Add more file path</u>
(Accept pdf, jpg, txt, doc,... file extensions/formats )

[/root/testfiles/menu.jpg] [Browse...] <u>Remove filepath</u>

[Submit]

Scratch | Attorney Name | Acronym | Priv-Log | Table1 | Table2 | Discussion | Instructions

Instructions

A. Procedural Guidelines
   1. <u>Project Guidelines</u>
   2. <u>Reimbursement Policy</u>

B. Substantive Guidelines
   1. <u>Responsiveness Review</u>
   2. <u>Privilege Review</u>
   3. <u>Case Background</u>
   4. <u>Model Coding Examples</u>

C. Reviewer's Tools
   1. <u>Log in</u>
   2. <u>Time Sheet and Payment Histories</u>
   3. <u>Computation Tools</u>

FIG. 16

| IE |
| --- |
| HTML/Text |
| Document view |
| To: John Smith |
| From: Li Stone |
| |
| Select and send |
| |
| To Author |
| To Recipient |
| To Date |
| To SSM |
| To GSM |
| |
| Send to all fields 222 |

| IE |
| --- |
| Author [       ] |
| Recipient [       ] |
| Date [       ] |
| Special Subject Matter: |
| [       ] |
| General Subject Matter: |
| [       ] |
| Submit   Cancel |

FIG. 17

DISCOVERY INFORMATION MANAGEMENT SYSTEM

BACKGROUND OF THE INVENTION

Electronic discovery is a process by which a party produces certain documents required by law or rules in response to a document request or court subpoena. Electronic discovery is frequently used in legal proceedings such as corporate litigation, corporate merger approval, and administrative investigation.

In a typical legal proceeding, a party may, pursuant to rule of procedure, send a document request or a subpoena duces tecum to another party to compel it to produce documents containing any of specified categories of subject matters. Historically, paper documents were produced manually. The responding party reviews its documents, identifies all documents containing any of the enumerated categories of subject matters, and produces them for the requesting party. However, the information technology has caused companies and businesses to have extremely large document pools, and thus reviewing and producing documents by the manual method are no longer practicable. Therefore, a party responding to a document request has to use a document review platform for document review. Each platform consists of a server and server application and plural terminal computers connected to the server. Well-known review platforms that can be found on Google include Concordance, Summation, Applied Discovery, Iconect, Stratify, and Ringtail. Regardless of the platform used for an e-discovery project, the basic concept is the same. First, the documents from one or more custodians of the responding party are collected and stored on a server. If original documents are in the form of hardcopy, they are first scanned and saved as suitable image files which are then loaded onto the server. Certain electronic documents are converted into image file formats such as Tiff, PDF, and PNG. Other electronic documents may be converted into text files by optical character recognizing software while their native copies are also available for download. Most of the well-known review platforms deliver electronic documents to review terminals in text, TIFF, PDF, or native files and the reviewers at a terminal can choose any of them.

The files are indexed according to certain scheme, which is mainly for the convenience of assigning reviewing tasks to plural reviewers and tracking documents' processing statuses. Documents may be retrieved by using specific search keys and assigned with specific document number or bates-page numbers. On some review systems, documents may be displayed as files in one apparent folder on the review Browser of the terminal computer. Thus, documents can be assigned to different reviewers by virtual folders. On other platforms, documents may be presented to the reviewers in the order consistent with their consecutive numbers. Thus, documents can be assigned to plural reviewers by assigning documents by start and end bates numbers. In most of the review platforms, a project manager can use a search method to generate a review pool for job assignment or directly load documents as a review pool to be indexed for assignment.

Plural reviewers review documents from terminal computers that are connected to the server. Usually, each of the reviewers can log into a personal review account and open the assigned folder or document range to review documents. If the platform allows plural reviewers to review documents by ranges, each of the reviewers must go to the start document number of his assigned document range. Each of the review platforms has at least two panes: one for viewing the documents and one for marking the documents (often known as "tagging tree"). In reviewing documents, the reviewer opens a document on the review pane, reads the document, and conducts required analysis. Upon finishing reading the document, the reviewer clicks all applicable check boxes on the tagging pane according to review instructions. Each of the check boxes ("tags") is associated with one of the document categories or responsive definitions (also known as "specifications") displayed on the tagging pane. For example, the tagging tree on the tagging pane may contain the following checking boxes and definitions: [X] None-responsive, [ ] Responsive, [ ] Hot document, and [ ] Privileged document. The responsive documents may be further classified into many subclasses. Some examples of the responsive definitions are: [ ] Internal Personnel matter, [ ] Corporate Structure, [ ] Press Release, [ ] Sale of Goods, [ ] Prior Litigation, and [ ] Cost Analysis. The number and natures of definitions used in each case are unique and may be completely different from what are used in other cases. Thus, the server must allow the project administrator to setup and modify the tagging tree for each project. The reviewer may write an annotation for a document in an annotation field associated with the document.

After the reviewer finishes the first document, the reviewer then clicks a document-advancement button or submission button. This action causes the server to write the values for the tags into the database for the document and causes the server to load next document. The reviewer repeats the same process to review next document.

Each of the reviewers reviews documents in a similar way. Review of corporate documents to achieve high consistency is a very difficult task because the subject matters in corporate documents may be about anything under the Sun. They may be written at any technical levels in any styles. Documents may contain a large number of special acronyms, special terms and expressions, unfamiliar product numbers, short product names and specifications, unknown and incomplete people's names, unfamiliar transactions, incomplete places and locations, and implied assumptions which are understandable only to their intended readers. Most of the casual documents such as email are written in informal style, appear in folders out of context, and contain spelling, grammer and factual errors. Accordingly, documents are not readily understandable to anyone who is an outsider of the discussion cycle. Accordingly, document review productivity is generally low especially at the early stage of review. Reviewers constantly struggle to understand unfamiliar terms, acronyms, theories, concepts, transactions, events, locations, people, roles, and relationships. If the task of e-discovery is to review old documents for a corporation whose staff has been changed completely, the current staff can do little to help the reviewers understand what was written on the old documents.

An inherent problem in document reviews is that each of the reviewers is in the learning process. The knowledge learned by one reviewer cannot be ported to another reviewer in an efficient way. Case information that must be absorbed for conducting a competent review includes general business, technical background, transactions, employees and their roles, the attorneys for the company, and other information such as common acronyms and jargon. On document review sites, case information may be posted on a black board or clipboard for sharing. This method is however ineffective and inconvenient. In the alternative, case information may be shared periodically in project meetings. However, distribution of case information by verbal announcements cannot eliminate misunderstandings. For a large review project involving a large number of reviewers, some members may be absent from such meetings. Therefore, some of the reviewers members may be uninformed of case information. As a result, review quality is compromised due to misunderstanding and the lack of communications. Moreover, if a matter involves a massive amount of case information requiring hundreds of reviewers, non of such methods has meaningful utility.

Sharing information by using Window's sharing drive has been used as early as the birth of the Windows operation system itself. However, this method presents several problems. First, such arrangement does not allow plural reviewers to write information to the same source and the Windows operating system may lock the file for read only. Second, such a method is not suitable for customization and is not effective. Finally, there is no suitable way for ensuring that all information posted is accurate and reliable. Posting a piece of wrong information for sharing may cause other reviewers to rely on wrong information to the clients detriment. Each of the cases may require totally different ways of organizing and sharing case information.

For large discovery projects, the amount of case information may be massive. It is often impossible to decide what is important and what is not during review. Any attempt to collect case information by one or two staff is unrealistic. Whenever, a case raises a new issue, a linear search and review is conducted to find revelant documents on the issue. This approach, while it is highly effective, will consume a great deal of review time. A solution to this problem could be using a powerful data-sharing system specifically tailored for a case. Unfortunatley, a data-sharing system tailored for one specific case may be useless for other cases. Moreover, the long developing cycle and the high development costs for developing such a data-sharing system discourages its use. While existing data-sharing systems may have all required power, they are unfit for use in a large team environment. When several reviewers are trying to add a specific piece of information to a data-sharing system while several other reviewers are trying to find the same information, the system is unworkable. Problems may be encountered in information validation, data-collecting efficiency, and data-retrieving efficiency. Such a system must be implemented for a constantly change enviroment. The inability to share real time data in a large dynamic environment directly affects discovery quality and is a major reason for unmanageable production costs.

SUMMARY OF THE INVENTION

The present invention is an e-discovery information management system that is intended to solve many inherent difficulties encountered in e-discovery and case investigation. One object of the present invention is a system by which discovery information can be maintained and shared by many reviewers in real time in the most convenient way. The second object of the present invention is a reliable information system for sharing discovery information that must be as accurate as possible. Another object of the present invention is a versatile information system that does not have inherent limit to its application scope and is highly adaptable to unpredictable changes in discovery processes. Another object is a system that offers great flexibility in exporting and importing project data. Another object of the present invention is an information distributing system that can substantially improve document review efficiency by using plural integrated tools. Yet, another object of the present invention is a system, which helps the reviewers enter data efficiently.

The present invention is a discovery information system that is highly configurable by a project manager. The system may be used for any of mass document production projects or in connection with any of commercial discovery platforms. The system can be integrated into any of the leading commercial review platforms.

The system is highly configurable and can be used to host plural discovery projects. When the system is used to host plural projects, the administrator of the server can use administrator's tools to assign plural manager's accounts to plural project managers. The system also has tools for each of the managers to create a project, delete a project, modify an existing project, configure plural database tables, set up additional tables, delete database tables, and assign and view project members' accounts.

The present invention is an information system consisting of a server and at least one client computer. The system allows project members or users to add information to plural configurable database tables, validate information via different validation routes and by different validation methods, share information among different users in real time, and process information by using interactive server pads, investigative identity data search algorithm ("IIDS"), identity data processing algorithm ("IDP"), and configurable interactive search and data-feeding function.

In configuring a configurable table, the system has server tools, which allow the manager to select a data validation route, choose data validation methods, and set up data source for any data entry box for any of database fields. Data may be validated on a tentative page or a combined page by manager's data validation method or voting method. In setting up a data source for a data entry box on the data entry form or the edit Table form, the manager may create a static data source or assign one or more data fields in one or more configurable tables as a data source for the data entry box.

One version of the information management system of the present invention is configured for dedicated use by one single project. In this case, the application is pre-configured with one manager's account, which is used by a manager to set up a project and configure configurable tables for use. The manager can delete the project, change the project, and reconfigure the project. Another version of the information management system of the present invention is configured to host plural discovery projects that are run independently.

The system of the present invention is also an information system with tools for exporting project data and importing existing project files. The project data from a project can be exported for backup for later use. By importing a project file into a manager's account, the system is able to render the project precisely in the same way as the system did before the project file was created.

One version of the information management system of the present invention contains integrated tools for resetting all project storage facilities (or configurable database tables) under any of the manager accounts. Project storage facilities can be reset instantly by one of the methods selected from the group consisting of (a) returning the state of the manager account to the system's default setting; (b) deleting all project data without touching the structures of all database tables; (c) overwriting all table structures by uploading a configuration file containing tables structures and necessary definitions; and (d) overwriting specified tables under the manager account by uploading a configuration file containing plural table structures and necessary definitions.

In addition, the system provides configurable administrative page, which allows the managers to upload project guidelines, reimbursement policy, and coding samples, and formulas for computing job payment. The manager can distribute information to the project members conveniently.

The present invention is also a method for efficiently sharing information between plural project members. The method comprises: (a) adding a data record by a project member into a table as a tentative record, (b) validating the record in a combined table or tentative table by the manager or members' vote, (c) changing the status of the record, (d) moving the data record from the tentative table or the combined table to a validated table, and (e) retrieving the data record by any of the project members for share. Information on this system may be shared by using a simple search method, interactive data retrieving method, investigative identity data search algorithm, identity data processing algorithm, and global search method. As a result, the record created by the member can be found and shared by the rest of the members without the risk of introducing incorrect information into the system.

The present invention is also a method for creating an interactive data entry form in a document review environment in the steps of (a) creating a database table containing a destination field, (b) creating or setting up a data source which may be plural words and phrases ("static data source") or one or more fields of one or more database tables, and (c) associating the destination field with the data source so that when an interactive data entry page is generated, it contains necessary JavaScript code with parameters for calling the server's interactive search program for retrieving the data choices from the data source. Therefore, the user can reduce keystrokes in entering data. The present invention further comprises methods for constructing phrases by interactively retrieving and selecting data pieces in plural component boxes and combining user-selected data pieces to form a phrase by interactively retrieving plural data pieces in a single phrase-constructing input box.

The present invention is also an investigative identity data search algorithm ("IIDS") which allows for conducting identity data search in a name table in the steps of: (a) opening a search page containing a search box and plural configuration settings, (b) defining the configuration settings including search ranges and match methods, (c) providing a list of names in the search box, and submitting the page to the server to conduct an investigative identity data search, and (d) displaying found identity data in a search result page.

The present invention also includes an identity data processing algorithm ("IDP") which allows user to process identity data in the steps of (a) opening a page containing two input boxes and plural configuration settings, (b) defining the configuration settings including data ranges, output order, and output format, (c) providing a list of names in the first box and a list of names in the second box, (d) submitting the page to the server for processing, and (e) displaying the processed identity data in two output boxes in selected output order and format without duplicates between the two output boxes.

BRIEF DESCRIPTION OF DRAWINGS

FIG. 3A shows server administrator's "View Project Managers" page;

FIG. 3B shows Discussion Board as viewed from the server's administrator account;

FIG. 3C shows the server administrator's page for assigning project managers;

FIG. 4A shows the manager's page for prompting a newly assigned manager to provide account information, which is substantially similar to the page for updating manager's account information;

FIG. 4D shows the manager's "View Project Members" page for viewing all existing project members;

FIG. 4E shows the manager's "Assign Project Members" page for assigning member accounts by direct input and by file upload;

FIG. 4F shows the manager's "Manage Project Shared Account" page for changing the shared account name and shared password;

FIG. 4G shows the manager's "Export Project" page for exporting project data;

FIG. 4H shows the manager's "Import a Project Zip" page for loading project data;

FIG. 4I shows the manager's "Reset Configuration by File" page for resetting project;

FIG. 5 shows the manager's "Set up Tables and Boards" page for setting up, deleting and adding database tables and other information on the manager's home page;

FIG. 6A shows the manager's "Create Tables or Board" page for creating a database table;

FIG. 6B shows the manager's "Modify Table for Name" page for deleting or modifying a column or adding a new column to the table;

FIG. 6C shows the manager's "Modify Columns for Name" page for modifying a column in the name table;

FIG. 6D shows the manager's page for changing navigation name, table name, data access rule, data validation route, and data validation methods;

FIG. 7A shows the manager's "Attorney Name Table" in its Validated Table view showing voting data for the record No. 1223, wherein the data validation route is a tentative table;

FIG. 7B shows prior voting information for a data record in the "Attorney Name Table" (the Tentative View) opened from the manager's account;

FIG. 7C shows the manager's "Sent Messages" page for viewing sent email;

FIG. 7D shows the manager's "Send Messages" page for sending email;

FIG. 8 shows the member's "Change Personal Account" page for updating account information and a link for changing the member's password;

FIG. 9A shows the member's "Discussion Board" in a conventional view;

FIG. 9B shows the member's "Discussion Board" in an open view;

FIG. 9C shows the detailed messages that has been opened from "Discussion Board";

FIG. 9D shows the member's page for posting a message on "Discussion Board" and a pop-up confirmation window;

FIG. 9E shows the member's "Search Member Messages" page for conducting searches using different criteria;

FIG. 10A shows the member's "Attorney Name Table" (in the Tentative Table view) with a Vote button and a Revoke button;

FIG. 10B shows the member's "Name" in the Validated Table view where the validation route for the table is the combined table;

FIG. 10C shows the member's "Name" (in the Combined Table view) where the entries are retrieved from a search operation;

FIG. 10D shows the member's "Attorney Name Table," where the member has just cast votes to three records and is prompted to confirm the member's votes;

FIG. 10E shows the member's "Add Record to Attorney Name Table" for adding new records to the table;

FIG. 10F shows the member's "Edit Transaction Table" where the server provides a list of suggested data pieces 222 in response to the member's keystroke in the comment field;

FIG. 11C shows the member's "Personal Pad" where a record is found in response to a search (updating is not allowed);

FIG. 12A shows the member's "Combined Search Result" where data records are found from all tables and the discussion board;

FIG. 13A shows the page for conducting investigative identity data search ("name search");

FIG. 13B shows the Setup page for default identity data search;

FIG. 13C shows the identity data search result from submitting the identity data search page showed in FIG. 13A;

FIG. 13D shows the identity data search result for unmatched identity data that were from a segment marked by "to" in FIG. 13A;

FIG. 14B shows a "Current Setup" page for setting up identity data search, sorting and duplicates elimination;

FIG. 14C shows the "Identity Data Processing Result" page and two input boxes for taking new identity data for repeating searches;

FIG. 14D shows a table that is opened by clicking "Show Names in Table Format" in FIG. 14C;

FIG. 14E shows the page for accepting new source data for repeating operations;

FIG. 15A shows the member's "Received Messages" page for viewing received email;

FIG. 15B shows the details of a message as viewed from the member's account;

FIG. 15C shows the member's "Send Messages" page where the member can send email messages to any member and project managers;

FIG. 16 shows the member's Instructions or Administration page showing the links for viewing project guidelines; and FIG. 17 shows the concept that data are copied from a review browser into a table on a web form with a submission button or is directly sent to a different server by using a proper URL containing the data as a parameter.

DETAILED DESCRIPTION OF PREFERRED EMBODIMENT

The e-discovery information management system of the present invention may be built as follows.

A. Hardware Arrangement

Figure 1:
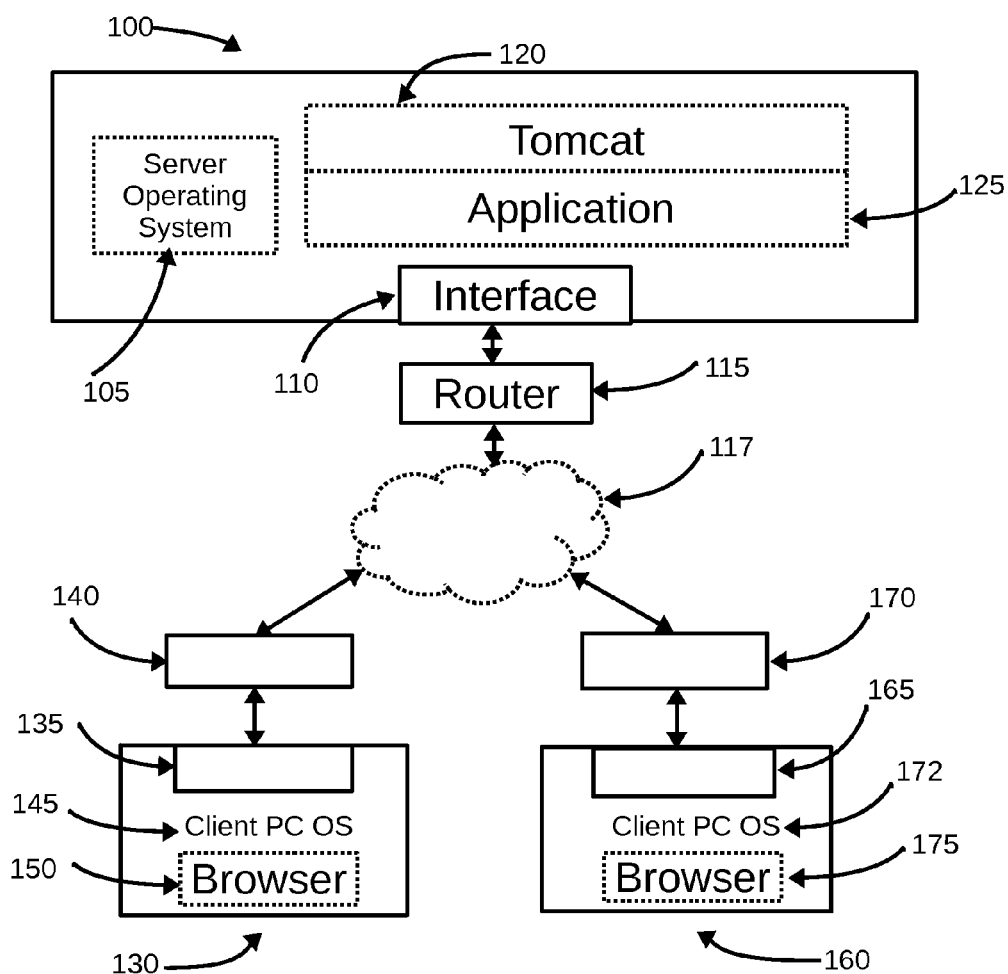
FIG. 1 is a schematic diagram showing the hardware and software components.

The system (FIG. 1) comprises a server 100 and client computers 130 and 160, all of them are connected in a network so that they are able to exchange data using common data transmitting protocol such as TCP.

The server 100 is running an operating system 105 and is fully functional, has a network interface 110, and is connected to the Internet 117 through a router 115. In one of the embodiments, the server is an Intel D945PNS motherboard with a Pentium D 840 processor operating by Fedora Core 7. Although the system came with a package of Java tool, a Java Development Kit (JDK version 1.5.06) is installed for compiling Java class files. In the ext folder inside the lib folder of the Java Runtime Environment (/usr/share/jdk/jre/lib/ext), activation.jar and mail.jar are placed. To handle file uploading, a package known jspsmartupload (or equivalents), which includes several class files, is used. The server is installed with Apache Tomcat 5.5.15 and MYSQL 5.0.27 that come with the system. To allow Tomcat's Java class component to access the MYSQL database, mysql-connector-java.jar is placed inside the lib folder under the common folder of the Tomcat installation folder. All server application files of the present invention are placed in one single application folder. The source code files in JSP format is directly placed in this application folder or sub-folders, and Java class components are placed in the class folder under WEB-INF. The arrangement of folders, versions of Java components, and all jar files meet the requirements of the Tomcat application or be appropriate for the Tomcat application.

The client computer 130 is also operated by its own operating system, has a network interface 135, and is connected to the Internet 117 through a router 140. The client computer 130 runs a browser or a similar HTML rendering application so that it is able to browse standard web pages rendered by the server 100. Optionally, a second computer 160, which is also operated by its own operating system, has a network interface 165, and is connected to the Internet 117 through its router 170.

MYSQL database application (not shown in FIGS) is used for storing files. If speed and productivity is not an issue, it can be completely dispensed with. For example, Perl database may be used as an alternative. Files may be stored in a tree of folders with proper permissions.

In this system, each of the client computers is able to access the server using WWW protocol and access the web pages sent by the server according to any of current standard HTTP protocols (1.0, 1.1, and 1.2).

The application source files developed for this invention include JSP pages and Java class files. The application folder includes two folders: lib and classes. The lib folder may contain some jar files for run-time use. Within the class folder, there are plural folders, each of which contains compiled Java files. In such a system, the JSP files often provide direct interfaces with the user. Under this working system, a web page running on browser can access the database on the server through the JSP pages or Java class Java Bean or Java Servlets.

A JSP page can be run directly under the application folder if it meets the requirement of the system and complies with JSP syntax standard. Each of the Java class files is compiled to form a class file first before it is placed into a proper class folder. The Java class file is compiled using Javac from Java Development Kit (1.5.06), whose jre/lib/ext contains necessary API jar files such as mail.jar and activation.jar. a complete database structure has been incorporated in relevant subjects. This database structure does not show any configurable tables since they can be created and deleted by project managers anytime. The example table structures are disclosed to help the understanding of the concept of the invention. It is understood that many different versions of table structures can be created to achieve the same purposes. For example, some of the tables such as user table, pad_stru table, and all tables containing only a single record for a member can be combined as one single table. Also, some of the features are optional.

B. Functions for Server Administrator

Figure 2A:
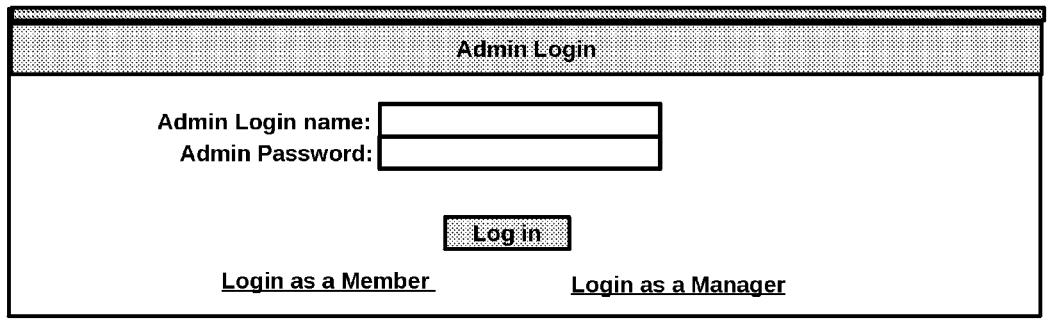
FIGS. 2A-2C show login panes for the server administrator, project managers and project members.

The system may host plural e-discovery projects. The system has three different login pages: a login page for the server administrator (FIG. 2A), a login page for project managers (FIG. 2B), and a login page for project members (FIG. 2C).

Each of the projects is run by a project manager and plural members assigned to the project. Each project is totally independent from other projects on the system. No file sharing and data exchanges between the members of two projects are allowed although modification can be made to allow cross-project data sharing for special purposes. In using this system, the administrator first creates accounts for managers. If the server is intended to host N projects, the administrator needs to create N manager's accounts. To create a manager account, the administrator of the server first logs in the server and assigns a project manager with a unique login account and password (FIGS. 3A-3C).

In one version of the embodiment, the table for holding project information may have the fields: group_id int null auto increment primary key, group_code varchar(10), group_name varchar(50), login_method ENUM ('G','P','A'), allow_admin_access ENUM('Y','N') default 'Y', board_status ENUM('T','F') default 'T', pad_record_size int NOT NULL default '500', reg_date timestamp NOT NULL default CURRENT_TIMESTAMP, login-date timestamp NOT NULL default '0000-00-00 00:00:00'.

Upon logging in, the administrator views the default page showing a list of active discussion boards (Each indicates a running project). The administrator can see the assigned managers by clicking the View Project Managers button on the navigation bar (FIG. 3A). For each of the manager account entries, the page contains three links: View, Modify and Delete. By clicking the View button, the administrator can view all active project managers except their passwords. Whenever, a project manager has the need for changing password, the administrator can assign a new password and the project manager then can log in and be prompted to change password.

By clicking the Assign Project Manager button on the navigation bar in FIG. 3A, the server opens the Assign Project Manager page shown in FIG. 3C. The administrator assigns only a login name, a tentative password, and an optional email address. The administrator can assign as many manager accounts as practicable by using the page by responding to a prompt for assigning more manager account at the end of each assignment. Whenever the administrator has assigned a manager account and given the login name and password to the intended manager by any arrangement such as phone, email or regular mail, the administrator's duty is discharged. The rest authority of managing projects lies in the project manager.

The administrator can add new manager accounts when more projects are to be hosted on the server. The administrator has assigned two project managers (e.g., g-admin1 and g-admin2) (FIG. 3B). After the initial assignment, the passwords are shown in this table (FIG. 3A). However, after a manager has changed her password, those passwords are shown in stars (not shown in the figures). If the administrator clicks the View link for a manager, the server opens a page. On this page, the administrator can view the information about the manager: Login name, account password, company, manager's initials, legal name, full address, phone number, email address, and IP address used for change the password. The initials are used for the convenience of managing the project. The password is displayed as stars if the manager has changed the password. By clicking the Modify link (FIG. 3A), the server generates a page containing editable fields (except IP address) that are filled with original account information (FIG. 4A). The administrator can use this page to update any of the fields except the IP address, which is automatically filled when the manager resets the password. The administrator can also reset password for the manager by changing only the password and it could cause the manager to change password again. The administrator can also delete any of the manager accounts from the server. If the manager account has been associated with a project, the administrator is advised of the effect of the deletion and prompted to type in "yes" in a pop-up window to confirm its intention. After the deletion, all projects associated with the manager's account are inactivated so no members are allowed to access the project. The project data are not be deleted by this operation alone. It is preferable to allow the administrator to create a compressed encrypted file using the project password so that the project data may be reloaded for future use. The administrator is not allowed to access project files. It is assumed that the project manager has properly deleted or archived the project data by using its own tools before the manager account is arranged for deletion. Additional back-end tools may be used to delete abandoned and unclaimed project data.

The project members on a project collectively run a discussion board and many other data tables. The discussion board may be used for various purposes. The administrator can view the discussion board for a project just like the members of the project (FIG. 3B) if the administrator has been granted the right to access to project data. The discussion board may have condensed view and expanded view. By clicking the "Open View" or "Conventional View" button, the administrator can view the discussion boards which are substantially same as those shown in FIGS. 9A, 9C. Any of the managers can prevent the administrator from accessing the project data of the project by using the manager's setup page. If the project manager does not want to grant the right to access to the discussion board to the administrator, the administrator cannot see those pages. The server administrator has the power to control the right of the manager, but has no right to directly control administrator's right to access to projects. While the administrator can reset the manager password, the project manager will know this action upon next sign in. This security scheme ensures that the system is safe in various litigation environments that require different levels of security.

If the project manager has to change its login name, the server must keep track of manager's association with the project and project data. This can be achieved by using a manager ID as an association field and the server will use it. If there is a need for assigning a new manager account as a replacement account, it is possible to change the field in project data so that the project data is associated with the new project manager. The system is implemented so that each project may be associated with plural manager's accounts so that they can manage the project by rotation.

In addition, the administrator may also send and receive email from any of the project members on the server by using the page invoked by pressing the email button (FIG. 3A). This function is intended for communications related to the system's downtime and all issues that are related to the server's performance and operation hours. The detailed layout for the email function is similar to that for project members (shown in FIGS. 15A-15C). When this page is opened, there are three sub-menu items: Send Messages, Sent Messages, and Received Messages. Clicking the Send Message link invokes a page for sending new message as shown in FIG. 15C. By clicking the Sent Messages link, the server shows a table showing all sent messages similar to the table shown in FIG. 7C. The displayed fields include recipient name, subject, files attached, and sent date. For each of the email entries, a check box is also provided. In addition, some buttons such as "Delete" and "Move" are placed on the top or bottom of the table so that the administrator can delete any of the email messages. Additional features such as "Find" and "Sort" are available. The page showing received messages is the same as the page for sent messages except that each of email messages is listed by using sender name, subject, attached files and received date. Deleting, archiving, sorting and finding functions may be implemented as the popular web mail program in Yahoo, MSN, and other vendors.

Other functions for the administrator role are that the administrator can suspend, archive, and delete projects. However, the server administrator must go through a series of steps of authorization before such operations can be performed. In order to suspend an on-going project, the server administrator must fill a certificate, which states that a notice has been sent to the project manager on certain date and a response has been received, and provides a statement for deletion. The administrator fills the certificate before deletion is allowed.

If the administrator wants to delete an obsolete project or archive a finished project, the administrator is prompted to provide information on the status of the project and the time lapse since the closing of the project. The server deletes the project only after the administrator has provided satisfactory answers. Before deletion is performed, the administrator is asked to consider archiving the project data for off-the-system storage. The administrator can use the export tool to archive the project. When the project is archived, the administrator gets a compressed project file. A project manager who has the project file may render the project on this or another system. In the alternative, the administrator can periodically dump project data by using mysqldump or equivalent command of the database application. The dumped file may be stored on an independent system or storage media as history files.

It is understood that the system may be modified to allow the administrator to configure and manage projects. In this case, the manager would be in the administrator's position to set up one or more projects. In the simplest implementation, the server may be designed to host just one project.

C. Functions for Project Managers

Figure 2B:
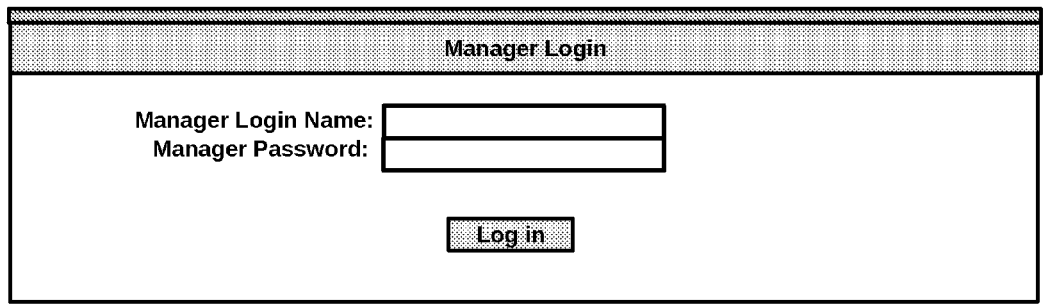
Figure 2C:
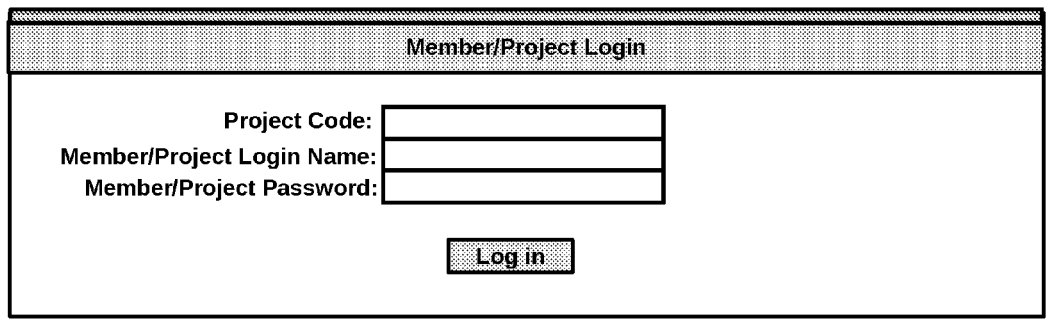

The person, who has a manager account, can log in the server by using assigned login name and password (FIG. 2B). After the manager logs in the server, the manager can set up a project and configure one or more tables and boards for use.

1. Manager's Password and Account Information

Upon logging in, the manager is prompted to provide some basic information (FIG. 4A). The manager is promoted to provide his last and first name and his initials for identification purpose. However, it is understood, any other notations and numbers and strings may be used in lieu of the initials. After the password is reset, the manager is allowed to access all functions and features of the system concerning the project.

2. Manager's Tool Bar

On the manager's home page (FIGS. 4B, 4G), there are a topper menu 200, a navigation bar 202, and a global search box 201. The topper menu bar 200 contains a list of links: Name Search|Full Screen|Email|Set up Project|Set up Tables|Logout,a. "Name Search" is for invoking a page for conducting identity data search (to be discussed later). "Full Screen" is for calling the search page using a full screen view where the page top contains only the user's identity, a search box with a submission button, and a link for returning to the normal view. When full screen page is called, a larger number of records can be displayed. "Email" is a link for calling the page for viewing and sending email. The manager is allowed to send email to only administrator, co-managers, and any project members. "Setup Project" is a link to be used to set up the project. "Setup Tables" is a link to be used to set up the tables and modify current default tables, which include Notes, Transaction, Attorneys, Acronym, Table1, Table2 and Server Pad. The names for the default tables can be changed. The Setup Tables page also contains an embedded link for creating new table so that additional tables may be created if the default tables are not sufficient.

3. Set up Projects by the Manager

When the manager signs in for the first time, the manager has an opportunity to setup a project. The manager is first prompted to provide only certain critical information. On the Create Project page, the manager is prompted to enter or select values for project or group full name, project code, shared login name, shared password in duplicate, login methods, global data validation route, (also "data validation page"), pad's record size, and administrator access right. Data validation route and pad's record size are assigned with project-wise default values, but the values can be changed for each of the tables. Default data validation route is entered by selecting a value on the drop-down menu while the administrator's access right is set by clicking one of two mutually exclusive buttons.

On the Setup Project page (FIGS. 4B), there is a left-side menu 203 for nine functions: Change Manager's Password (FIG. 4B), Update Manager's Account Information (similar to the page in FIG. 4A), Modify Project Setup (FIG. 4C), View Project Members (FIG. 4D), Assign New Members (FIG. 4E), Update Shared Login Accounts (FIG. 4F), Export Project Files (FIG. 4G), Import a Project Zip (FIG. 4H), and Reset Configuration by File (FIG. 4I).

Figures 4B, 4C:
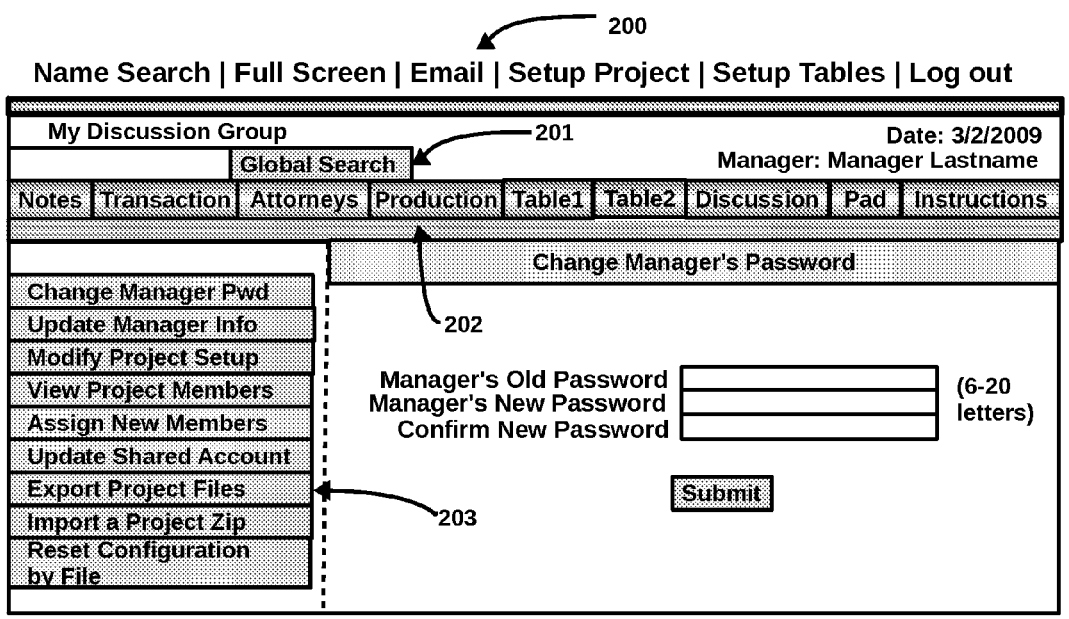
FIG. 4B shows the manager's page for changing manager's password together with all page top and left-side menu.
FIG. 4C shows the manager's "Modify Project Setup" page for changing project global setup.

The project manager can set up a new project by using a page, which is substantially the same as the Modify Project Setup page in FIG. 4C. Although the form shows six items, only project full name and project code are required.

Member login methods could be implemented by default and data validation route could be defaulted to any of the two methods. Three login methods shown on the page include (1) group or shared method, (2) personal or private method, and (3) combined methods. When a personal login method is set up for use, each of the project members has his or her login name and password. In this case, the project member can access all features and functions intended for all the members. When the group or shared method is used, all project members can log in and access the project data by using the common login name and the common project password. In this case, the project members cannot use personalized features such as email, account management, server pad, and time sheet.

To keep track of activities on the project, the IP address is recorded for each message on the discussion board. For example, a message posted by a shared account contains the header information: "Member Name: SHARE|Post Date: 02-25-2009|IP: 192.168.41.10." For other tables, a record submitted by a project member to a table in its tentative view from a shared account is identified as "SHARE" in the initials field. On the manager's account, "SHARE" is a link for displaying the sender's information. By clicking "SHARE", the manager can see Login Name: Share, and IP address. While some fields may be empty, IP address and member initials (i.e., SHARE) are always recorded by default. The information allows the manager to ascertain the identity of the sender if necessary. When both login methods are used, any project member can log in by using the common login account or his personal account. When a project member logs into the server by using a common account, all functions intended for personal use are unavailable. When a project member logs into the server by using a personal account, the project member can use all features and functions intended for all members of the project.

By using the Modify Project Setup page (FIG. 4C), the manager can also change and update project full name, project code, member login methods, data validation routes (via a tentative table or via a combined table), and the right of the server administrator to access project data. If project data validation route is a tentative table, all new data records are shown on the tentative table but only validated data records are shown in a validated table. If data validation route is a combined table, all new data are entered into a combined table where all validated records and tentative new records coexist. However, all tentative records in the combined table are marked in a different color and look. If the project member wants to view only validated data records, the project member can view the validated table. The combined table allows a project member to search both validated or tentative records at once. When a tentative table is used, the project member must conduct two searches, one for the tentative table and one for the validated table. However, search tools for both validated and tentative data records can be implemented to cross the two table views, but this implementation may be confusing. A search, which initiates from a page for one type of data records but include data records from another table view, can confuse project members.

By using the "Update Manager Information" menu, the manager can change or update his account information (FIG. 4A). The manager can also assign accounts for plural associate managers or project leaders so that they have the same privilege as the manager's account except that an associate manager does not have the authority to assign new accounts to other associate managers.

While the present implementation allows the server administrator to access only the discussion board, the access privilege can be extended to all other tables. This may be necessary when server administrator is a manager or partner of a law firm. In addition, the manager can also determine whether the administrator is permitted to communicate with its members by email (not showed in FIGS). If this communication is disallowed, the administrator can send email to the project manager who can relay the email to project members.

On the View Project Members page on FIG. 4D, the manager can also view, modify and delete any of the project member accounts by clicking a respective links 204: View, Modify and Delete. Clicking the View for a member, the server opens a page for viewing the member's account. The account information page shows login name, password, company, member initials, member name, address, phone number, email address, and numeric IP address, and a bottom Modify button, which is associated with the same page that can also be opened by clicking the Modify link on the View Project Members' page. The page for modifying a member account contains editable boxes for all fields except the box for the IP address field.

In one version of embodiment, the member table may have the following data structure: usr_id int not null auto_increment primary key, group_id int, login varchar(20) not null unique, password varchar(20) not null, email varchar(50), prefix varchar(15), abr varchar(5), firstname varchar(20), MI varchar(5), lastname varchar(20), title varchar(20), address varchar(50), city varchar(20), state varchar(2), country varchar(20) default 'USA', company name varchar(20), zip varchar(10), phone varchar(12), reg_date timestamp NOT NULL default CURRENT_TIMESTAMP, logindate timestamp NOT NULL default '0000-00-00 00:00:00', role ENUM ('MG','CM', 'MB','PMG') default 'MB', member_status int default '0', ip varchar (15).

On the Assign Project Members page in FIG. 4E, the manager can assign a new member by assigning a login name and a password by using the input boxes 205. After the manager provides name and password for a member and submits, the manager is prompted to assign more member accounts. The manager can repeat this process until the manager has assigned all necessary accounts. In assigning login name and password for each of the project members, the manager may use a text file containing login name and password pairs in the file to upload account information quickly by using the file path browser 206. The file may contain the following data: "person1, 111111; person2, 222222; person3, 333333." The name-password pairs may be delimited by a carriage return or semicolon. This method allows the project manager to assign project members quickly. Upon successful upload, the server sends the page for showing project members. If the uploaded file is not of a right type or the data in the file are not in a proper format, the server responds with an error message. From the displayed result, the manager immediately knows if accounts information has been uploaded successfully.

In an alternative implementation, the system may include a program for generating passwords for a list of user names automatically. The program must ensure that an identical login name is not assigned to two members. Also, it is preferable that the system avoids assigning identical passwords to two accounts. This program can be further modified to improve efficiency. The project manager first collects a list of email addresses from project members to be used as associated email addresses. The manager provides this email address list to the server by direct input into a large input box or by uploading a text file containing the address list, causes the server to generate a login name and tentative password for each of the email addresses, and sends an invite message containing the login name and temporary password to each of the email addresses. The message may contain a link for accessing the newly created account or an instruction on how to access the new account. Each of the members will be prompted to change password when the member logs into the account for the first time.

4. Navigation Bar and Common Table Features

The default navigation bar 202 (FIG. 4B) contains Notes, Transaction, Attorneys, Acronym (or Production, as the name can be changed), Table1, Table2, Discussion, Pad and Instructions (also in FIG. 5). The details of the use of each of the tables are discussed in the discussion for project members.

All of the navigation buttons except the Discussion and Pad buttons are associated with configurable tables ("database tables") and those tables may be deleted by using the Set up Tables page. Table1 and Table2 initially are not in use. If a user clicks any of them, the server responds with a message that the table has not been set up for use. Not all of the tables are useful in each discovery project. When a table is deleted, the original name on the navigation bar is replaced with "Table#" (where # is a numeric number) implying that it is not set up for use.

All of the configurable tables have a view-selecting tool bar, (same as the view-selecting bar 210 in FIG. 7A), which allows any user to select different views: Validated Table, Tentative Table or Combined Table, and Edit Table (FIG. 7A). While they are also called as tables, the data on different views of a table actually come from the same database table. Each of the tables has table name (i.e., a title), a search input box 211 at the top, the table body capable of displaying plural data records, and plural buttons 214. The number of fields and their types depend on the setup of the tables. The Validated Table has an Enter button, which allows the member to invoke the page for entering data for the table. Each of the column names in the table header is also a link for sorting data records. By clicking a column name such as "Events", "Date" or "Comment" in the transaction table, the user can trigger a JavaScript function to call the server program to send the page with the selected column as a sorting key. Therefore, the server can send the data records that are sorted by any of the configurable and non-configurable fields.

Data Validation route determines where data records are validated. If a configurable table is setup with a tentative table as data validation route, the tentative table shows only the tentative data records while the validated table shows only the validated data records. The tentative table may be referred to as validation page. If the table is setup with a combined table as data validation route, all validated and tentative data records show up in the combined table, while the validated table shows only the validated data records. The combined table is referred to as validation table. The tentative table and the combined table have a check box 212 on the left of each of the data records and have plural buttons 214 below the table.

The number and functions of the buttons 214 on the validation route depend on the validation method for the table and account owner's status. If the table is set up with manager validation only, the bottom buttons on the member's validation page consists of "Enter," "Delete" and "Edit." The member's ability to edit and delete records depends upon the data access rule. The bottom buttons on the manager's validation page consist of "Enter," "Delete," "Edit" (new addition), and "Validate." The manager uses the "Validate" button to validate data records. The manager is allowed to delete and edit data records on the validation page while the member's right to delete and edit data records is limited by the data access rule.

If the table is set up with voting validation method, the bottom buttons 214 on the member's validation page includes "Enter," "Delete," "Edit," "Vote" and "Revoke". The Edit button is added in the latest version so the member can edit records according to the data access rule and it is not shown in all drawings. The manager page has the same buttons because the manager does not need to validate any data records. The manager may cast votes like any member. The buttons 214 are placed on the tentative table or the combined table, depending upon the data validation route that the table uses.

If the table is setup with both manager's validation and voting validation, all six buttons "Enter," "Delete,", "Edit,", "Validate,", "Vote," and "Revoke" are placed on the manager's validation page. The manager can validate data by both validating data records and voting on data records. Five buttons "Enter," "Delete," "Edit," "Vote," and "Revoke" are placed on the member's tentative table page or combined table page, depending upon the validation route used for the table. The manager is allowed to delete and edit data records on the validation page while the member's right is limited by the data access rule.

Despite the complexity of the buttons, all tables must allow the users, manager or members, to enter and edit data records; the manager is allowed to delete any records on both validated table and validation page, but each of the members is allowed to delete his own tentative records if the data access rule is set for private edit or delete any of the tentative records if the data access rule is set for public edit; the manager uses the Validate button on the validation page to validate data records while each of the members uses the Vote and Revoke buttons on the validation page to cast vote or retract vote; and all validation buttons are placed on validation tables where data records are validated.

The validated table for a given table is intended to hold validated records. Therefore, the members are not allowed to delete or edit any validated records. However, the manager sometimes has the need to delete or edit even validated records. The bottom buttons 214 on the manager's page consists of "Edit" and "Delete". If the manager wants to have members to rework on certain data records, one way the manager can do is to change the statuses of those data records so that they are routed back to the validation table where the members can edit data records. If a rework project is to be done by all members, the manage may change the data access rule to pubic edit. After the members edit all the data records, the data records are then validated and routed back to the validated table. Thus, the validation routing scheme and validation methods can work together to meet a variety of needs.

All pages have a page number navigation bar ("page number navigation controller") 215. It has an input box to enter a page number to show and a drop-down box for changing the number of records per page (FIG. 7A). "Page 1 of 2, Go to page [GO]: Records per page [5] per page: Next Last," Where [ ] denotes an input box, and [Go] means a button. The manager or member can go to any page by typing a number in the input box and then clicks the Go button. The drop-down box right after "Records per page" allows the user to change number of records per page. The default numbers may be 5, 15, 40, 60, and 100. The last two words are links that allow the manager to go to next page or the last page. However, those links become "First," "Back," "Next," "Last" if the server displays any of the pages in the middle range. When the servers displays the last page, those links become "First" and "Back." The page number navigation controller is placed in all configurable tables on all views, email table, and the discussion board in all views, for any accessible users, including administrator, project managers, and project members. It is also used in all search results pages that are used in the system. The page number navigation controller shows up only when the retrieved data records cannot fit into the displayed area.

The manage can use any of the configured tables or default tables including server pad in the same way as any project member does.

5. Set up Tables and Boards

The page for Setup Tables by default has seven entries, respectively, for Notes, Transaction, Attorneys, Acronym, Table1, Table2, and Pad. Each of the first five entries is followed by five links: Data Entry, Modify Table, Delete Table & Backup Data, and Advanced Setup. The Setup link next to Table1 and Table2 can be used to open the page for setting up the tables. The Modify link for the Pad entry allows the manager to change pad record size for data. The discussion board is not configurable.

After a project is set up, all tables are fully functional except table1 and table2. The manager can modify any of the default tables and boards on FIG. 5. The two tables may be set up as production log or hot-document log. If the project requires more tables, the manager can use the Setup more table link at the right bottom for creating more tables. All six tables are same or similar in their functions from the manager's point of view. Therefore, most discussion revolves around the third table ("Attorneys" or "Name Table").

In implementation, all configurable tables are tracked by the table: Head (board_id int auto_increment primary key, group_id int, navigation varchar(15), board_name varchar (20), board_status ENUM('T','F') default 'T', has_records ENUM('Y','N') default 'N', validation_method ENUM('0', '1','2') default '0', votes int, access_rule ENUM('0','1') default '0', create_date timestamp NOT NULL default CURRENT_TIMESTAMP). Board_status is for validation route: T for tentative table, and F for combined table; Validation_method is for validation method: 0 for manager validation, 1 for validation by votes, 2 for both manager validation and voting validation. "access rule is for the data access rule: 0 for private edit and 1 for public edit.

The Data Entry link is for invoking a page for adding records. This page is similar to the member's page for adding records in FIG. 10E except that it has different fields. The page for attorney's names table includes the following fields: email address, first name, middle initial, last name, firm or company, dates, type, and comment. "Date" means date ranges. "Type" is used to indicate whether a person is a party's attorney, opposing attorney, client's employee, or other third party. "Comment" stores important information concerning the record. It may include its special nickname, initials, or other description relating to the attorney. At the bottom, there are two buttons: "Submit the Record" and "View the Table." The manager may submit the page containing filled fields to the server. If the server finds no error, the server writes the record, and responds with a success message on top of the same data entry form while the previous data are cleared. The manager can enter another record. If the server encounters an error, it responds with "Data were not saved because they contain wrong data types or were too long in size."

If the manager clicks the View the Table, the server sends the page for showing the Tentative Table if the table is set up with a tentative table as validation route, or the Combined Table if the table is set up with a combined table as validation route. Its function is discussed in the member section. The page for any of other configurable tables is similar to this page except that its field number, field types and field names are different.

On the page in FIG. 5, the manager may delete or modify any of the tables that are present. Any of the tables can be deleted using the Delete Table and Backup Data link in FIG. 5. Upon clicking this link for the Notes table, the server presents a page titled "You can delete the Notes and/or backup the data for the table" followed by four choices: (1) Back up the data and then delete the table; (2) Delete the table without saving its data; (3) Back up its data only, but do not delete the table; and (4) Go back to the previous summary page. When the data backup is required in an operation, the server extracts the data and writes the data in a delimited text file or copy the data into a database table for archival. After a table is deleted, a Setup link is automatically placed next to the table like the Setup links next to Table1 and Table2. After a table is deleted, the manager can recreate the same table or a different table by clicking the Setup link next to the table.

To create a new table, the manager clicks the Setup link (FIG. 5) to open the page shown in FIG. 6A. This page contains two input boxes at the top: one for navigation button and one for table name and two buttons: "Insert Entry" and "Delete Entry." Below these two buttons, the page by default shows a data input line for accepting the definitions of the first field or column of the table. The input boxes in the data input line are respectively for field name, type, length, not-null, and uniqueness.

On this page (FIG. 6A), the manager at first sees only one data input line for creating one table column. By clicking the Insert entry button once in FIG. 6A, it generates one more input line. If the manager wants to create a table containing five columns, the manager needs to create additional four input lines by clicking the Insert entry button four times. If the manager has created too many input lines by mistake, the manager can delete the last line by clicking the Delete entry button once, and can delete as many lines as necessary by clicking the Delete entry button repeatedly.

In creating a new table, the manager first enters a word (such as "Attorney_Name" or "Name") to be used as the name of the navigation button corresponding to the table to be created. This value is to be saved in the special database table Head intended for storing the information about all configurable tables on the server. The manager then provides another word or phrase such as "Names" to be used as the table name, which is also used as the title of the web page for displaying the table. The field name should be one single string without any space. In addition, some words and phrases that have been used by the system cannot be used as a table name.

The manager needs to define all fields. The manager provides a field name and the length. The field name should contain no space and special characters. The types of the field available in the drop-down menu include integer, tiny integer, char, varchar, double, year, date, time, and date and time. The manager needs to use correct data types. "Not null" is a check box, which may be selected if the field cannot be null. Uniqueness is also a check box, which may be selected when the value in a field to be created must be unique, as in case of a field for email addresses. The manager needs to understand when a field cannot be null and when the unique box should be checked.

After the data are provided with correct checks, the form is submitted to the server for processing. If the operation is successful, the server shows the page Setup Tables and Boards page with the newly created table in it. If the server encounters error, it responds with "Error: The system was unable to create board/table, and this maybe due to some wrong fields."

The structure of any of the tables can be modified. By clicking the Modify button on FIG. 5, the server generates a page titled "Modify Table for [Table Name]" (FIG. 6B). The structure of the attorneys name table could have eight rows of data corresponding to eight fields: email address, first name, middle initial, last name, firm or company, dates, type, and comments. Each row contains a field name, type, a null flag, and a uniqueness flag. There is a check box in front of each of the rows and there are three buttons at the bottom: Delete, Add, and Modify.

If the manager selects a column (e.g., Last_Name) and clicks the Modify button, the server sends a page titled "Modify Columns for Name" for editing the selected field in FIG. 6C. This input line is substantially same as the input line used in creating new table except that all input fields are filled with the original values. Upon submission, the server updates the table structure to reflect the modifications of the field. To add a new field, the manager clicks the Add button (FIG. 6B), the server sends a page titled "Add Columns for Attorney Name [Table]". This page looks like the page in FIG. 6C except that it has the Insert row and Delete row buttons for adding or removing plural definition input lines. After the field names are provided and their types and flags are set, the page is submitted to the server. If the new fields are added successfully, the server responds with the same page except that it has newly inserted fields appended at the end of the table. If the manager deletes a field from a table containing data, all of the data in this field will be lost. The manager is reminded with the risk of losing data. If the manager confirms the deletion, the field together with data will be deleted.

By clicking "Advanced Setup" on the Setup Table and Boards page in FIG. 5, the server sends a page titled "Change Navigation Name, Table Name, Access Rule, and Validation Route and Method." The manager can change the navigation name (FIG. 6D). On this page, the manager can set up or change data validation routes with a tentative table or a combined table. The use of data validation route is discussed in next subsection. The manager can also select data validation method in the drop down box. Data validation methods include Manager validation, validation by vote ("voting validation," or "member validation"), and a combination of the two methods. When the manager validation method is selected, the system allows the manager to validate newly entered data records for the table. If the voting validation method or the combination methods is selected, the page opens an input box right below the drop-down box to prompt the manager to type in a numerical value (see FIG. 6D). The number determines the number of votes required to validate each tentative record. The creator of the data record is not counted as a vote by default. If an inputted number is a reasonable integer smaller than the number of members on the project, the system accepts and uses the value as the vote threshold for the table. If the number is not good, the server prompts the manager to provide a new number.

On the page in FIG. 6D, the manager can also set up or change data access rule. The choices are private edit or public edit. Private edit allows the owner of a record to edit it before it is validated. Public edit allows anyone to edit tentative records. After a record is validated, it cannot be edited or deleted by any member. The manager can make small edits. There may be a need to edit a large number of data records, and member edits are desirable. The manager can always move the validated records back to the tentative or combined table by using simple server tool. After mass edits are performed, the manager can move them back to the validated table by changing their status.

In litigation and administrative proceedings, there is always need to revisit finished works. This happens as a result of unpredictable events such as joint of new parties, death of existing parties, intervening actions, settlement of claims, new claim filing, reopening of a closed case, motion challenges and rulings, change of statute, and change of case law. To further increase the flexibility, a body of back-end tools is developed to manipulate data records and their statuses. Those tools allow the manager to find records and change statuses at once, mark data records with different values in certain fields to indicate their significance.

The system must be able to securely protect data real time. The system has tools that allow the manager to export project data in both a native format and a human-friendly format (FIG. 4G).

There are two methods for creating a native project zip. The server extracts all necessary project data and saves them in suitable format. This can be done by using database application's dump tools. The whole project database can be exported by using such tools. The file is then encrypted and compressed to form a native project zip. After this file is decompressed and decrypted, it can be imported back to the same database to overwrite existing database having the same name. However, any other information stored in program property files must be taken care of separately.

The second method allows for exporting a whole project or any of the tables that the manager wants (FIG. 4G). The manager can select any of the tables to export data. When this method is used, the program extracts data from each of the database tables and save them in one root folder. Project files may be saved in a folder with different sub-folder structures. The file is then encrypted and compressed to form a native project zip. When project data are archived by this method, most of the files are human-friendly, and can be read after they are decompressed and decrypted. However, all attachments from one single database table are saved in one single file and cannot be opened off the system. Therefore, it is impossible to access all attachments off the system. The project zip file can be imported back to the same database to overwrite existing database having the same name or relative tables. Any other information stored in program property files must be treated properly.

It is desirable that project data are exported in a user-friendly format in some cases. As in creating a native project zip file, all project data are retrieved from the server and saved in a project root folder. In creating a user-friendly project zip file, the server first extracts basic information ("group properties") such as owner identity, project name, project password, member list, member accounts and passwords, project table setup data, and writes them in one or more text files. The server extracts posting dates and times for web mail messages and attachments from relevant tables and saves the data in a text file, extracts posting dates, author identities, and client IP addresses from the discussion board table and saves data in a text file; the server also extracts data from each pad table and saves them in a text file. All of those files are in well-delimited text format, and may contain file names of attachments. They contain the same substantive information that is shown on the discussion board, email page, and other tables.

The message bodies of the email messages are saved as plural text files in one sub-folder, and the message bodies of the discussion messages are saved as plural text files in another sub-folder. The server also extracts discussion board's attachments and saves them in native formats in a sub-folder, and extracts email attachments and saves them in native formats in another sub-folder. Each of the attachments may be renamed by a message ID or appended with a unique string or its posting-date and time so that no name conflicts exist. The root project folder is then encrypted and compressed as a project zip file. This human-friendly project file can be opened and viewed without using system's software.

The project zip file can be imported back to the system (FIG. 4H). The system allows the manager to (1) replace all existing tables and data by the tables and data from the import file or (2) import selected tables from the project file. When the second method is selected, the manager can further choose to (a) import table structure and data, (b) replace existing data in the table by imported data for the same table, and (c) update data in the tables (i.e., keep original data records, overwrite old records by updated or modified records, and add new data records to the table).

The native project zip file can be uploaded into an active manager account for rendering by using the link "Import a Project Zip." This page allows the manager to import the whole project or affect only selected tables in the system. In importing part of projects, the manager can select tables in 207, select an inporting method in 208, and select a project file in the file path browser 209 (FIG. 4H). The process for rendering a project includes (1) uploading the compressed file to a temporary folder on the server by data stream, (2) unzipping and decrypting the project file using the key provided on the uploading page, if it is encrypted, and (3) retrieving data from the files and writing the data into the database tables. The server knows the locations of all individual files within the root folder. If table structures are imported, they are written in the Head table. After the project file is rendered, the project behaves in exactly same way as it did before it was archived.

If the manager has access to the server, a project zip file may be loaded on the system locally by using an equivalent server program, which may be invoked on the server's terminal. In this case, the command may be like "pimport projectfile-path." The program in response prompts for project password. Upon receiving a correct password, the program decrypts the zip file, reads data from the resulted files, and writes data into relevant database tables.

In real time, it may be necessary to change the whole projects table structures as quickly as possible. This can also be done by uploading and executing a configuration file. On the manager's "Setup Project" page, one button "Reset Configuration by File" is added. Upon clicking this link, the server sends a page for uploading a configuration file. The configuration file contains plural blocks of data in the form of "table_name; navigation_name; table_structure (statements for table structures)." The statements inside the brackets may be a SQL statement or special plain language. The entire line is referred to as a block of definition data for a table. If the statements are in a plain language, they must be translated into a SQL statement for creating a table. It is obvious that a table name and a navigation name may be the same, and any one of the two fields may be eliminated as long as the program knows the convention.

On the page for uploading configuration file (FIG. 4I), the manager has the options to (1) restore all project settings to system's default, (2) delete all project data from all tables including email and the discussion board, (3) reset selected tables by a configuration file, and (4) reset all tables by a configuration file.

If the options 1 and 2 are selected, the manager need to do nothing else to control. The option (3) is used to reset the tables selected by the manager. By using this option, only selected tables are overwritten by the table structures that have identical table names in the configuration file. The system first uploads the file and reads the information about table names, navigation names, and table structures. The system tries to overwrite selected existing tables with the table structures having the same name. The configuration file may contain N blocks of database tables. If the manager clicks the first and fourth tables for being overwritten, the server purges the first and fourth tables and recreates table structures by the table-structures with identical table names in the configuration file. Thus, the table structures can be modified with data deleted. If no identical table exists on the configuration file, the program returns a warning message.

The tables listed for selection are the existing tables under the current project (See FIGS. 4H, 4I). The manager may choose to delete the data from selected tables without touching table structures. The manager may also replace selected tables by the table names and the table structures from the configuration file. In this case, all data in the selected tables are deleted. If suitable data blocks do not exist for an operation, the system responds with an error message. If plural tables are to be created, the system may create them by using the tables and structure data in a sequential order: the first block data is for the first selected table, and the second block data is for the second selected table. In this case, the operation is limited only to the selected tables. The manager can preserve existing tables and data by not selecting the tables. Even if the manager chooses to create new tables, the system will not delete any of the existing tables that are not selected.

When the manager selects the option 4, the manager is prompted to provide the number of tables and browses the client computer to find the file path of the configuration file. Upon submission, the server uses the data on table structures on the configuration file to overwrite a specified number of tables on the server. The system has a preset default value of 5 for the table number. The manager is allowed to change this number between 1 and a system limit (e.g., 10). If the number of tables on the configuration file is fewer than the number that the manager has entered, the system returns a warning, and rewrites the tables with the available tables in the configuration file. In this case, the system overwrites only part of the tables in the order from left to right on the navigation bar. All existing tables, including those without overwriting table structures, are purged from the system.

Plural pre-built table configuration files may be prepared for site use. The configuration files may be customized for different cases that may arise from Foreign Corruption Practice Act, securities law, patent law, and antitrust law. Different cases require very different table structures and information management strategies. This feature allows the manager to change over table structures on site in seconds. Before any of such operations, the server reminds the manager to save current project data by using the export function. If there is a need to change the system back to the old system's table structures, the manager can upload the project zip file.

The manager can set up interactive data feeding function for any of the tables. The system has two types of fields: destination fields to which data are provided in response to keystrokes on their data entry page, and the fields that contain source data. The interactive data-feeding function is normally embedded on a data entry page. In addition, the system also has a database table or file that defines the relationships between active database fields or data input boxes and data sources.

An active input field on a web page may use a fixed number of phrases or data records from other tables as a data source. For example, when the task is to produce a privilege log, the privilege bases are among several possible choices such as "communication from attorney", "communication to attorney", "work product prepared in anticipation of litigation", "communication from legal staff", "communication to legal staff", and "confidential communication reflecting legal advice." Therefore, it is desirable to use those phrases as data source for a privilege basis field for the data entry form for privilege log. Those phrases can be put into a static file or saved in a database table. When a member moves the mouse to the active input box on the data entry page, it causes the server to retrieve those phrases and display them as selectable choices in a dynamic selection box.

Another function is to associate one of the database fields with one or more fields of one or more database tables. For example, a privilege log normally has a column containing attorney names. Most of the attorney names may be found in another table, an attorney name table. Therefore, it is desirable to use the attorney name table as the possible data source for the input box for the attorney name field of the privilege log. Whenever a member moves the mouse to the active input box and types a letter, the server searches the attorney names in the attorney name table, finds all names that may match the typed letter, sends the found names to the client computer, and displays them in the selection box for the active input box. When one more letter is typed in the input box, the server conducts another search, and returns a reduced number of attorney names that match the typed letters. The server can quickly narrow down choices, allowing the member to select a proper entry.

For any field in any of the tables (not shown in FIG. 6B), the manager can setup a data source by clicking "Suggest Source." In response, the server opens a page titled "Set up Suggestion Source for Table: Privilege-Log, Table Field: Attorney_Name". On this page, there are two radio buttons for two mutually exclusive choices (1) Build static source and (2) Select tables and fields. There is a large input box below the first choice. There are plural tables and plural fields for the second choice. Each of the table names are preceded by one first-level check box while each of the field names is preceded by one nested-level check box so that the manager can select any of the tables and any of the fields for each of the tables.

If the manager wants to use static data source under the first choice, the manager clicks the radio button for static data source, types plural phrases separated by semicolon or carriage return in the input box, and submits the page for processing. Upon receiving the data from the submitted form, the server retrieves the data and saves them as one data unit in a data source setup table. The server also enters other information in the record for defining the interactive search. If source data are saved in a normal database table, the server retrieves the source data, breaks up the data by delimiter, and saves them in the setup table. The server enters a record containing information about the input field and data source in the setup table.

If the manager wants to select one or more fields of one or more tables as data source, the manager first selects the radio button for the second choice that is at the top of all source tables such as the Notes table, the Transaction table, and the Name table. The manager selects check boxes for one or more tables as data source, and, for each selected table, checks one or more nested check boxes for available fields. Plural tables and fields are allowed. For example, the manager may select the first-name and last-name fields of the attorney name table and the comment field of the transaction table as source data. Upon receiving the setup data, the server writes a record in the interactive data feeding setup table or equivalent file. The principle for using the interactive search function is same as in the case of using static data source: In static data source setup, the data source may be written as one single string containing delimited data choices while in the non-static case, the data source is plural database fields of plural tables. In the later case, the searchable records in the data source may change from time to time. The server retrieves partially matched data records from a growing data source, and presents retreived data records in the selection box for the active input box.

Database tables and fields to be used as data source for any input field may be selected in the Setup Tables page and the setup is saved in one single table or file. One example setup table is: table suggest_source (board_id int, field_name varchar(50), static_source varchar(5000), tabl_source varchar (5000), field_source varchar(5000), PRIMARY KEY (board_id, field_name). In this table, "board_id" stores unique ID number of the table. "Field_name" is for storing active fields to which responsive data are provided. The static source contains static data choices separated by proper delimit. "Tabl_source" contains table names separated by proper delimiter such as semicolon, and "field_source" contains field names separated by proper delimiter such as semicolon. The number of choices in the tabl_source field and the field_source field are identical so that after they are broken up to form two arrays of strings (e.g., string table[i] and string field[i]), the same index number would define the same sources. Thus, table[2] and field[2] could mean the table name and field names for the same source. The value in the table field means only one table name, but the value in a field field may mean plural field names separated by comma (i.e., "first_name, last_name, comment"). The static_source field stores the static source data. Setup can be done by uploading a file containing proper data.

If the system uses a static file to track data source, a definition in a file may look like "2:field1=table1.field2, table2.field1, table2.field2" where the first "2" is the table id, "field1" is an active input field, and plural terms after the equal sign denote the table names and field names of data sources. Project ID or board ID is used so that the same file can be used to track data sources for database tables for plural projects on the server.

The interactive data feeding function between an active field and a data source is implemented by using a setup table, a JavaScript-code generator, and a server's back-end search program.

The JavaScript-generating program is a server program, which is able to generate JavaScript to be embedded on a data entry page containing any active input field. The script may be a universal program, which can be called by any active input fields with its ID (e.g., name) or an individual program for a fixed field. In this case, plural programs must be embedded for plural active input fields. In addition, the server also generates a listener's statement for each of the active input boxes.

When the server is called to generate a data-entry page for a table, the server checks the setup table or the equivalent file to determine if any of the fields in the table is listed as an active input field. For each active field, the server searches for static data source and, if the source exists, uses the static source. If static source does not exist, the program searches for table names and field names. If nothing is found, the server responds with an error message. If the setup is saved on a file, the server checks the file to find active input fields and their data sources. The server generates JavaScript to be embedded on the data entry page only for active input fields and a listener statement for each of the input boxes for the active input fields so that user's action of typing triggers the running of the JavaScript. If a field is not set up with a data source, no JavaScript will be embedded for this field on the data entry page.

The JavaScript contains data source as hidden parameters. When the JavaScript is run, it calls the server's search function with search key and data source (i.e., table names and field names) as parameters. When the member types a key in the input box, this typing action triggers the script to run and calls the server's search function with search key and the data source as parameters. Therefore, the server gets both the search key and the data source, conducts a search, retrieves responsive data, and sends the retrieved data to the browser in background. The retrieved data are shown in the selection box for the active input field. The interactive search and feed feature is also used in the server pad, as shown in FIG. 11B.

If the data-entry form has a second active input box, tying in a key in the second box would call a script to call the server's search program with its search key and different table names and field names as parameters. Thus, the server searches different tables and fields, retrieves responsive data, and sends the retrieved data back to the browser in background.

A phrase construction function allows the project members to construct simple sentence or phrase on data entry form or on Edit Table page. The manager can set up this function for any of the database fields as a destination field. In setting up this function, the manager needs to determine the destination field, the total number of components, construction method, and retrieving method, which determines whether data choices ("data pieces") are retrieved alphabetically or according to typed letters. In addition, the manager must provide data choices for each component that uses static data source. The general steps are as follows:

First, the manager selects a field as the destination of constructed phrases. The setup page shows all tables and all fields for each of the tables so the manager can select one of the fields as a destination field.

Second, the manager provides a numeric number to define the number of construction components. If a phrase consists of four data pieces from four fields, the manager should enter 4.

Third, the manager selects a construction method from one of the two choices: interactively retrieving data in plural component boxes or interactively retrieving component data on a single construction box by sequential keystrokes. When the first method is selected, the input box is shown as a disabled input box, and four component boxes are shown below the disabled input box on the data entry page. Each time when a key is typed in a component box, the browser shows a selection box and the server feeds data pieces to the selection box. This disabled input box is not necessary, but useful in providing preview of constructed phrases. When the second choice is selected, only one construction box is shown on the data entry page, but the browser shows plural dynamically generated component boxes. If the construction method uses two data components, the browser must show selection boxes twice, and the member gets the component data directly from the selection boxes. Not every component box accepts a data source and some components may accept manual data entry.

Fourth, the manager selects a data entry form or an Edit Table form to embed the construction function. Same construction function can be embedded on different data entry forms for the same destination field of a table. Different construction functions can be on different input boxes for the same destination field.

Fifth, the server promotes the manager to define data source for each of the component boxes. If the manager has chosen the component construction method, the manager for each component defines data source as (1) manual data entry, (2) a static data source presented in alphabetic order, (3) a dynamic data source presented in alphabetic order; and (4) a dynamic data source retrieved in responsive to typed keys. The principle for showing suggested data in each of the component boxes is same as the interactive data feeding function discussed above. A static data source is saved in a single field of a record while a dynamic source contains one or more database fields holding a growing number of data records. Any of the database fields may already have been assigned with a data source. If a component box uses a field that has already had an active data source, the manager may use the same source or use a different data source.

Assuming that a primary field "type" has a static source of "A, B, C, and D" associated with an input box when the member types in the box for this field, the server feeds the input box with "A, B, C, D." A component box on a construction box may also need the "type" data. The component box needs same data source (i.e., A, B, C, and D) or its own static data source such as E, F, G, H as potential "type" data. If a component box uses the existing data source used by the input box for a primary field, the data entry box for the primary field should be placed before the component box. A script can be embedded on the page for copying the value from the primary box to the component box. In this case, the search and feeding function is not necessary for the component box.

If the manager has chosen a single construction box as the construction method, for each component, the manager may choose (1) manual data entry, (2) a static data source presented in alphabetic order, (3) a dynamic data source presented in alphabetic order, and (4) a dynamic data source retrieved in responsive to typed keys. In addition, the manager also has the opportunity to select a keystroke such as control as the key for sequential advance.

After a construction function is set up, the setup information is saved in a database table. When a member calls the page containing the construction method, the server embeds all necessary JavaScript code with necessary parameters for calling the server program for retrieving data source or conducting interactive search. The construction page also contains code for appending the selected data pieces with separator space to form a phrase and code to save the formed phrase in a destination field.

The manager also has tools for setting up a background construction method. In this case, the manager is allowed to define a destination field, the number of construction components, and the identities of all component fields that are normally on the same table. If a component is in a different table, its value must be unique (cannot have two records providing values). The manager can call the server tool to retrieve the values from all of the fields and append them with a preceding space in a string variable to form a complete phrase and save the formed phrase in the destination field.

The Instructions page allows the project manager to post and update project information, including project guidelines, reimbursement policy, substantive review standards (responsiveness and privilege standards), case background, and model coding examples. It also allows the manager to set up pay formulas for each of the members so that they can compute personal pay for each work period by using the time sheet. The data may be saved in a database table which may contain the fields: ins_id int auto increment primary key, group_id int, ins_name enum('project', 'reimbursement', 'responsiveness', 'privilege', 'case_background'), content MEDIUMTEXT, attachment int). Its related attachment table may have ins_id int, attach_id int, file_name varcha(50), file_path varchar(100), content MEDIUMBLOB).

The manager can upload or type in data for each of the topics by using the Update link next to the topic. The page opened from this link has a title corresponding to the topic, a large input box for entering data, a file path browse (with "add more file path" link and a dynamically generated "fewer file path" link) for uploading one or more files using the same method used on many other pages. The manager can provide text in the large box with or without attachments. Upon successful submission of the page, the topic is set up.

If a member clicks any of the topics before it is set up, a popup-window shows up, informing the member that it has not been set up for use. After the topic is set up, the member can open the topic by clicking its name. If an attachment is embedded for a topic, the member can download the attached file by clicking the attachment name.

Data validation route and validation methods determine where data are entered and how data records are validated.

When data validation route is a tentative table, data records enter into the database table through a tentative table as tentative records (See FIG. 10A). Upon data validation, their statuses are changed so that they appear on the validated table, and disappear from the tentative table. When this method is used, it is easy to keep track of all validated records and tentative records. The other validation route, known as "combined table", allows new records to enter the combined table that shows both validated records and tentative records. However, the two kinds of data records are displayed with different colors in the number field and different values in the APP field. All data records are stored in the same database table with different values in their validation status so they can be retrieved in different table views. They could be stored in two different database tables. This validation route is useful in the case that the member is interested in seeing all data records, regardless of their validity. When a record is validated in the combined table, its status is changed, it appears in the validated table, but remains in the combined table as a validated record.

Two validation routes can be used simultaneously for a table so that validated records are in the validated table, tentative records are in the tentative table, and both of them appear on the combined table.

Data validation method determines who has the authority to validate data records. There are two methods: manager validation and voting validation. If a table is configured to use the manager validation method, only the manager or associated managers can validate data records. If a table is configured to use the voting validation method, a data record can be validated when a predetermined number of members have voted in favor of the data record.

A table can be configured to use both manager validation and voting validation methods. In one version of the preferred embodiment of the present invention, the manager can select one of the three choices: Manager validation only, voting validation method only, and both validation methods.

The process of data validation for a table depends upon its data validation route and its data validation method. If the table is configured with a tentative data page and the manager validation method, the manager validates tentative records and data validation is performed on the tentative table (FIGS. 7A-7B). On this page, there is a search box at top, the body of the table in the middle, and four buttons: "Enter", "Delete", "Edit" and "Validate" (This table also has the Vote button and the Revoke button because this table is set up with both validation methods). A check box is placed in front of each of the data records.

To validate data records, the manager selects data records to be validated by checking their boxes and clicks the Validate button at the bottom. The browser responds with a pop-up window to confirm the intention. Upon confirmation, those checked records are validated, and they disappear from the tentative table and appear on the validated table. After a record is validated, it cannot be edited or deleted by the member who created it. In implementation, the values in their status fields are changed upon validation, the data records are retrieved, and the page is updated. If the manager does not agree with a record, the manager can delete it by checking the corresponding check boxes and pressing the Delete button. Deletion is performed by the server upon the confirmation of the intention on a pop-up window. On this page, in FIG. 7B, the Enter button is for calling the data entry page for the table. The Enter button disregards the states of check boxes in front of data records. It could be placed in a different place.

The Edit button on the Manager's tentative table (or the combined table) is for calling the page for editing any of the tentative records by the manager. Upon editing, the initials of records' creator are changed by attaching "-R". For example, "TST" will become "TST-R" indicating that the record, created by TST, has been edited by the manager. The Edit page opened from a validation table contains both validation and editing functions, and thus the manager has an option to edit the record only, validate the record only, and edit and validate the record. When a record is both edited and validated, "-R" is attached to the creator's initials, and manager's initials are added in the APP field.

If the database table is configured with a combined table route and manager validation method, the manager can validate data records by the similar operations on the combined table rather than on a tentative table. In this case, the combined table contains both validated and tentative data records. However, they are displayed in different ways. Each of the validated data records in the attorney name table has a black number in the number field and a manager's initials in the APP field. In contrast, each of the tentative records in the same table has a red number in the number field and an empty value in the APP field. Any other suitable methods may be used to mark the two kinds of records so that they are distinguishable. The manager can find all tentative records by using the search function at the top of the table if the manage knows the records. The manager can also use the page number navigation controller at the bottom to reach the pages where tentative records are.

After the manager finds tentative records on the combined table, the manager checks the boxes for those records, and clicks the Validate button. Upon confirmation by a pop-up window, those records are validated, and show up in the validated table while remaining in the combined table as validated records.

After a record is validated, no project member can delete it. The manager can delete it by checking the corresponding box and clicking the Delete button at the bottom. Deletion is performed by the server upon the confirmation of the intention on a pop-up window. On this page, the Enter button is used to call the data entry page for the table without regarding the selection of check boxes for data records.

In one version of the preferred embodiment, an Edit button is placed next to the Enter button on the combined table so the manager can edit any of data records just as the manager does on the Tentative Table and the Validated Table. As in the tentative case, the initials of the creator of the data record are appended with "-R" after the manager has edited the tentative record. The data record remains in the combined table. Thus, "TST-R" under the initials field means that the record is created by TST, has been edited by the manager, but has not been admitted as a validated record. If a data record is both edited and validated by the manager, the manager's initials are added to the App field and "-R" is appended to the initials of the original creator. Thus, "TST-R" under the initials field means that the data record was created by TST and was modified by the manager while manager's initials under the APP field means that the record has been validated by the manager.

If a data record in the Validated Table is edited by the manager, the value under the APP field is attached with "-R." The "MAN" or "VOTE" thus becomes "MAN-R" or "VOTE-R" respectively, depending upon its validation method. In FIG. 7A, the record No 1223 was originally created by TST, it was validated by three votes by TSF, TST1 and TST2. After the record was admitted as a validated record, one of the managers again edits the data record as revealed by "VOTE-R".

This validation process is essential for maintaining the security and integrity of the information, which is used by a large number of project members.

The manager also has the page for sending and receiving email from and to administrator and its project members (FIGS. 7C-7D). This page is substantially the same as he pages shown in FIGS. 15A, 15C except the scope of communication parties. This Send Messages page (FIG. 7D) contains Sender identity, a drop-down box for selectable recipient names, an input box for subject, and an input box for message. In addition, the page also contains a link "Add more filepath" for sending an attachment, which accepts common file extensions such as pdf, jpg, txt, and doc. One more box for accepting a file path is generated by clicking this link once. On the Sent Message page shown in FIG. 7C, the manager can also view all sent messages that are shown by recipient name, subject, attached files, and sent date. The subject is also a link, which is associated with a page for displaying the whole message.

Each of the messages is preceded by a check box. The manager can delete any of the messages by checking on the box in front of the email and clicking the Delete button at the bottom of the page. The server deletes the checked message upon the manager's confirmation on a pop-up window.

The Received Messages page shows all received messages that are docketed by sender name, subject, attached files, and sent date or receiving date. By clicking the subject name, the server opens the Details of Message for viewing the email message. On this page, there is a Delete button and a Back button. The manager can delete this message by clicking the Delete button. The message is delete upon confirmation of the intent to delete.

D. Program Functions for Project Members

The access right of each of the project members is granted by the project manager as discussed above. In order to sign into the server, the member needs to use project code, login name and password to log in (FIG. 2C). Upon signing in the server using personal account for the first time, the member is prompted to change or update account information (FIG. 8). In this version of the embodiment, the member is required to provide email address, initials, first name and last name on FIG. 8. Upon submission, the server automatically generates a database table for storing data for the member's server pad.

The member's home page contains a topper menu bar: "Name Search|Full Screen|Email|Manage Account|Logout" (FIG. 10A). "Name Search" is for invoking a page for conducting identity data search. "Full Screen" is for conducting a global search using a full screen view. "Email" is a link for calling the page for viewing and sending email. "Manage Account" is for calling the page for managing the member's account.

When the member logs into the account for the first time, the server prompts the member to change password. After the member provides a good password and submits the page, the server prompts the member to log into the account again. The member can change password and account information any time as described below.

By clicking the Manage Account link, the member can change or update his account information on the Personal Account page (FIG. 8). On this page, there is a link for change password. Below this link is a form containing the input boxes for email address, prefix, first name, middle initial, last name, title, company name, street address, city, state, zip code, country, and phone. Email address, first name, last name and initial are required in this version of the embodiment. All of the fields are filled with original data from the database table, but the member may amend any of them and submit the page to the server. Upon submission, the server responds with a message informing the member of successful modification of the account information.

By clicking the Change Password link on the Personal Account page, the member opens the page titled "Change Password". The member provides old password and new password in duplicate, and submits the page. If the operation is successful, the server responds with the message "Password was modified successfully! Please login your account again". Otherwise the server responds with an error message. On the top of this page is also a link "Change Account" for going back to the page for updating account information.

Next to the topper menu bar is the status information of the member: today's date, project code, member name (the first and last name). In the center is also the full name of the project. Right below the project name is an input box for conducting global search. When a search key is typed in this box and the page is submitted, the server searches through all configured tables, member's server pad table, and discussion board, and retrieves all records matching the search key. A search result from a global search is shown in FIG. 12A. Plural search keys separated by space are allowed and are treated independently. The retrieved data records are arranged by the tables that have matched records. On the result page, the member can change the appearance order by selecting a table to be shown first in drop-down box 227. In addition, the member can select an ordering method from the choices available for the selected first table in drop-down box 228. If data records from the discussion board are displayed first, the ordering criteria are ID, email, phone, issue, IP, post date, search key, and content.

The member may open the discussion board and read any of the messages (FIGS. 9A-9C). The discussion board has two views: open view and conventional view.

The conventional view is shown in FIG. 9A. On this view, there are submitting and search buttons 216, and each of the subjects is a link for opening the details of the message. In the conventional view, each of the message entries shows subject, date and owner's name. An opened message is shown in FIG. 9C, which shows four buttons 217. The discussion board in an ope view is shown in FIG. 9B. An attachment would be on the extreme right just below the dotted line. The server starts downloading attachment upon clicking its name. When there are plural attachments, they are placed on the web page side by side without using delimiter (attachment2.txt attachment2.xls). The rest of the functions and features are substantially same as the open view page.

A table for holding data for the discussion board may include the fields: id int auto_increment primary key, group_id int, cus_role varchar(10), consumer varchar(45), email varchar(50) not null, phone varchar(13), ip varchar(15), postdate timestamp NOT NULL default CURRENT_TIMESTAMP, issure varchar(255), search key varchar(100), content MEDIUMBLOB. The related attachment table may have the fields discuss_id int, attach_id int, filename varchar(100), filecontent MEDIUMBLOB.

When the discussion board is in the open view, it shows each of the messages in one section of the page: subject in the first line, the author information on the second line, the body of the message and attachments at the end. The author information is in the form of "Member Name: MAN|Post Date: 02-26-2009|IP: 192.168.1.10". The attachments are shown as links on the right just below its related message body (FIG. 9C). Each of the attachments can be downloaded for view by clicking its name. There are two links at the very bottom of the page: "Submit Message" and "Search Messages" (FIG. 9B). The user can click the first button to invoke the page titled "Send Member Message" for submitting a message and clicks the second button to invoke the page titled "Search Member Message" for conducting a search.

A member can submit a message to the discussion board by using the page titled "Send Member Message" in FIG. 9D. To post a message on the discussion board, the member clicks the Submit Message button. This page contains data input fields respectively for subject, search keys, member's name (optional), email address, phone number (optional) and a large input box for taking a message. The search keys provided by members are not to be shown on the discussion board, but stored in the database table as search keys. There is a link at the bottom "Search Message." There is a link "More Search Keys" which allows member to create more boxes for taking search keys. Below the large input box, there is a link "Add more file path." Clicking this link once causes the browser to create a file path box with a browse button and two links: a link "Remove file path" next to the created file path box and a link "Add more file path" below the file path box. The file path is for accepting a file with a common extension. The member can remove this file path box by clicking the link "Remove file path" or create more file paths by clicking "Add more file path." Therefore, the member can upload as many attachments as necessary and practical. After the member fills in the data in all required fields, the member submits the page. In response, the browser responds with a confirmation message. Upon confirmation of intention, the message is sent to the server and written into the proper database table.

A search page, which has been opened by clicking "Search Member Messages", is shown in FIG. 9E. There are two search methods. On the top is a simple search method by using message's subject. This method allows the member to find all messages containing the search key in the subject line. The second method allows the member to set criteria for conducting a search. The first criterion is message's subject. Leaving this input box blank will cause the server to ignore this criterion and to include all possible subjects. Providing keys in this box narrows down the scope of possible hits. Search range can be further narrowed down by date. The member may use any date or specify a specific date range. In addition, the search page contains a link "More Search Key." By clicking this key once, one more search-key box is generated which is followed by a button "[Fewer] search key" for deleting the input box. The search keys entered on the web page are matched with only the search keys in the database. Leaving the search-key box blank causes the server to ignore the search keys in database. Data records are found and returned when they meet all of the criteria specified on the search page.

The member may use any of those configured tables such as Notes, Transaction, Attorney Name, and configured Table1 and Table2. All of them are designed essentially in the same way. Except table1 and table2, all of the tables have default table structures so that they can be used without configuring.

The use of the configured tables can be demonstrated by examining the functions of the "Name" table (e.g., an attorney name table). This table is used in typical privilege review. When a reviewing member encounters an attorney name in a document, the member enters the name into this table by using the Enter button (FIG. 10A). If data validation route for this table is a tentative table, a new record first enters into the tentative table. This record is view-able and retrievable in the tentative table. The record is also searchable by all members on the project using the global search function, but its unverified status is clearly indicated. When a record is displayed with a red record number in the result of a global search, the record is a tentative one.

Unlike the manager's page, the initials on a record on the member page is not a link so other members cannot view the detailed information about the member who has created the record.

As discussed in the section for project manager, two validation methods are used for validating data records. The process of validating data for a table by vote depends upon validation route for the table. If the table is set up with a tentative table, data validation is performed on a tentative table; and if the table is set up with a combined table, data validation is conducted on a combined table. A record is admitted to the validated table as a validated record when a predetermined number of members have voted for the record. The project manager can set and change this predetermined number. The voting validation method can reduce the burden on the manager.

Figure 10D:
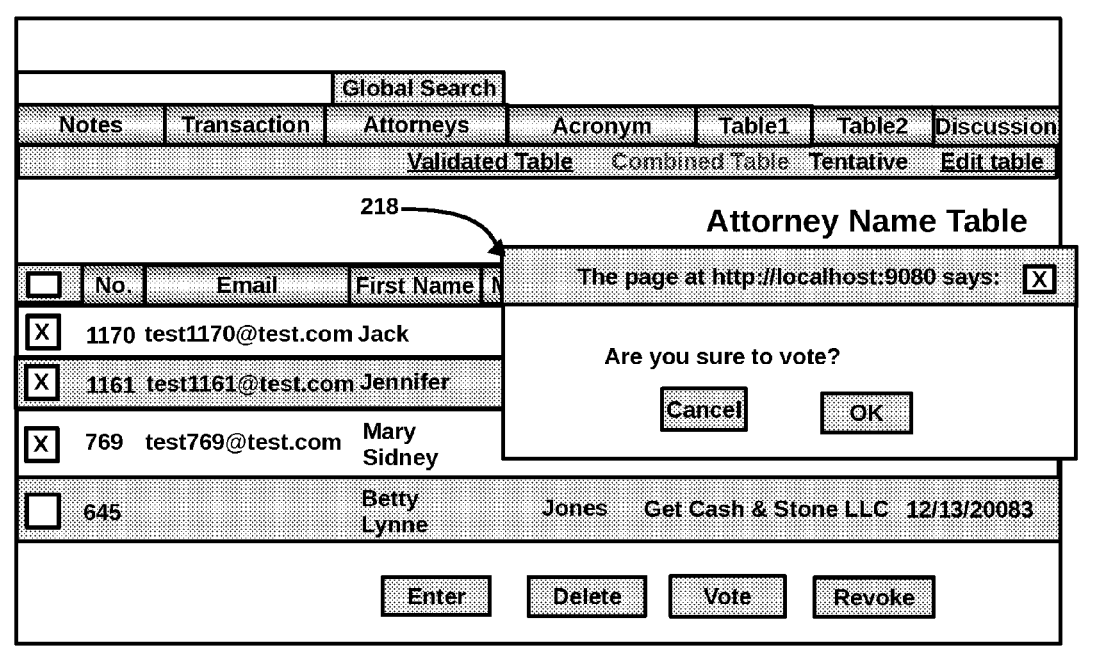

When a table is set up with voting validation method and a tentative table (FIG. 10A), the tentative page contains a search box at the top, a body of the table, and four buttons at the bottom: Enter, Delete, Vote, and Revoke. There is a check box on the far left column on the table header and there is a check box in front of each of the records. To cast a vote on a record, the member selects a record by clicking the front check box, and clicks the vote button (FIG. 10D). The server takes and saves the vote after member's confirmation as shown in dialog window 218. The number of the records on the web page becomes green so that the member knows this is a record the member has voted on. The member can revoke his or her vote before this record is admitted as a validated record. Upon being revoked, the number of the record becomes black again on the web page. Two more members, member B and member C, also cast their votes on this record in the same way on the tentative table under their own accounts. When the last of the members successfully cast the vote required to validate the record, the status value of the record is changed. The record disappears from the tentative table, and appears on the validated table. If the member opens the validated table, the member can see that the newly validated record is marked with VOTE in the App field and date and time in the confirm_date field. If the manager opens the table in the validated table view, the manager can see all members' votes by clicking its record number (FIGS. 7A, 7B). The identities of all voters can be ascertained from their initials. Therefore, the manager knows who has voted for this record. One database table for holding record status in one version of the embodiment may contain the following fields: board_id int, record_id int, usr_id int, vote_status ENUM('0','1','2','9', '10') default '0', [where 0=no action taken", 1=voted, 2=revoked, 9=validated by manager, and 10=validated by vote] vote_date varchar(100), revoke_date varchar(100), access_date varchar (100).

If both voting validation method and manager validation method are used for the table, one extra button, "Validate" is placed on the validation page under the manager account. The manager can cast vote on a record as a member, or validate a data record directly.

If the data validation route is a combined table, the process for validating records by voting method is substantially the same as in the case of using a tentative table except that all votes are cast on a combined table rather than on a tentative table.

Figure 12B:
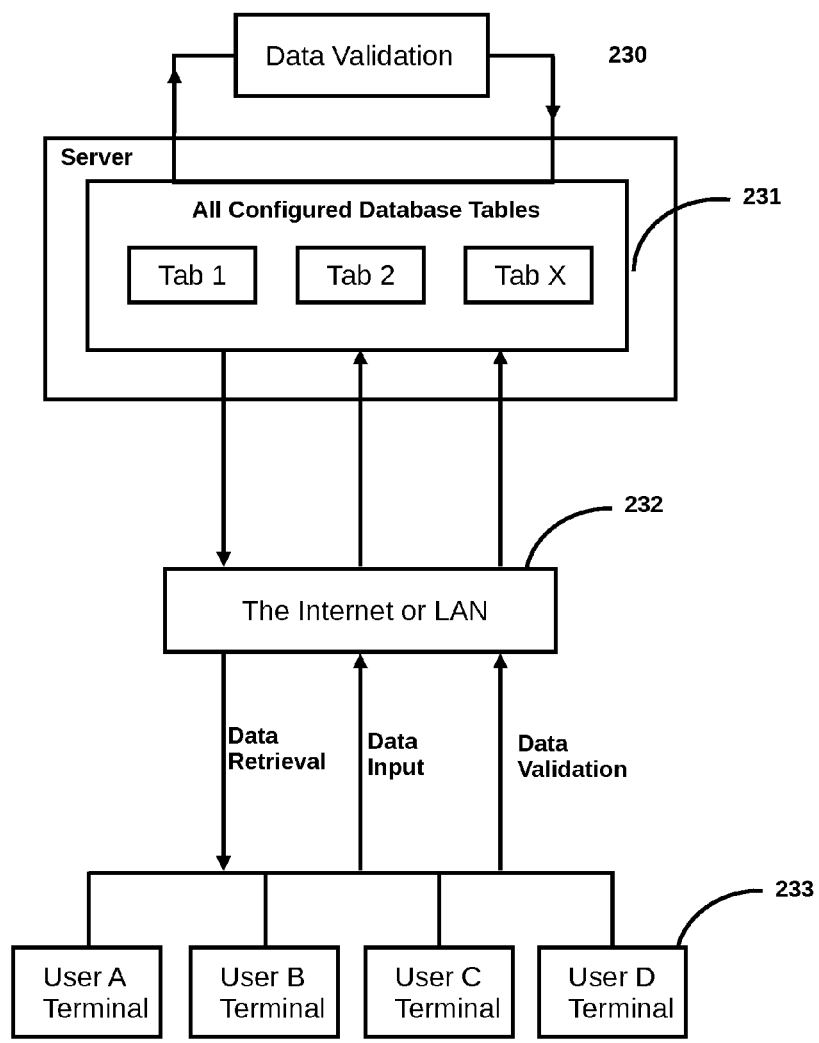
FIG. 12B is a diagram showing two types of data validation methods in relation to data entry and data retrieval.

The data-validation process is illustrated by the flowchart in FIG. 12B. On this chart, four terminal computers 233 are connected to the server 230 through LAN 232. The server in this illustration uses only three database tables. Any of the members can input data to any of the tables and retrieve information from any of the tables through the network connection 232. Any of the members can validate data by vote for any of the records entered by any of the members. When a data record is validated, its status is changed. As a result, the record appears on the validated table view. In addition, the manager is able to validate tentative data directly.

A function, known as table edit or Edit Table, is provided for editing plural data records on a table view. The system provides two kinds of data access rules: public edit and private edit. If the table is set up with public edit, a member can delete any of the tentative records by using the Delete button. If the table is set up with private edit, the member can delete only the member's own tentative records but is not allowed to delete the tentative records created by other members.

To edit tentative records in any of the configurable tables, the member clicks the Edit Table button and calls the page for editing data records (FIG. 10F). This page allows the member to delete any record, create a new record at the end of the table, enter data for a newly recreated input boxes for a record, copy data from an existing record and paste the data onto any existing record, and update the data in the database table.

On this table (FIG. 10F), there are a search box 219 at the top on the right side, the body of the table containing plural rows of data records, and a link "Enter Record" 228 right at the end of the body. Each of the data records may have plural data fields or columns, depending upon the table's setup. Each of the data values is shown in one editable input box. If a record in the table has five fields, it has five editable boxes. On the left of each of the records, there are three very small menu icons 220, respectively, for copy, paste, and deletion. Each of the icons indicates its function whenever the mouse is moved over it. For example, if the mouse is moved over the first icon, the browse shows "Copy" below the mouse's arrow. At the bottom are two buttons 223: "Save Changes" and "Discard Changes." The page also has a page number navigation controller. The column name is also a link for calling a sorting function using the field as a sorting key as implemented in all configurable tables.

When access rule is set to private edit, a member can see only his own records on the Edit Table page. Therefore, it is impossible to overwrite any data records of other members. The access rule is applicable to specific tables and their relevant views. To delete a record, the member just clicks the deletion icon on the left of the record, the record will be deleted from the table, but has not permanently written the change to the database table. To enter data at the end of the table, the member first creates a line of input boxes for accepting an empty record at the end of the table by clicking the "Enter Record" 221 at the table bottom. The member can type data into the boxes for the record and save the record by pressing on the Save Change button. If the member wants to copy data from an existing record to this empty record, the member clicks the copy icon on the left side of the record, and pastes the data onto the empty record by clicking the paste icon for the empty record. Of course, data can be coped from any existing record and pasted onto any of the exiting records. Selecting individual data fields is not necessary for copying and pasting a whole record. However, the member can copy data from one data field to another by the conventional method of selecting and copying data and pasting the data to where the mouse is.

To make permanent changes to the database table, the member clicks the Save Changes button. All changes are saved. If the member does not want to save the changes, the member can click the Discard Changes button. The data in the web table are not written into the database table. Use of the search function 219 will cause the server to retrieve the original data records, reconstruct a web page, and thus cause the client computer to discard the changes. Preferably, conspicuous instructions are placed on the web page to warn the member that navigating pages, conducting a search, and sorting data records will cause the server to discard all changes made on the table. In the alternative, a JavaScript function is implemented to throw a warning message whenever the member tries to use the searching or sorting function or to change the page number after the data on the table have been edited.

Any of the data fields may use a static data source or one or more table fields of one or more of configurable tables as a data source.

Assuming that the input box for comment field on the edit table page for the transaction table has been setup with fixed data choices as a data source. The data choices 222 include "draft agreement," "public record," "press release," "personal communication," and "email." The member uses the Edit Table page (FIG. 10F) to enter data. When a member creates an empty record and moves the cursor to the comment field and types, the server sends all the retrieved data choices and displays them in a dynamic selection box below the input field. If the member moves the cursor to the phrase "Personal Communication" in the selection box and releases it, the phrase is moved into the input box.

If the data source contains a large number of records, the server can be set up with the ability to progressively narrow down data choices for the input box (as in the server pad in FIG. 11B). If the member types the letter "e", the selection box shows only data pieces starting with letter "e". In this case, it shows only "email." If the member types in "ab", the server would display nothing because no data record starts with letters "ab."

Assuming that the manager has set up both transaction table and Notes tables and used the event field of the Notes table as the data source for the event field of the transaction table when the member types in the input box for the event field of the transaction table, the keystroke causes a JavaScript program to call one of the server's search programs with the key, table names, and field names as parameters. The server program searches the event field of the Notes table, retrieves all data that match the typed letters, and displays them in the selection box for the member to select. The member can select any of the suggested data pieces as input data. If no data record is found, the member can type in suitable data. This function not only increases data entry efficiency but also improves data consistency.

This feature also allows the member to hunt for possible data by typing in various letters in an active input box. Due to the setup feature, it is extremely flexible to use. Moreover, the project manager can change the data source for any active field any time by reconfiguring the data source. However, this function requires a sufficient computing power. It is preferable that the selection box has a page number navigation capability or scroll bars when the total number of suggested data choices is excessively large.

The phrase construction function is useful in building production logs and privilege logs in typical discovery projects. In building a privilege log, some common entries in a discriptive field may look like:

1. [letter] [from counsel] {concerning} [corporate litigation];
2. [Memo] [to the counsel] {concerning} [patent application];
3. [An analysis] [from counsel] {concerning} [corporate business];
4. [Spreadsheet] [prepared at the request of counsel] {concerning} [corporate litigation].

Each of those short phrases is intended for a particular document under review. Each of the words in the same order position is referred to as a component, which may be stored in a database field. After a short phrase is constructed for a document, the phrase is entered into a description field (i.e., "destination field") of the record associated with the document. In those examples, each of the phrases has four components: first word or phrase normally indicates document type. This component perhaps has fewer than 20 choices. The second component is to define how the document is related to counsel. It has only a limited number of choices. Some of examples are "from counsel," "to counsel," "prepared by counsel," "from legal staff," "to legal staff," and "prepared at the request of counsel." The fourth component is a relationship phrase, which could be identical. Other similar words with a similar meaning include "regarding," "referring to," "mentioning," and "discussing." A descriptive phrase may be constructed by combining the data values of plural components for the document under review. If the first component has M choices, the second component has N choices, the third component has O choices and the fourth component has P choices, the total number of choices could be M*N*O*P (assuming all combinations are allowed). In a typical data-entry environment, one has to type in data by keystrokes. The present invention shows three methods for performing such tasks. Two of the methods allow members to retrieve the values for each of the components interactively.

In one of the methods, the server generates a data-entry form, which contains one long input box ("construction box") for phrase construction. Each of a series of keystrokes triggers an embedded JavaScript program to call a server search program to retrieve possible data choices for the associated component and display the choices in a selection box. The keystrokes attempted for the first component causes the server to find the data choices from M choices, the keystrokes attempted for the second component causes the server to find the data choices from N choices, the keystrokes attempted for the third component causes the server to find the data choices from O choices, and the keystrokes attempted for the fourth component causes the server to find the data choices from N choices. Each time, the member selects a choice and causes it appended to the phrase under formation with a space preceding the choice. When the member finishes the process, a phrase is constructed in the construction box.

To reduce the number of database tables, the data choices for each of the components can be saved as a properly delimited string in one single field in the setup table. Therefore, all data in the above example can be saved in four records. The source data can also be in any of the fields in any of the database tables. To avoid potential confusion from losing track of keystroke sequence, all of the sequential searches may be triggered by unique keystrokes such as 1, 2, 3, and 4 while the space bar may be designated for sequential keystrokes in the simplest implementation.

The page containing construction tool has a JavaScript for calling a server search function in Java or JSP. When the member types in the first keystroke or a unique key, the JavaScript calls the search function with parameters for defining the data source for the first component. The search program, in response to each keystroke, returns all responsive data choices found in the data source and shows them in the selection box for the user to select. The member selects one of the choices. The member then types in a second key or unique key for the second component, and causes the JavaScript to call the search program to get all responsive data choices for the second component, and displays them in the selection box. The member again selects a choice, and causes the selected choice appended to the first phrase with a preceding space.

When the number of data choices for a component is large, it is preferable to retrieve only the choices containing typed letters. In this case, the choices are best saved in a database table. The keystrokes for defining component order must be different from the keystrokes for retrieving data. The keystrokes for defining component order may be the control key while all normal keystrokes can be used to narrow down choices interactively. Keystrokes "ab" cause the server to retrieve only the words and phrases starting with "ab".

After a phrase is constructed, the web form is submitted to the server for processing. Upon receiving the web form, the server retrieves the data and saves them, including the constructed phrase, in the database table for the privilege log. The web form may contain plural construction boxes for different destination fields or plural construction boxes for the same destination field but using a different data source.

In the best case, the member can finish entering a record by 4 keystrokes and 4 mouse selections (or equivalent to 8 keystrokes). The total number of keystrokes is reduced from 40-50 to 8 with improved data consistency.

If this data entry module is installed on a review platform, the browser needs to use the document ID so that the resultant phrase can be written into the description field of the record in the privilege log associated with the document. If the document review platform and this data entry system do not communicate with each other, the document ID must be typed in manually. Synchronization between the document ID and the record ID in the privilege log can be achieved by exporting the document ID from the review platform and importing it into this system. Since it is easy to retrieve certain document range and assign the record ranges for edits, manual synchronization can be achieved.

In the second method, component data are entered into plural boxes next to a nominal input box and a phrase is constructed on the server when the page is submitted to the server. A typical data-entry form contains several fields, but only one or two fields may require phrase construction. Moreover, the values in some fields (also referred to as "primary fields") may be used in a phrase under construction. Therefore, the construction box for accepting a phrase and all component boxes for accepting component data should be placed in the last rows so that the component boxes are able to use the data from primary boxes that have been filled first. Since the construction box does not accept component data directly, it may be omitted or shown as an inactive box while the component boxes may be shown as active with distinctive looks (e.g., different colors and shapes). When the member types in a keystroke in the first component box, the server retrieves all responsive data choices for the first component and displays them in the selection box. The member selects a choice for the first component. The member then types a keystroke in the second component box, views the responsive choices repeatedly, and selects a choice for the second component. The member repeats this process until all of the component boxes are filled. After the member finishes the form, the page is submitted to the server for processing. Upon receiving the submitted data, the server gets data for each of component boxes, constructs a phrase, and saves the constructed phrase in the intended field of the record associated with the document under review. In the alternative, the phrase may be constructed by embedded JavaScript real time and saved by a server program upon submission.

Additional feature for previewing the construction effect may be added. A preview button allows the member to view the effects of the constructed phrase by showing the constructed phrase in the construction box without deleting the data in all individual input boxes.

A data-entry form may contain both input boxes for primary fields such as attorney name box, document date, and a construction box together with plural component boxes. If one of the individual component boxes shares the data with one of the primary boxes, a JavaScript may be placed on the page to copy the data from the primary box to the component box automatically. This script can be generated automatically upon opening the data entry page, which is set up with construction tools.

Figure 14A:
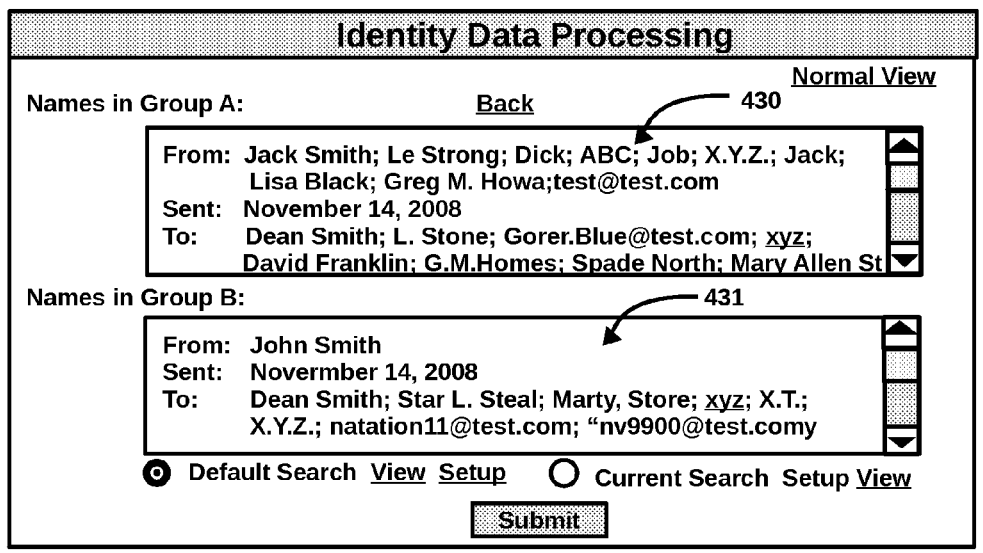
FIG. 14A shows a page for conducting identity data search, sorting and duplicates-elimination.

The above construction method is expanded to include a step of search in the name table. The investigative identity data search algorithm is able to return idenity data ("names") with the counsel names marked with "* Esq". FIG. 14C shows the result of processing Group A and Group B names. While group A source data fall outside the drawing, it is actually same as the data in FIG. 14A. All attorney names such as John Smith in group A and G. M. Homes etc. in group B have been marked with "* Esq". A list of the names in an email document may have a counsel name. The counsel name may be entered in the description field for the document. The description may look like "[An analysis]{from counsel, }{John Smith*}{concerning} [company business]" where the third component "John Smith*" is any counsel name. It could be done by first manually identifying the counsel name and then copying the identified counsel name into the right component box or construction box to incorporate the name in the description. The same task can be performed by first searching the list of names against the name table to identify the counsel by using the investigative identity data search algorithm. From the search result, the member knows which is the counsel name and the exact spellings. The member can copy the name into the component box manually to construct the description or by typing a right letter such as "s" in the third component box to get all last names and associated first names. The keystrokes in the third construction box or third keystrokes in a single construction box triggers the browser to call the search program to retrieve attorney names in response to the typed letters. The arrangement of putting the search box on the data entry form not only eliminates the time for conducting manual search, but also reduces time for typing attorney names into the privilege log.

The investigative identity data search algorithm can be further incorporated in the construction feature. On the data entry page, a large input box is added for accepting source data for optional use. If the member knows who is counsel on the names list, this search box may be ignored and the member can directly type in the letter to retrieve counsel names in the component box. If the member is unable to identify counsel names from the long names list in the source data, the member can copy the names list as source data into the large input box to conduct a search. The result is returned and printed in an output box on the same page. Now, the member knows the attorney names. In the search process in the back end, the server retrieves all data from all primary boxes including names, find the names in the name table, creates a return page identical to the previous page, fills the data to the respective boxes, and sends the page containing search result with attorney names marks to the browser. Now, the member knows who are counsel, and copies all counsel names directly into the right component box, or retrieve counsel names interactively for the component box by typing right letters, or retrieve the names by typing right letters in right sequential order in a single construction box. This process not only eliminates manual search but also speed up data entry speed.

The phrase construction box for the description field should be placed in the last place on the construction form so that the member has all required data in the primary fields. In this case, the value for the third component may be copied from the primary input box for the attorney name field. This can be down by JavaScript that is triggered by the first keystroke in the third component input box or the third series of keystrokes in the construction box.

The third method is a server tool that allows for construction of a short phrase using the values in other primary fields for the same record. All of the data in the primary fields, which also serve as components, must have unique values. In this case, phrase construction can be performed without personal attention after all of required primary fields have been filled with unique values. The program must mark out all records that have missing component data. In addition, all resulted phrase should be verified in a quality control stage to ensure that errors from component incompatibility are fixed.

This function can be added to the data-entry page and the Edit Table page. On Edit Table page, the member can cause the browser to generate a line of input boxes for a data record by clicking the Enter Record button. Plural data entry lines may be created to accommodate plural data records. Due to space limit on the Edit Table page, the construction method of using a single construction box is preferred while the construction method of using plural component boxes can be placed on a normal data entry form.

The full screen edit function is available for conducting global table edit (FIG. 10F). The invoked page shows data records by pages and allows members to edit data records efficiently.

Data access right is determined by data access rule. The setting of private access for a database table allows a member to edit and delete only the member's own tentative records in the tentative or combined table while the setting of public edit allows the member to edit and delete any tentative records in the tentative and combined table. However, the data access rule in one version of embodiment does not prevent tentative records of other members from showing up in the validation table. On a validation table, the member can view all tentative records but cannot edit the tentative records created by other members.

The access scope for editing data records is determined by the project manager on the Setup page. Unlike the tentative tables, the Edit Table in one version of embodiment shows only the authorized tentative records. If the Edit Table is setup with the setting of public-edit, any of the members can view and change any of the records in the table. If the Edit Table is set up with the setting of private edit, the member can view and edit his own records that have not validated.

The tentative records that the member is not authorized to edit are shown as inactive records. The member can view and copy inactive tentative records, and paste them onto new records. The member cannot paste a record over a non-editable record. This function allows the user to copy a record and create a duplicate record by paste, if necessary.

While data access rule determines the potential records that could be editable, search function and page number navigation controller can further reduce the number of data records displayed on the Edit Table page.

The member can use the internal email system on the server to exchange email between the member and other members including the project managers (FIGS. 15A-15C). The links for invoking the email function are at the right top. The member can view received messages by clicking the Received Messages link, and view sent messages by clicking the Sent Messages link (FIG. 15A). A detailed email message, which has been opened by clicking its subject line, is shown in FIG. 15B. The opened message has a subject line, sender's information, message body, and links for attachments. It also has a Delete button.

The member may send message to project managers and other members. The member may send messages to the server administrator but cannot communicate with any of the members of other projects hosted on the same server. The page for sending email is identical to the page for the manager to send email. The member is allowed to include an attachment by using the similar method used on the manager email page.

The member can delete messages from the sent messages table and the received messages pages. In front of each of the message entries is a check box (FIG. 15A). On the far left column of the table header is a check box. There is a Delete button below the table. The member can select any of the messages and click the Delete button to delete it. The member can select all messages by clicking the check box in the table head and clicks the Delete button to delete all selected messages. For each deletion operation, the server will perform the operation upon confirmation of the intention by the member.

This system also provides a page for containing comprehensive instructions and project administration tools. On this page, a member can view procedural guidelines, substantive guidelines, and time sheet and payment histories (FIG. 16).

E. Personal Server Pad ("Personal Pad")

Figure 11A:
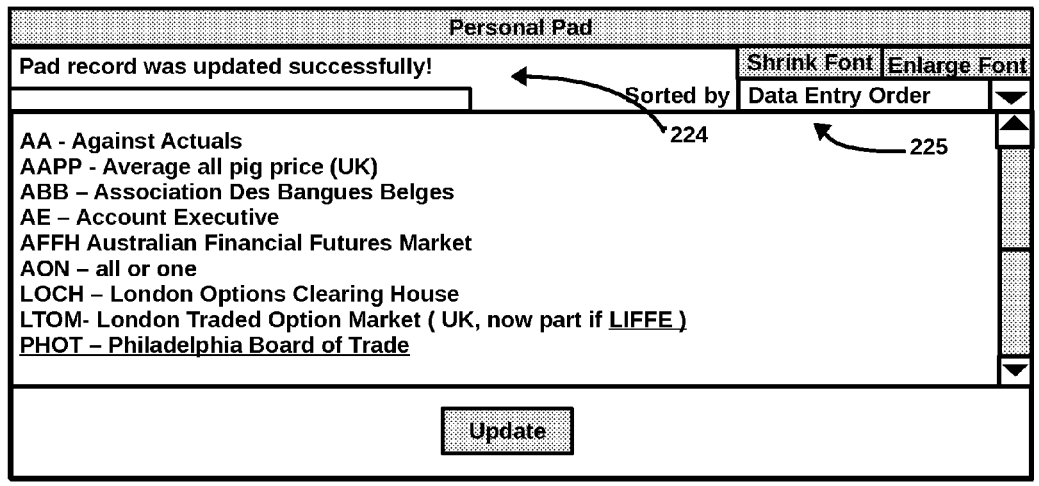
FIG. 11A shows the member's "Personal Pad," where the data pieces are shown in Data entry order.
Figure 11B:
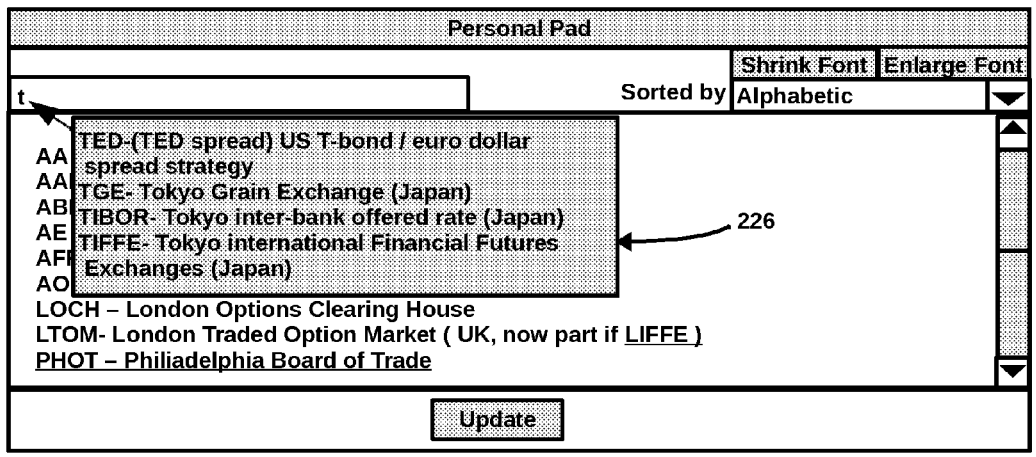
FIG. 11B shows the member's "Personal Pad" where the server has sent a list of data pieces that are responsive to the keys that the member has typed.

A server pad ("Personal Pad")is a server-driven notepad-like tool for storing casual information in casual format, but has a powerful capability for managing discovery information (FIGS. 11A-11C). The server pad has a large window box for writing data, a submit button for saving and updating the data, tools 225 for sorting saved data on the server, an query box for conducting conventional searches, and an input box 224 for interactively retrieving saved data. Its sorting, searching and interactive retrieving capabilities make it an ideal tool for storing a large amount of causal information for individual use.

When discovery or an investigation is conducted by a conventional method, an investigator must write down pieces of information in a handbook for later reference. If the amount of discoverable information is very large, the task of managing information is very difficult. The task can be unmanageable when an investigation generates many volumes of notes. The information includes person names, product numbers, important transactions, unknown codes, special dates, important events, special notations, and jargon.

A server pad has the looks of conventional notepad but has to work as a searchable database with conventional and interactive search capabilities (FIGS. 11A-11C). In implementation, a server pad is generated by the server and rendered on the browser of a client computer. A server pad allows a member to store information and use information in a later time. Unlike all other tables, the information on a server pad is not shared between different members. Each of server pads may use a dedicated individual database table. In the alternative, data of server pads for plural members may be saved in a common table, and data records can be marked by owner identities.

As a notepad, the data must be inputted in a continuous window. For the database table behind the browser, the data must be saved in records. Therefore, the data must be entered in the window by suitable delimiter. The most suitable delimiter is carriage return. When data are saved on the server, each of the data pieces is stored as one record in the table. Only this strange combination can meet all requirements for a server pad. This can be done in part because data format is unimportant in application.

When data pieces are entered on the pad's input window, they can be saved on the server by pressing the Update button when data pieces are shown in the original data entry order. Upon updating, the data are sent to the server and retrieved as a single text. The text is then broken up at all carriage returns or other predetermined delimiter positions to form plural data pieces. When the pad contains a certain number of data pieces, the server gets the same number of the data pieces and saves them as data records in the database table.

There are several ways to sort the data. Whenever a user clicks the drop-down box to select a sorting method from the possible lists (Data entry order, reverse data entry order, alphabetic order and reverse alphabetic order), it causes JavaScript to call a server program to retrieve the data pieces again, sort them according to the selected sorting method, and send the data again. This could throw away all unsaved changes on the pad. Therefore, the server pad throws a message to ask the member to save changes before proceeding with sorting. The data field of the server pad is searched by the global search function shown in FIG. 11C. The drop-down box for sorting in FIG. 11B is correspondant to plural view buttons in FIG. 11C. Each member can get only the data pieces from his own server pad.

The server pad has a normal local search function on the right top just above the drop-down box (FIG. 11C). This search tool is implemented for a different purpose. It allows the member to get all records containing the search key. If the member wants to find any data pieces that may contain "X.Y.Z.", a search for this key gets all records containing the key. The interactive search tool cannot do it.

The server pad has an interactive data-retrieving box (FIG. 11B), which is implemented by using Ajax technology. The member can retrieve data from the server asynchronously in the background without interfering with the display and behavior of the opened pad. Data may be retrieved using the XMLHttpRequest object or through the use of Remote Scripting in browsers. The technology may require more computing power and more network bandwidth.

The database table for server pads is the subject of global search. The database table (or records) for a server pad is limited to private use, and the global search function can retrieve only the server pad data that belong to the member.

A server pad may be installed on any system with two or more levels of management accounts. It can be installed in a system with only one-level project management or a system with a fixed project.

It is desirable to allow the member to display data on the pad by (1) data entry order, (2) reverse data entry order, (3) alphabetic order and (4) reverse alphabetic order. One of the problems to be solved is how to preserve all of those orders during an update of the pad.

The format information, which is important to the server pad, is relative data entry order and line breaks between data pieces. Since data are entered into a text input box, preservation of data entry order is a challenge. This can be seen from the following example:

| Order | Original Data Pieces | Final Data Pieces |
|-------|---------------------|-------------------|
| [1]   | Stone Park          | Stone Park        |
| [2]   | Alabama             | [New data]        |
| [3]   | Washington          | Alabama           |
| [4]   |                     | Washington        |

It is assumed that the server pad is displayed using the data entry order, the server gets each of the data pieces including blank lines, and assigns it with an data entry order number. After the pad is updated and saved in this mode, all data-entry order numbers are updated and saved. If a new data piece is inserted on the pad, and the pad is updated, this ordering numbers are renumbered. This does not change the relative data entry order. The general formats and blank lines are generally unchanged even though the absolute values of the order numbers are changed.

If the pad is displayed in a reverse data-entry order, a new record is inserted or an existing record is deleted, and the pad is updated, the order numbers are renumbered from bottom. If the user changes the display order back to the normal data entry order, the relative data entry order is still preserved. However, if the data pieces on the pad are displayed in an alphabetic order and are updated and saved, it is obvious that all format information on data entry order will be lost.

A successful implementation must allow the pad to update in four views: (1) normal data entry order, (2) reverse data entry order, (3) alphabetic order, and (3) reverse alphabetic order.

In the simplest implement of the server pad, after data are sorted in an alphabetic order and are updated and saved, the pad loses original order information. It is impossible to restore the original order of all data pieces. One solution to this problem is to disallow the member to update and save the pad when the pad displays its data pieces in an alphabetic or reverse alphabetic order. When the pad displays data in alphabetic or reverse alphabetic order, the pad is displayed in read-only mode. While the member can view and copy data for other uses, the member cannot enter data pieces into the main window. When the member tries to update the pad or enters data on the server pad, the member is asked to go back to the original data entry order view. While this solves most of the problems, it is slightly inconvenient to the member who needs to add data in an alphabetic order. The member can avoid this problem by building an alphabetic pad from the start. However, this implementation imposes an undesirable restriction on use.

To build a pad with the flexibility of using all four of the displaying orders, several problems must be solved.

First, when the pad constructed by a data entry order is displayed in alphabetic order, all blank lines will be moved to the top of the pad and all data pieces will be placed in proper orders. Therefore, it is desirable to suppress all blank lines on the top by not showing them on the pad. Since those blank marks are still necessary in the pad displayed in the normal data entry view, they are not deleted from the server. If those blank marks are actually deleted from the database table, their information must be saved in some way. If not, all blank lines in the normal view will disappear.

Second, the pad must have some order information tied to each of the data pieces. This would require the web page to use plural data input boxes. This would impose even more undesirable constrains. A solution to preserve the normal data entry order is to add an order field in the pad database table so that each of the data pieces on the web page is labeled with an order number. When a server pad constructed by the member is submitted to the server, the server assigns an order number to each of the data pieces and saves it in the order field and saves each of the data pieces in the related data field. The pad must allow the member to add data pieces in any positions and delete data pieces in any positions.

The data entry order number must be placed in the vicinity of each of the data pieces. One of the methods is to write label number in special brackets in front of each of the data pieces (e.g., "[3] ABC is a client"). This mark, like articles and white spaces, must be ignored in the interactive search function.

When the pad displayed in the normal data entry order is added with new data pieces and is submitted to the server, the server first gets the data order numbers. Newly inserted data pieces do not have order numbers. Assuming that the original order numbers (an order vector) is (top) (1, 2, 3, 4, 5) for five data pieces and a data piece is added at the second position, and two data pieces are added at the fourth and fifth positions from bottom, the server gets order numbers (1, E, 2, E, E, 3, 4, 5) where "E" means that the data piece has no order number or label. After an update, the pad has eight data pieces. In this case, the system renumbers the order numbers consecutively. Thus the final order numbers are (top) (1, 2, 3, 4, 5, 6, 7, 8). If one data piece is deleted at position 7, the server gets order numbers (1, E, 2, E, E, 3, [4], 5) where [4] mean deleted data piece. When the data piece at the position 7 is deleted, the data piece at position 8 is shifted to position 7. After an update, the pad has seven data pieces. In this case, the system renumbers the order numbers consecutively and relative orders of data pieces are preserved.

If the original pad (before the edit) displays the data pieces in a reverse data-entry order, the server first gets the data pieces and displays the data pieces on the pad. The data entry order numbers from top to bottom on the pad are (top) (5, 4, 3, 2, 1). The member then adds one data piece at the second position and two data pieces at the fourth and fifth positions from the top. Upon submission, the server gets order numbers (5, E, 4, E, E, 3, 2, 1) respectively for the data pieces. In this case, the system renumbers the order numbers in a reverse order so the final order numbers are (top) (8, 7, 6, 5, 4, 3, 2, 1). If a data piece is deleted at position 7 at the time of inserting two data pieces, the server gets order numbers (5, E, 4, E, E, 3, [2], 1) upon an update. When a data piece at position 7 is deleted, the data piece at the position 8 is shifted to the position 7. Upon updating, the pad has seven data pieces (7, 6, 5, 4, 3, 2, 1). In this case, the system only needs to renumber order numbers from the bottom to the top.

If the pad is constructed in a data-entry order but is displayed in an alphabetic order, the order numbers are no longer consistent with their appearance order on the pad. The pad has order numbers (top) (5, 4, 3, 2, 1) when the data pieces are displayed in the reverse data entry order or order numbers (top) (1, 2, 3, 4, 5) when it is displayed in the original data entry order. Assuming that the order numbers become (top) (4, 3, 5, 1, 2) when the pad is displayed in an alphabetic order, and the member adds one data piece at the second position and two data pieces at the fourth and fifth positions from the top. The order numbers the server gets for the data pieces are (top) (4, E, 3, E, E, 5, 1, 2) upon submission.

When a data piece is inserted in an alphabetic view, the inserting position is determined by looking at the preceding data piece (or the left neighbor data piece on the order number or the upper data piece on the pad). Therefore, it is reasonable to label those inserted pieces as next neighbors of the respective preceding data pieces so that when the display order is changed back to the data entry order their relationships are maintained. New data pieces can be renumbered in two steps. The first step is to write order numbers for all new data pieces by their left-neighbor values to get tentative order numbers: (4, E, 3, E, E, 5, 1, 2)→(4, '4', 3, '3', '3', 5, 1, 2). The second step is to renumber the tentative order to a final order: (4, '4', 3, '3', '3', 5, 1, 2)→(6, 7, 3, 4, 5, 8, 1, 2) where the single quotation mark means newly inserted data pieces. If the order is changed back to the data entry order, it would be (8, 7, 6, 5, 4, 3, 2, 1). The data pieces at positions (8, 6, 3, 2, 1) are the original data pieces while the data pieces at 7, 5 and 4 are inserted under the alphabetic order. This scheme maintains the basic order pattern of data pieces.

The rule for relabeling is to find data piece number, and change 5 to 8, change the second 4 into 7 and the first 4 into 6, change the third 3 into 5, the second 3 into 5 and the first 3 into 4). This renumbering algorithm ("right-to-left decrement") is not complicated. A pseudo code may look as follows:

(1) Compute the new largest order number for data pieces (M);
(2) Compute the largest search range: L=M;
(3) Set count c=0 and declare a temporary integer vector O[M] for holding order numbers;
(4) The program searches for the order number using L from right to left (or from the last index number to the smallest index number) in the original order vector;
(5) If it finds the large number L, write M−c in the temporary vector for storing new order numbers at the same index position; and assign c=c+1 and continue to search for next L by repeating step (5) until it hits the first different order number;
(6) Make assignment L=L−1 and start the next cycle at step (4).

Step 5 is an inner loop that goes through the whole order vector. Step 4 actually triggers the outer loop for going through the order number value ranges. For any value of L, the search must go through the entire order vector or until the program detects a decrease in its value in the original order vector. In other words, the inner loop may be broken when the program finds a decreased value.

Obviously, the renumbering algorithm could be implemented by a left-to-right increment rule. It starts with the smallest number of 1 and labels them with an increment value until it reaches the number of data pieces.

Assuming that the member deletes the first data piece, adds one data piece at the second position, the fourth, and the fifth position from the top of the pad respectively, and deletes one data piece at the seventh position ([4], E, 3, E, E, 5, [1], 2). Since the deleted data pieces are actually deleted from the pad, the final data pieces that the server receives are (top) (E, 3, E, E, 5, 2). The server then updates the database table to reflect the changes. Since the pad is displayed in an alphabetic order, the server then marks the new data pieces by left neighbor's value (E, 3, '3', '3', 5, 2) where the quotation marks mean its quoted data pieces are new. However, the first data piece has been deleted, the first new data piece is assumed to be close to the next record ('3', 3, '3', '3', 5, 2). The server then finds the largest number 6, and renumbers the order numbers (top) ('3', 3, '3', '3', 5, 2) as follows: change 5 to 6, the fourth 3 to 5, the third 3 to 4, the second 3 to 3, the first 3 to 2, and 2 to 1. The final numbers would be ('2', 3, '4', '5', 6, 1).

If the pad is displayed in the data entry order, it would be (top) (1, '2', 3, '4', '5', 6). Data pieces at the second, the fourth, and the fifth positions are new. The first data piece and fourth data piece in the original pad have been deleted. If the original data pieces are shown in the original order right after the deletion ([1], 2, 3, [4], 5) but before the insertion, the pad would show the relative positions (2, 3, 5). In other words, their order numbers have been changed from (2, 3, 5) to (1, 3, 6). The changes in order numbers (2 to 1, 3 to 3, and 5 to 6) are due to insertions and deletions. Thus, their relative positions are preserved when the pad is shown in the original data entry order.

When the pad shows the data pieces in an alphabetic order, the data pieces are ordered according to their alphabetic positions. After the pad is displayed in the data-entry order again, the pad shows the data entry order by the order numbers. Some information such as blank data pieces is also preserved.

If the pad is updated when it is shown in a reverse alphabetic view, the newly inserted records may be numbered in the ascending order. Assuming the data-entry order is (top) (1, 2, 3, 4, 5) and the reverse alphabetic order is (top) (2, 1, 5, 3, 4). The member deletes the first piece, adds one data piece at the second position, the fourth position, and the fifth position respectively, and deletes one data piece at the seventh position ([2], E, 1, E, E, 5, [3], 4). Since the deleted data pieces are actually deleted from the pad, the final data the server receives is (top) (E, 1, E, E, 5, 4). The server first has to mark those new data pieces by right-neighbors' values ('1', 1, '5', '5', 5, 4) where the quotation marks mean its quoted data pieces are new. However, if the first data piece has been deleted and the next first data piece is new, it is assumed to be close to the next left data piece. The server next changes the order numbers from ('1', 1, '5', '5', 5, 4) to ('2', 1, '6', '5', 4, 3). In this case, the data pieces are renumbered by a left-to-right decrement rule. The server first finds the largest number 6, and renumbers the order numbers as follows: change the first 5 to 6, the second 5 to 5, the third 5 to 4, the 4 into 3, the first 1 to 2, and the second 1 into 1. If the data pieces on the pad are shown in the data entry order, its order is (1, '2', 3, 4, '5', '6'). The original data pieces' relative pattern on the updated pad is (1, 3, 4) after it displayed in data entry view. Right after the deletion, the data pieces could be (E, 1, E, E, 5, 4) and their relative pattern would be (1, 4, 5) in the normal data entry order. Therefore, the relative positions of the three original data pieces are preserved. It is evident that if the member wants to enter the pad in alphabetic view or reverse alphabetic view, the member can always provide a unique number with brackets in front of a newly inserted data piece to define its order position for normal data entry view. It is possible that some order numbers are in duplicates. The program must be able to handle duplicate order numbers that are entered by mistake.

A server pad may have tool for conducting interactive search. Data may be retrieved interactively by using the XMLHttpRequest object or through the use of Remote Scripting in browsers. In one of the preferred embodiments of the present invention (FIG. 11B), when the member types in a letter in an input box for interactive search, the server in response shows data records responsive to the letter. If the member types "t" in the input box, the server shows all records starting with "a" in the selection box 226. If the member types a second letter "r", the server shows all records starting with "tr." This implementation allows the member to find information at fast speed. After the member finds a data piece, the member may move the cursor to the data piece and clicks it. Now, this data piece enters into the selection box for further use. The member may copy this data piece into the system's clipboard for further use. In the alternative, the member may select the data piece by moving the cursor to the data piece and dragging the cursor to the end of the data piece, and pressing on Control-C to copy the selected data piece on the clip board for later use.

In one version of the embodiment, a conventional search box is placed on the top of the server pad for conducting inclusive search (FIG. 11C). The purpose of this search tool is to allow the member to find any data piece that contains a search key. If a data piece contains "His contact is known as "X.Y.Z.", the key "X.Y.Z." retrieves this data piece. This search tool is a local function and cannot retrieve records from other configurable tables. Its implementation is substantially same as all local search tools for other tables.

The Investigative Identity Data Search Algorithm ("IIDS") and web module (to be discussed later) can be used to search member's server pad. Search methods, which are originally intended to search a single database field such as the comment field and the firm name field, can be modified to search data pieces on the pad table.

Other features include the function for setting up font size, which can be saved in a database table. Font setup for each of the server pads is persistent. Also, since some data pieces may be entered with spaces to provide required format, the selection box for the interactive input box is implemented with spaces, articles and embedded order numbers being ignored.

For a system hosting one or more discovery projects, the number of the members is unknown. For this reason, the pad table cannot be created for a member before the member has a user account. A database table or required entry in shared tables for a member can be created when the account is assigned or when a member logs into the account for the first time. If the database table is created upon account creation and the member did not login and use it, the system waste the storage space. In the preferred embodiment of the present invention, a pad database table is generated when the member logs in for the first time. When the member logs in for the first time, the member is prompted to provide some basic contact information such as email address, name initials, and full name. Upon submission, the server saves the account information and makes a call to the program for creating the database table for a server pad. In one version of the embodiment, the pad table may have field structures: pad_stru(usr_id int NOT NULL primary key, record_size int NOT NULL default '500', font_size int NOT NULL default '9'). Order number is not used in this database table.

F. Investigative Identity Data Search Algorithm ("IIDS")

In many investigative cases, the information about personal identity data is incomplete and inaccurate. When an investigation involves a large number of people and a large number of documents, it is often necessary to build database by using whatever information is available. Likewise, the source names such as the recipient names in email or other documents are often incomplete or inaccurate or misleading. In a typical database and in common documents, people names may be given as email address, initials, first name, last name only, capital initials, and even a notation. Likewise, a variety of company names can be written in abbreviations.

The algorithm and web module disclosed herein allow a user to find all records which would be matches, or records related to an identity datum in some way, but generally should not retrieve records that can be excluded on its face. Thus, whenever an identity datum is incomplete or inaccurate, the program must be able to find all records that may be correspondent to the identity datum.

The algorithm and web module may be installed on any system with two or more levels management accounts. It can be installed in a system with only one-level project management or a system with a fixed project. One version of the embodiments of the present invention is shown by the FIGS. 13A-13F.

When the algorithm is implemented as an Internet web module, the server first generates a user-interface page shown in FIG. 13A. This page contains an input box 234 for accepting name list, which is referred to as source data. At the top, a link "Normal View" is for returning to the home page. Below the input box are two mutually exclusive radio buttons: Default Search and Current Search Setup 235. The member can click Default Search button to use the default setup to conduct a search or click the Current Search Setup button to conduct a search using the current setup. Different search methods may be referred to as "search mode."

The page for "Default Search Setup" is shown in FIG. 13B. The page for Current Search Setup is identical to this page except that it has no "Save" button and "Revert to Common Mode" button. The difference is that the member can set up or modify the default setup page and save the settings in a database table. Thus, the settings are persistent until they are changed. In contrast, the current search setup is not saved, and it is persistent only throughout a connection session. After the user logs out the server and logs in again, all member's current settings are gone. The current settings are system's current settings generated by the server. It is convenient for the member to change any setting and submit a search.

After the member selects match methods and other settings, the member copies source data containing people's names, email addresses and other identity data into the large input box, and submits the page to the server to search the source data in the name table containing about 1200 records. The server returns the result shown in FIG. 13C.

The program gets all identity data such as names and email addresses as search keys. The server finds John Smith for Fleming because John Smith's initials is mentioned in the comment; it finds Dean Smith for Dean Smith because both names match precisely; it finds Jack Farrell for David Franklin because Jack Farrell's boss would be David Franklin; it finds Charlotte Anderson for ABC because ABC would be her initials, it finds Kristina Vinson because she is part the ABC firm; it finds Laura Bumpus for the key X.Y.Z. because Laura Bumpus is married to X.Y.Z., and it finds Xerron Zedon because X.Y.Z could be Xerron Zedon's initials. This search gets useful information which otherwise could require tens to hundreds of individual searches.

The program also allows the member to click the link 239 "Show Names not Matched" (on top of the result) to see a list of identity data that are not found in the name table (FIG. 13D). The latest version of embodiment has added function for selecting identity data and adding them to the name table.

By using the Setup page shown in FIG. 13B, the member can select a delimiter for separating the identity data from three choices: comma, semicolon and carriage return. The program also allows the member to select mark words such as "from", "to", "sent" and "beginning of message" as the start marks for defining search ranges (also known as "segments" or "key segments"). The program allows the member to keep track of identity data from different segments, accepts plural line breaks as the separator between any two segments. The end mark for any of the defined segments may be a start mark for the next segment, a defined end mark, or plural line breaks. Ignored words are words that are inside the search ranges or segments but should not be used as search keys. An ignored range is a range of text that is within a defined segment that should be ignored. An ignored range is defined by a unique start mark and a unique end mark. The start and end marks for defining ignored ranges must be different from the marks for defining search ranges or segments. The member can create two boxes for accepting a start mark and an end mark by clicking the More Range link (or the Add a Range link) once and removing a pair of input boxes by clicking the Less Range link (or Remove a Range) in FIGS. 13B, 14B. The start marks and end marks should be unique relative to the source data. They cannot be part of common names, person's initials, and email address. If a person's name is "from", this name must be handled specially. A page can be submitted for search with search ranges, ignored words, and ignored ranges undefined.

After a segment is broken up, it becomes plural identity data. Each of the identity data may be one of the following four forms: (1) two or three names, (2) one single word, which may be a last name, first name, notation, number, and acronym, (3) email address, and (4) obvious initials such as "A.B.C.", "a.b.c." and "X.Y." Identity data include company name, law firm name, and other business name.

Match methods must be selected in light of the source data and the structures and content of the database table. A successful algorithm must have the flexibility to select different match methods. In a typical investigative discovery, unknown name, notation, initials and relationships with other persons and firms are often put in a comment field or a note field. A short name and notation could be put in a name table as first name or last name by mistake or according to a default database construction rule.

Match methods include basic match methods and selectable match methods. Some match methods include: (1) full name match, email address match, and acronym match, (2) first initial-and-last name match, (3) obvious initials and first letters of names match ("J.S." with "Jack M. Smith"), (4) obvious initials and comment match, (5) multi-part-names and comment match, (6) small initials (e.g., "job") and comments match, and small initials and first name match, (7) single word and first name match ("John" with "John Stone"), (8) single word and last name match ("Stone" with "John M. Stone"), (9) single word and firm name match, (10) first name match only ("John Black" with "John Stone"), and (11) last name match only ("Jack Stone" with "John Stone"). Some of the match choices may be combined as one selectable choice in the setup.

After the member changes any of the settings and submits the page for a search using the current search settings, the server returns search result as shown in FIG. 13C. If the member wants to use the same settings for many searches cross login sessions, the member can select the default search method. By clicking the View link, the member can see the default search settings. If the member wants to change any of the settings, the member can use the link "Setup" to change them and save the changes upon clicking the "Save" button. The settings are persistent as long as the member uses the default search settings because the setting values are saved in a database table. In implementation, when the member uses default settings, the search data submitted from the browser contain a flag signaling that the search is a default search. The program gets setting values from the database record for the member. In the alternative, the values for default settings may be embedded on the web page. When the member opens the default setup page, the values of the default settings are retrieved from the record and are placed on the search page. The browser could pass the values back to the server for use without retrieving setting values again.

If the format and substance of source data vary from search to search significantly, it is preferable to select the current search method. In this case, the member can change any of the settings on the setup page, provide source data, and submit the page for a search. The program gets the setting values and uses them to conduct a search and returns search result according to the settings.

Figure 13E:
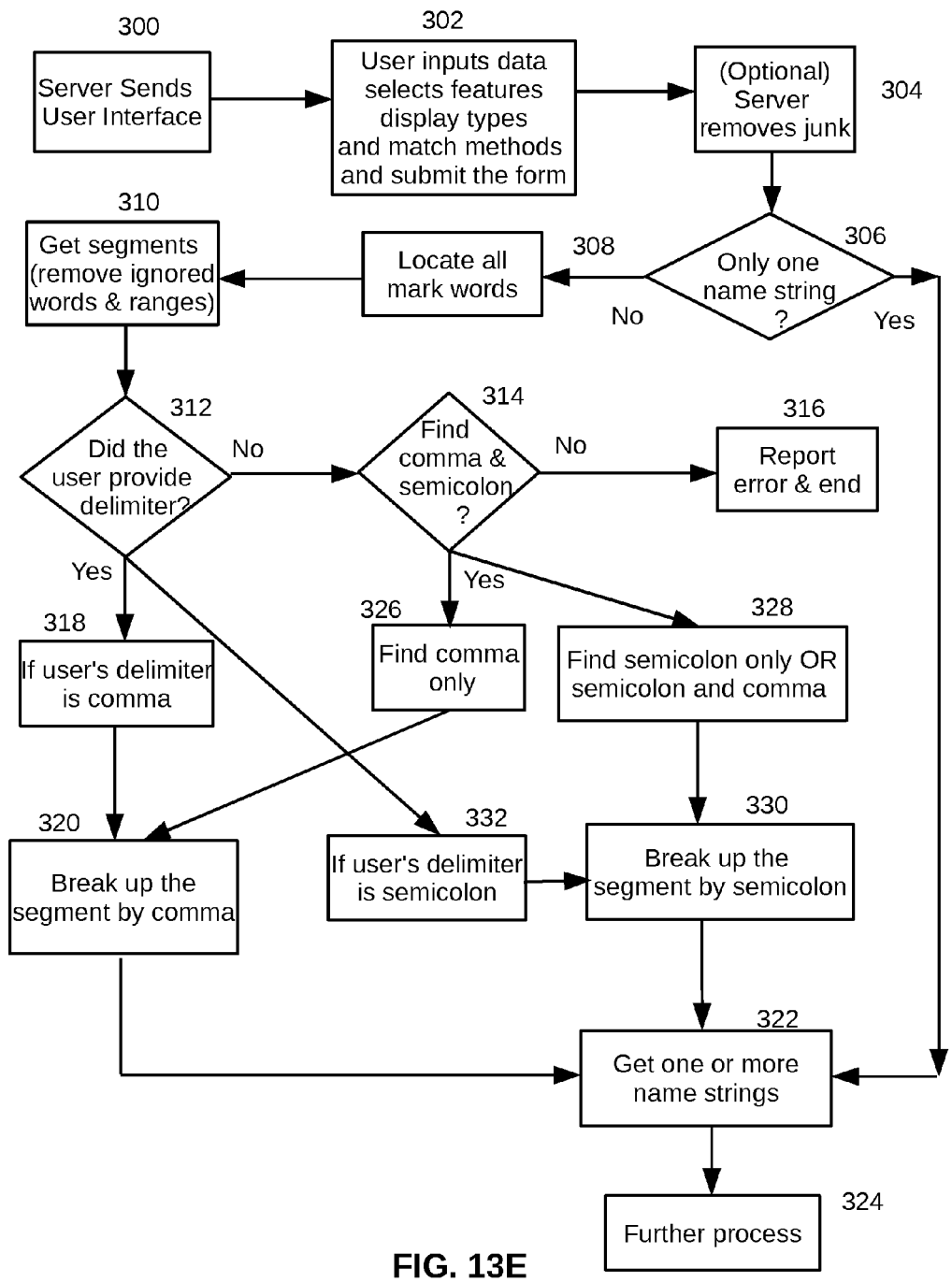
FIG. 13E is a flow chart showing the pre-processing of identity data before conducting an investigative identity data search.
Figure 13F:
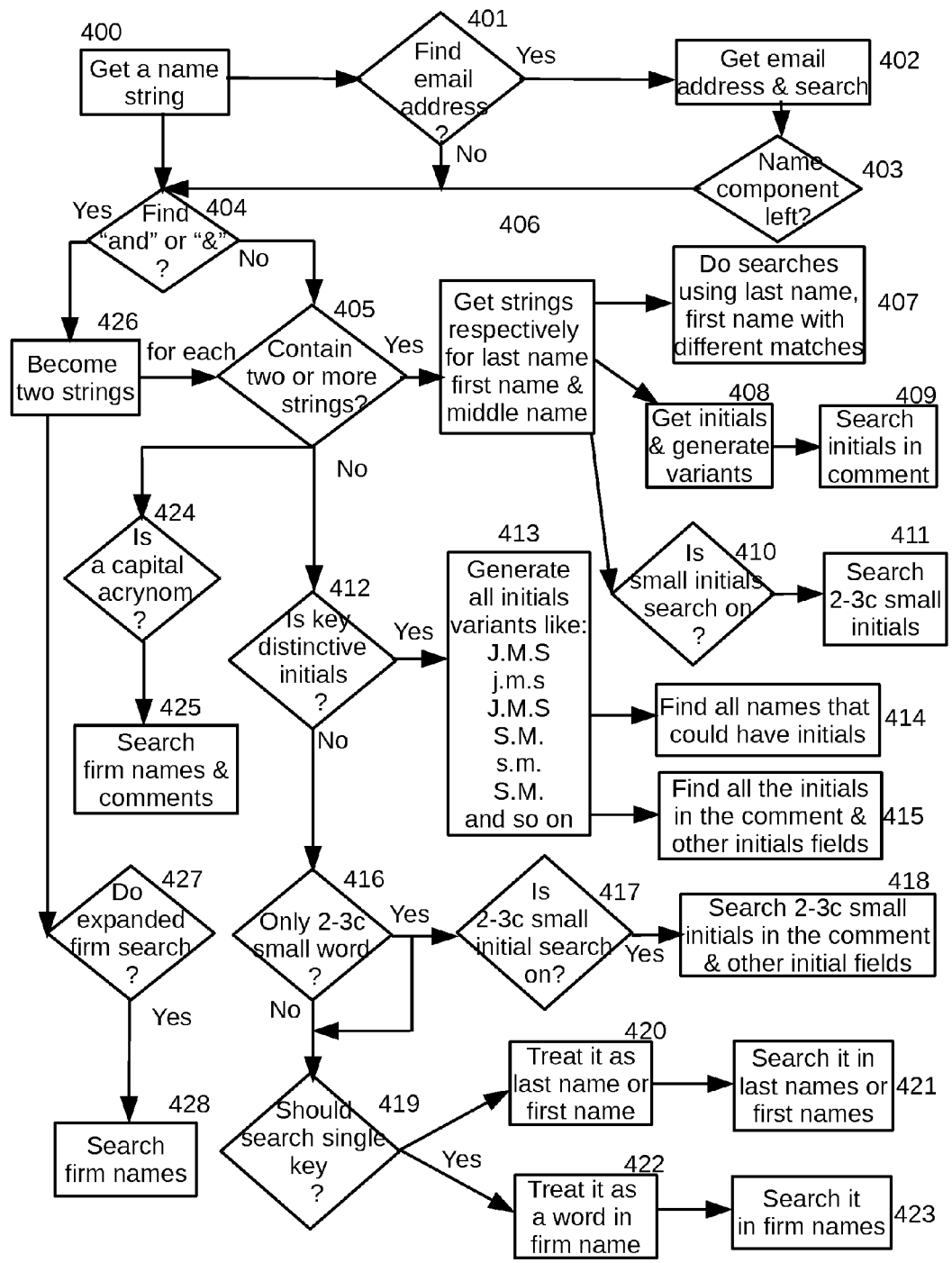
FIG. 13F is a flow chart showing the process for conducting an investigative identity data search.

The process for conducting investigative identity data search is described in FIGS. 13E, 13F. To access the page, the server sends a user interface page for identity data search at Step 300. The user then sets up search settings at Step 302 if it is necessary. The member can conduct a search by using the previously saved default settings or current settings to conduct one or more current searches.

The source data may be copied from the address area of email and documents. Some of the data may contain garbage such as special characters, control character and other characters that are not used in ordinary documents. The garbage may interfere with the search function and, therefore, should be removed at Step 304. Garbage characters may be replaced by nothing or replaced by spaces if the spaces are not used in the source data as segment separators. This would result in plural spaces in some places, which can be eliminated by repeating operations of replacing two spaces by one space. The alternative method, which is more efficient, is to go through the entire source-data string, evaluate characters, and copies only those good characters to a new string while skipping bad characters.

Since many searches may be done for one person's names containing two or four words, the server determines if the source data contain only 2 to 4 words or a single identity datum (Step 306). If it has only one identity datum, the server directly uses it for search without going through the range analysis. If it finds more than one identity data, the program must break up the source data into segments and further into personal identity data.

Common identity data can be represented in the following examples: John M. Smith <jms@test.com>; "John M. Smith"<jms@test.com>; "john.smith@test.com"; John M. Smith, Jr.; John Smith; Smith, John M.; Smith, Jr., John M.; Smith-Park, John M.; J. S. M; John; ABCD; John and Smith; Black & White. Many of those examples may have spelling variants. Initials may contain two letters, and acronym may have fewer or more letters. The rule for identifying a single identity datum may be stated as follows:

(a) An identity datum that contains an unbroken email address, the name component has no more than 2 spaces;

(b). An identity datum that contains two or three words (John J. Smith) without comma, semicolon, "and" and "&";

(c) An identity datum that is not an email address and is of reasonable length without any space within;

(d) An identity datum that contains "and" or "&" and have 3 substantive words may be treated specially or rejected as error;

(e) An identity datum that contains "and" or "&" and have more than 4 words may be treated specially or rejected as error; and (f) Any comma and semicolon at beginning or at end is ignored and be removed.

The function for recognizing identity data does not have to be perfect. If the program is unable to handle confusing source data, the member can always change the format of the source data before next submission. Item (c) can be further divided into several sub-types.

A good implementation should allow the program to handle identity data with special designations such as Jr. Sr. I. II. When those symbols are present, they are treated as part of the last name. "Smith, Jr." is treated and counted as one single last name. Those special designations are not counted as a separate word. In addition, the comma before the designation is not counted in subsequent analysis. The program has to treat them specially and should not break up identity data at this comma position. Since those designations appear infrequently in discovery projects, this treatment is merely a preference but not a requirement. If the functions for handling exceptions are not implemented, the program returns error messages or return incorrect results for those identity data. It will not affect the rest of the identity data from the source data.

The program has code for handling the special case where a segment contains only two or three words with a comma. "Smith, John M." could be treated as two persons delimited by comma. One option is to explore all possible cases. Since the program does not use a name dictionary, the server cannot ascertain whether a word is a last name or family name. Also, many foreign names can be used as both first name and last name. The comma could be the separator between two persons. In this case, the program can conduct three searches (1) "Smith" as a first or last name, (2) "John M." as a first name and middle name, or as a first name and last name, or a last name and middle name, and (3) "John J. Smith" as first name, middle name and last name.

The program uses "Smith" as a last name to conduct a search and as first name to conduct a search. Second, the program uses "John" as a first name and "J" as a last initial to conduct a search, uses "John" as a last name and "J" as a first initial to conduct a search, uses "John" as a first name and "J" as a middle initial to conduct a search. Finally, the program conducts yet another search by using "John" as a first name and "Smith" as a last name to conduct a search. While those permutations are not necessary for this particular example, they could help the member resolve inadvertent name misarrangements or a confusing identity datum such as "Suns, Jqit Zogt". Even an intelligent human cannot tell whether it means one person or two persons (or even an object or business entity). The program displays all records that satisfy various match criteria. All of those exploratory match methods may be implemented as one or more switchable functions. Those match methods may be turned off if neighbor identity data in the same source data reveal their writing convention.

Another exploratory match method arises from the treatment of phrases containing "&" and "and". These two words are often used as a conjunctive word between two persons, and such structure is often used in law firm, company and other business names. For example, "Black and Stone" may mean two persons or one business entity. One method for treating this type structure is to pass it to the program for further processing. In this case, the program should add a step for recognizing the type of structure. "Black Green & Stone" could mean three persons or one business entity, but "Black Green and Blue Stone" most likely means two persons or even two business entities (but it cannot be one business entity). "Black Green Blue and Stone" may mean four people or one business entity. The switchable functions are implemented to recognize those common structures.

Source data may have plural segments, each being corresponding to a search range (also known as "segment"). The program finds all ranges by looking for unique marks in the source data and gets each of the ranges or segments for further processing (Steps 308, 310). This operation is especially useful when the source data is copied from email address portion. Email address portion normally contains certain words like "from:" "to:" and "sent:" in front of email addresses or sending date. One reason for breaking up the source data into plural segments is that those words are not used in common people names. Another reason is that it is desirable to list the email addresses and names by sender, recipients or cc recipients in the search result. Thus, those words can be conveniently used as marks for identifying segments and the marks for tracking the identity data.

The start marks and the end marks may be paired or unpaired. When a start mark and an end mark are paired, a range is defined by the start mark and only the end mark that is associated with the start mark. Paired end marks may be useful only in certain cases that require unique end marks.

The program extracts segments that are defined by a start mark and the closest next start mark, a start mark and the closest end mark, or a start mark and plural closest lines breaks. In implementation, the program needs to search through the source data for each of the start marks. When the program finds a start mark, it then searches for one of the end marks. If it finds an end, it treats the range as a segment. If the start mark has a paired end mark, the program searches for the paired end mark at the second position. After the range is copied, the program then moves the search position to end mark, and repeats the process of searching for start marks and end marks, and identifies and copies the second range. The program then jumps the search position again and repeats the process until the program reaches the end of the source data.

The program may be implemented by one single trip: the program searches for all start marks until it finds one, saves the position as X, and starts searching from X until it finds the closest end mark or a paired end mark at position Y. The program copies the first range from X to Y for later use. The program assigns Y to X, starts searching from X until it finds the closest end mark or paired end mark at Y, and copies the range as a second range. In email, an end mark is normally next start marks. Thus, the program just uses the first end mark as the start mark for the second range without conducting a search. In this case, use of unique end marks is not necessary.

Each of the key segments may contain words or ranges that should be exempted from searches. Those unnecessary words and ranges are referred to as ignored words and ignored ranges. The program has this optional feature to remove ignored words and ignored ranges from each of the segments (Step 310). If the member has provided ignored words, the program searches for them, and remove them if the program finds them. This can be achieved by replacing an ignored word by nothing. Each of the ignored words can be eliminated by the same method.

If the member has defined start marks and end marks for ignored ranges, the program identifies the ignored ranges by finding the start marks and end marks for ignored ranges. If the program finds an ignored range, it removes it, for example, by replacing the range with nothing or by copying the first segment, skipping the ignored range, and copying the remaining range. One version of possible pseudo code may be as follows:

(1) Start searching for start marks for ignored ranges at position S=0, where S is absolute index position in the segment string;

(2) Find a first start mark at X and the closest end mark or paired end mark for ignored range at Y, where X and Y are relative to S position;

(3) Copy the first sub-segment (from S to S+X−1) and paste the value to product string P[ ];

(4) Move search position to Y or do assignment S=S+Y; and (5) Start a search at S for start marks for ignored ranges, find a start mark at (new) X and the closest end mark or paired end mark at (new) Y, copy the first sub-segment defined by (S to S+X−1) and append it to P[ ], skip the sub-segment by assigning the search point S=S+Y, and repeat the process at step 5.

By using this scheme, the program can remove all ignored ranges from the segment efficiently. This step may be placed after the step of cleaning up garbage and the step of identifying single identity datum. If the program finds that the source data contain identity datum for one person, the program bypasses both the step of finding segments and the step of removing ignored words and ranges. If the program finds that the member has not provided ignored words, and start marks and end marks for ignored ranges, program skips these operations, regardless of the length of the source data.

On the setup page, the member can provide one or more ignored words or one or more pairs of marks for ignored ranges so the program uses them to remove ignored words and the ignored ranges.

If a segment contains more then three words (more than two spaces) without counting the special designation words, the program breaks up the segment into plural identity data. In addition, the program may handle certain short segments in a special way.

The program first determines if the member has provided a delimit at Step 312. If a user-provided delimiter is found at Step 312 and if it is a comma (Step 318), the program breaks up the segment by comma at Step 320. If the user-provided delimiter is a semicolon (Step 332), the program uses semicolon to break up the segment at Step 330. If the user did not provide delimiter at Step 312, the program searches for both comma and semicolon at Step 314. If only more than one comma are found without semicolon at Step 326, the program breaks up the segment by comma at Step 320. If at least one semicolon is found with or without comma at Step 328, the program breaks up the segment by semicolon at Step 330. At the end, the program obtains plural identity data, each of which is for one person and fills each of the identity data in designated variables. The purpose of this process is to break up the segment only, and any abnormal values in any of the identity data may be reported as error in a later stage.

The program breaks up the segment at each of the delimit positions exclusive of the delimiter itself and fills each of resulting identity data into designated variables. If the program finds more than one comma without any semicolon, the program breaks up the segment at each of the comma position. If a segment contains at least one semicolon, it uses semicolon as delimiter. If a segment contains both comma and semicolon, the program uses semicolon to break up the segment. In this case, comma will be treated as the separator between a last-name and a first name in a later stage of processing.

If the member has selected one of the available delimiters, the program breaks them up according to user-selected delimiter without exception. However, in the case where the member does not provide delimiter, a rule may be in place that identity data containing two or three words should not broken up by comma. Their plurality nature should be handled in a later names-recognition stage. Possible plural identities can also be taken care of by selecting inclusive match methods that allow a single name (e.g., a single word) to match with first names and last names, respectively.

The program in the name recognition step breaks up each of the identity data into four fields: email, last name, middle name and last name, and store them in designated variables. When no value is available, the designated variable is empty.

Those identity components may be stored in string vector such as Java string first_name[ ], last_name[ ], middle[ ], and email[ ]. The component data defined by an identical index number are for the same person. Two-dimensional string may be used for tracking segment origins such as "from" and "to." To track segment origins, data structure like union in C and C++ in C implementation may be used to store the data.

The program first gets an identity datum at Step 400. The program determines if it has email address at Step 401. If it has a good email address, the program gets the email address. The program can recognize email address like XYZ@STRING.ABC.NC, where XYZ is a continuing string without any space, ABC may be com, net, pro, edu, org, and NC is optional two letters. The program may just recognize the structure like "@anything.XXX" and get the complete email address by getting the entire string. If the program gets an email address, the program saves it in a designated string variable and uses it to search in the email address field of the name table. If an independent email address field is not declared, the search may be made against the comment field.

If no email address is found, the identity datum is directly passed to next Step. The program searches for "and" and "&" at Step 404. It is necessary even if a preliminary search for "and" and "&" has been performed for source data containing single identity data. The reason is that some of the short identity data would have a structure like "Green and Black."

The name components in the identity datum are recognized by word count and the presence and relative location of the comma within the identity datum. In counting words, the program ignores special abbreviations like Jr. Sr. I. and III. The general rules for recognizing multi-part names are:

(1) If an identity datum has two words without a comma, the first word is taken as the first name and the last word is taken as the last name. In this case, it is assumed that no middle name exists. An example is "John Smith".

(2) If an identity datum has two words with a comma, the program checks the location of the comma. If a comma is at the far left or far right, the program ignores it, if the comma locates between the two words, the first word is taken as the last name and the last word is taken as the first name. Some examples are "Smith, John" and "Smith-Park, John" and ",Smith, John," where the first comma and the last comma are ignored.

(3) If an identity datum has three words without comma, the program copies the first word as the first name, the second word or initial as the middle name, and the last word as the last name. An example is "John Mac Smith."

(4) If the identity datum has three words with a comma and if the comma locates between the first word and the second word, the first word is taken as the last name, the second word as the first name, and the last word as the middle name. Examples are "Smith, John M." and "Smith-Park, John M." The program is able to recognize special letters such as Jr. Sr. I. II. and III., and does not count them in the total words. The program can correctly recognize "Smith, II, John M." and "Smith-Park, Jr., John M."

In breaking up identity data, the program assumes that all of the identity data are generally written in the same format. If a last name is written in front in one identity datum, all last names are placed in front. Plural functions may be developed, each for recognizing one of the common patterns discussed above. The functions are respectively for recognizing the common patterns. When a function recognizes a multi-part name pattern successfully, it gets all components and returns a success return code. The program tries to recognize and breaks up the first identity datum from a segment by calling those functions in turn until a success code is returned. Then, the program uses the same function to recognize and break up the remaining identity data from the same segment. The program tries to use other functions only if it has been unable to break up an identity datum. This feature can improve efficiency.

In another version of embodiment, recognition function may be implemented as a single function for recognizing all common patterns. The logic for implementing this unified function is as follows. The program first counts the words excluding the special abbreviations and designations. The function has three conditional clauses, respectively, for count=2, count=3 and count=4. Each short name must fall within one of the conditions. Within the count=2 clause, the program determines the existence and the location of comma (with the ending comma ignored). Under this clause, the program determines which name patterns the identity datum belongs to by looking at the comma location. It does similar analysis for three-word datum (count=3) and four-word identity data (count=4). An error code should be returned if an identity datum has more than 4 words. Identity data containing more than four words must be treated manually since they are encountered rarely.

After the breakup of a segment, it is still possible to run into certain unique structure such as "John Smith, xyz." The presence of this structure may be due to writer's error in using delimiters. The program regards the first two words as a complete name and the third word as a partial name for another person. This third word would be a first name, a last number or an abbreviation. This kind of structure may be taken care of before the recognition step.

After a segment is broken up, each of the resulting plural identity data is stored in a designated string variable. In the alternative, the recognition step may be performed immediately after an identity datum is returned from the breakup step. In this case, the program has to store components data in designated variables.

The match steps are shown from Steps 405 to 419 and all their downstream steps in FIG. 13F. The details of the steps are discussed later. The match rules are developed for a name table containing a first name field, a last name field, an optional middle name field, a type field, and a comment field. The email address field in the name table is optional because it may be put in the comment field.

Middle names in identity data are shown in the search result along with middle names from the name table so that the member can easily tell whether middle names really match. Middle names could be treated as part of the first names as long as the middle names are entered as an appendage to the first names or treated as a separate field. If middle name is used as match criterion, it is preferable to have a middle name field in the name table. A difference in two middle names could be conclusive evidence for distinguishing two identity data. A setting for turning on and off middle name match may be added to the setup page.

The basic match rule is that when a last name and a first name from an identity datum match with the last name and the first name in the record of the name table, a perfect match is found. The identity datum "John E. Smith" may be matched with the records containing the following data in the database:

| Case | Inputted Key | Target Data in Name Fields |
|---|---|---|
| 1 | John E. Smith | John E. Smith; John Ellen Smith; John Smith |
| 2 | John Ed Smith | John Ed Smith; John Eds Smith (Not John Z. Smith) |
| 3 | John Smith | John H. Smith; John B. [X]; [X] H. Smith |

Middle name is ignored if either side does not have it. However, middle name may be used to exclude a match. Thus, the program would not retrieve "Smith, John Z." for "John Ed Smith" because the presence of "Z." indicates they are two different persons.

When a record in the name table contains only a first initial rather than a full first name, a match is found if the first initial in the record is the same as the first letter of the first name in the identity datum. While this could generate false hits, incomplete names are used in the name table only when complete first names are unknown.

When a record has a missing first name or last name, the program has the option to not retrieve the record or treat the missing part as a match. In case 3, the program matches "John" with first name John and matches "Smith" with last name "Smith." This liberal matching method will not give rise to too many false hits because a majority of name fields have values. First name or last name of a person may be unavailable from an important document, but the person may be critical.

Two email addresses match if they are identical. However, their cases will not affect their match.

The last name plus first initial match method includes the following cases:

| Inputted Key | Target Data in the Name Table |
|---|---|
| J. Smith | J. Smith; J. Marc Smith; Jack Smith |

By using this match method, the program matches the last name with the last name field and the first initial with the first name field. The first name is considered as match if a first initial is same as the first letter of the first name. Middle name is ignored if either side does not have it.

Multi-part names are matched with the names in the comment field. The comment field plays an important role in defining the relationships between different people. First, the database table may contain tentative records that do not have full names. In this case, some information may be placed in the comment. Second, some of the persons may be identified as initials without full names. The initials may be put in the comment field or the first name field by mistake. For example, a comment may include a note like "X.Y.Z. is a contact person for this person (e.g., John Smith)." Third, personal names may be referenced in comments (e.g., "Jack Stone once represented him in his criminal case"). Also, when a document is produced in a questionable transaction, it may contain code names, abbreviations, and initials and partial initials. Such information may be encountered infrequently but must be seized in every opportunity.

The program should be able to find names in the common forms in comments.

| Case | Inputted Key | Target Data in the Comment Field |
|---|---|---|
| 1 | John Smith | "John Smith" "Smith, John" |
| 2 | John M. Smith | "John M. Smith"; "Smith, John M." "John" or "Smith" |

"John Smith", "Smith, John", "John M. Smith", "Smith, John M." are name variants which arise from different arrangements. "John M. Smith" has four common name variants. Searches may be conducted to find the name variants. Searches may be conducted to find all comments that contain first name, last name, or both of the two names. To avoid excessive false hits, first-name-only and last-name-only match methods for searching comments should be implemented as switchable functions.

A person identity datum may be referenced in the comment by any of many possible initials. Therefore, if an identity datum contains multi-part names, the program generates all possible initials variants and searches the generated initials in comments. The initials for "John M. Smith" are shown as follows:

| Cases | Inputted Keys | Initials Variants in Comments |
|---|---|---|
| 1 | John M. Smith | J.M.S.; j.m.s.; S.M.J.; s.m.j. |
| 2 | John Smith | J.S.; j.s.; S.J.; s.j. |

Since people use initials without following strict rules, more variants may be considered. This method covers only what is known as obvious initials, but does not include the small initials such as "jo", "go", "jon", "the" and "ing".

If an identity datum is initials, the program needs to match the initials with the first letter of the names. The following shows various matches.

| Case | Inputted Key | Target Data in the Name Table |
|---|---|---|
| 1 | J.M.S; j.m.s; JMS; | Jon M. Smith; Jackson, Mark. S. J. Smith; Jackson, S. J. M. Smith; Jackson, M. S. |
| 2 | J.S.; j.s.; JS | J. Smith; Jean Sun; Jackson, S. |

Since initials may be written in different forms knowingly or by mistake, the program should generate all possible variants to match with the first letters of both first name and last name. For obvious initials, this match method generally does not cause the program to retrieve too many false hits. Accordingly, this match method may be included as an optional match method or a basic match method.

Obvious initials are the initials with separating periods or words containing two to three capital letters. If an identity datum is initials, the program searches for the initials and all possible variants in the comments. The following are various matches.

| Cases | Inputted Keys | Target Data in the Comment Field |
|---|---|---|
| 1 | J.M.S.; JMS; j.m.s | "J.M.S."; "S.M.J."; "JMS"; "SMJ"; "j.m.s." |
| 2 | J.S.; JS; j.s. | "J.S."; "S.J."; "JS"; "JS"; "j.s." |

When dots are present, search may be conducted without regarding their case. All small initials without dots are treated as special case (discussed below).

People sometimes use only two or three small initials. Those initials contain two to three small letters without separate period. They may be referred to as "non-distinctive initials", "small initials" or "2-3c small initials" in this disclosure.

| Case | Inputted Key | Target Data in Various Fields |
|---|---|---|
| 1 | jon | "jon" in first names<br>"jon" and variants in comments<br>John O. North; Jackson, O. Nick Jones, Oblin & North, LLP |
| 2 | go | "go" in first names<br>"go" and all variants in comments<br>Gina Oliver; Goldman, O<br>"Goldman Oliver, PC" |

It is difficult to tell whether small initials is a single name, a word, or initials. Some examples are "ed", "jon" or "dan" "tim" and "sam." If the first letter of an identity datum containing three small letters is of capital case (e.g., Ed, Jon), the identity datum is probably a first name.

When a person is engaged in a questionable activity, the abbreviation may be not the most obvious. Moreover, the first initial and the last initial may be transposed. Therefore, match methods should include all possible initial variants. The program has the option to generate all initial variants and use them as search keys to search the comment field and the first name field. The reason for searching small initials in the first name field is that this type of identity data may be entered in the name table as first name by mistake.

A search using small initials and variants may retrieve a large number of false hits. For example, small initials such as "the", "sch" and "ing" may appear in comments at very high frequency. The match methods using small initials are preferably implemented as switchable functions. When this feature is turned off, the program will not search the small initials in the comments. Since this word is also a single word, it may be still searched as a first name or last name, depending upon whether these two search methods are on. Duplicate search should be conducted.

An alternative measure may be taken to avoid wasteful searches and reduce the number of false hits. The program may check the identity datum against a dictionary containing all common names such as "ed", "jon" or "dan" "tim" and "sam." If it is found to be a common name, it is treated as a first name and may also be treated as initials. If it is not found in the dictionary, it is treated as initials only.

When an identity datum contains only one word, it is hard to tell whether it is a last name or a first name. The identity of the word itself cannot be determined even by using a dictionary because many words can be used as both last names and first names. In addition, many foreign names may be entered into wrong fields in the name table by mistake. Since the program is intended to find as many persons and firms as possible, the program treats a single name as both a first name and a last name and conducts the following matches.

| Cases | Inputted Keys | Target Data in the Name Fields |
|---|---|---|
| 1. | Smith | John Ed. Smith; Jackson, Smith |
| 2. | John | John Mark Stone; John, Lisa |

The single word discussed in this section could include small initials because the program cannot distinguish one from the other, but definitely exclude obvious initials such as "a.b.c." and all-capital acronyms. The program first treats a single word as a first name, searches first names, and retrieves all matched records. The program then treats the word as a last name to find all records whose last names match the word, regardless of the values in the first-name field. It is preferable to implement this match method as a switchable method.

A first-name-only match method may be applied to identity data that have multi-part names such as "John Smith." It is an inclusive match method.

| Case | Inputted Key | Target Data in the Name Fields |
|---|---|---|
| 1. | John Smith | John Ed. Stone; John Mark Black |

The reason for conducting this search is that the database may be incomplete or inaccurate. In operation, the first name, "John", is used as key to search the first name field. It ignores the last name "Smith".

A last-name-only match method may be applied to identity data that have multi-part names, and matches are found in the following cases.

| Case | Inputted Key | Target Data in the Name Fields |
|------|--------------|-------------------------------|
| 1. | John Smith | J. Smith; Jack Mark Smith; [X] Smith |

The reason for conducting this match is that the database may be incomplete or inaccurate. In operation, Smith is used to search the last name field. This search is particularly useful when there is a reason to believe that the first name in the identity datum or in the name table is incorrect. The search results may give the member a clue as to the identity datum in the name table.

In an investigation, it is often necessary to find law firm names and other company names. The match methods as follows:

| Cases | Inputted Keys | Matched Targets in Firm Name |
|-------|---------------|------------------------------|
| 1 | Smith LLP | Smith LLP |
| | | Smith and Stone LLP |
| | | Smith & Stone PC |
| 2 | Smith & Stone | Smith and Stone LLP |

Those match methods generally do not generate too many false hits. While the program uses entity mark LLP as a signal for invoking this match method, the program may ignore different entity designations such as PC, LLC, INC, and CORP. In other words, a search for Smith LLP may also find Smith PC. This rule makes the searches more inclusive and can be useful in the case where companies have changed their entity designations. The "&" sign may also be used as a signal for invoking firm name search because it is often used in law firms' names. The identity datum in case 2 may mean two persons.

Acronyms that have a least two (2) capital letters are treated as obvious acronyms. Some examples are AB, ABC, and ABCD. However, when the acronym has only two to three capital letters, it could be a person's initials and must be treated as personal initials as well. If an inputted acronym has more than four letters, it is matched with firm names or comments only. If the acronym has only two to three capital letters, it should also be treated as a person's initials, as discussed above.

| Cases | Inputted Keys | Target Data and Database Fields |
|-------|---------------|--------------------------------|
| 1 | ABCD, a.b.c.d. | "ABCD" or "a.b.c.d" in comments |
| | | Alon, Brown, Cart & Dole, LLP |
| | | "ABCD" and "a.b.c.d." in firm names |
| 2 | ABC; A.B.C.; a.b.c. | "ABC", "A.B.C.", "a.b.c" in firm names |
| | | Alon, Brown and Cart, LLP in firm names |
| 3 | AB; A.B.; a.b. | "AB", "A.B."; "a.b." in firm names |
| | | Alon Brown LLP in firm names |

Matches may include the cases involving obvious variants. Cases 2 and 3 are related to the match methods involving name initials, and the program should avoid conducting duplicate searches.

An extended search for company names may be necessary for string like "Smith and Stone." This string may mean a company name or a firm name. It may also mean two persons. Therefore, searches using one of the names that are connected by "and" may retrieve false records, therefore, the match method is implemented as an optional feature that can be turned off.

| Cases | Input Keys | Matched Targets |
|-------|-----------|-----------------|
| 1 | Smith and Stone | Smith and White LLP |
| | | Black and Stone LLC |
| 2 | Smith & Stone | Smith and White PC |
| | | Black and Stone LLP |

The match method is invoked if the identity data have an "&" or "and" mark. A target is found if a firm name contains any of the two words.

A single word and firm name match method is implemented as an optional feature that can be turned off.

| Case | Input Key | Matched Targets in Firm Names |
|------|-----------|-------------------------------|
| 1 | Smith | Smith, Green & Stone LLP |
| | | Smith LLP |

The program invokes the match method if the inputted identity data is a single word. A target is found if the firm name contains the word. It is useful when the identity datum is only one word. The system may return a list of firm names for the member to study.

Among all match methods discussed above, the first three method and the acronym match methods are considered nearly perfect matches even though they can return false results. Some methods are considered as reliable match while others are considered as inclusive match.

Searches using inputted initials ("J.M.S") are different from searches using initials ("J.M.S") derived from an inputted multi-part name such as "John M. Smith". The inputted initials and variants are matched with the first letters of names. The initials derived from multi-part name such as "John M. Smith" should not be matched with the first letters of names such as "Jack M. Springs" because they cannot be the same person.

The core investigative identity data search algorithm is developed as a server program in Java class that accepts identity data and search settings as the user's directives. The program uses a JSP search page for submitting search data and search settings and uses a JSP page to present search result. The user enters source data in a search box, configures search settings on the search page and submits the page to a Java servlet program where the source data and setting values are retrieved and processed. The servlet program then conducts necessary pre-processing for the source data. After the source data are broken up to form plural identity data, the servlet program calls a core algorithm for conducting all searches by a statement like List searchRes= searchclass.search(email, first_name, last_name, middle_name, type, mark_word, search_methods, order). String email[ ][ ], first_name[ ][ ], last_name[ ][ ], middle_name[ ][ ] are all two dimensional strings because they hold two dimensional identity data. Two dimensions arise because the source data have plural mark words and plural identity data associated with each of the mark words. String mark_word[ ] contains all mark words; String type contains a composite flag in the form of "1, 2, 3, 4" respectively for party's attorney, client employees, opposing attorneys, and other parties; String search_methods contains plural delimited flags for selected match methods (e.g., "fg1, fg2, fg3, fg4, fg5", each of flags is for a match method); and String order contains a flag consistent with one of several possible display orders.

The core program conducts all searches and returns found records to the servlet program. The servlet program separates the identity data into two groups: those having found records and those having no matched records. It finally assigns identity data having found records to a designated variable, assigns the identity data having unmatched records to a designated variable, and assigns the values of the search settings to designated variables by using a series of setAttribute statements. Finally, the servlet program makes a call to the JSP page for displaying search results. The field values (i.e., all mark words) are passed onto the result page because they are used in tracking the origins of the identity data on the result page (See FIG. 13C). If the source data are from email, they are used to indicate the email address fields where the identity data are from. The details of the found names are shown in table body 237. "Order" is passed to the result page because it is used in the drop-down menu for changing the display order.

In one of the preferred implementations, the address fields (i.e., the mark words such as "from," "to," and "cc" for identification of type of addresses) in documents and number position of each identity datum within each of the address fields is tracked in the search algorithm so that the address type and the number position can be shown for each of the identity data on the result page (FIG. 13C).

The core algorithm can be placed in the servlet program or can be written as two or more separated modules. The servlet program and the core program can even be embedded on a JPS page. A preferred code structure is to separate core algorithm from the servlet program. After the servlet program retrieves the source data and processes the setting values, it passes the preprocessed identity data and the values of search settings to the core program for conducting searches, and the core algorithm returns search results to the servlet program. Upon getting the search result, the servlet program assigns the result data and setting values to designated variables by using a series of setAttribute statements, and makes a call to the JSP result page for showing the search result.

All of the search settings may be implemented by a conventional coding method: using one tiny integer or char for each of the features as discussed above. Any optional feature can be turned on or off by setting the value of the associated flag. Plural string flags may be implemented as a string flag such as "000000000". Each of the digits may have "0" or "1" values respectively for an on and off signal.

Each of the digits signals the program if its associated feature is on or off. For example, the digits of the flag-string may be correspondent to (1) email match, full name match, and long acronym match, (2) last name and first initial match, (3) multi-part names-and-comment match, (4) obvious initials and names' first letters match, (5) obvious initials and comment match, (6) small initials and first name match, (7) small initials and first and last initial match, (8) small initials and comment match, (9) single key and first name match, (10) single key and last name match, (11) last name and last name match, (12) first name and first name match, (13) firm name full match, (14) single key and firm name match, and (15) firm name's extended match. Some of the digits may be shared. For example, the third digit may control one or more matches for small initials. When this program is implemented as an Internet application, the member can turn the features on and off by using the check box on a web page. The values are written into the digits assigned to the features.

All of the common match methods are shown in the following summary:

| Cases | Identity Data | (B/S) | Common Match Methods |
|---|---|---|---|
| 1 | email address | B | (1) email address in the email field |
|   |   | B | (2) fall-back search in comments |
| 2 | Smith, John M | B | (1) full names in the name fields |
|   |   | B | (2) names in comments (V) |
|   |   | S | (3) initials in comments (V) |
|   |   | S | (4) first name only |
|   |   | S | (5) last name only |
| 3 | Smith, J. | B | (1) last name plus initial |
|   |   | B | (2) names in comments (V) |
|   |   | S | (3) initials in comments (V) |
|   |   | S | (4) last name only |
|   |   | S | (5) first name only (Excessive hits) |
| 4 | S.M.J.; SMJ (s.m.j.) | B | (1) first letters in names (V) |
|   |   | S | (2) initials in comments (V) |
|   |   | S | (3) initials in firm names (V) |
|   |   | A | (4) "Smith, Marc & Jones, LLP" (V entities) |
| 5 | S.J.; SJ; s.j. | B | (1) first letters in names (V) |
|   |   | S | (2) initials in comments (V) |
|   |   | S | (3) initials in firm names (V) |
|   |   | A | (4) "Smith & Jones LLP" (V entities) |
| 6 | jo or jon (Small case) | S | (1) "jo" or "jon" in first names |
|   |   | S | (2) "jo" or "jon" in comments |
|   |   | S | (3) "John O. North" (V) |
|   |   | A | (4) "Jones, Oblin & North, LLP" (V entities) |
| 7 | Smith | S | (1) "Smith" in first names |
|   |   | S | (2) "Smith" in last names |
|   |   | S | (3) "Smith" in firm names |
|   |   | S | (4) "Smith" in comments |
| 8 | Smith LLP | B | (1) "Smith PC" (V entities) |
|   |   | S | (2) "Smith and Stars, PC" (Extended) |
| 9 | ABCD; A.B.C.D. (>3 chars) | B | (1) "ABCD", "A.B.C.D." in firm names |
|   |   | B | (2) "a.b.c.d."; "A.B.C.D." in comments |
|   |   | A | (3) "Allen, Brow, Calvert, & Doles" (V) |
| 10 | Smith and Stone (Smith & Stone) | S | (1) "Smith and Stone" (V entities) |
|   |   | S | (2) "Smith and Stone, PC" (V entities) |
|   |   | S | (3) "Smith & Black, LLP" (V entities) |
|   |   | S | (4) As two identity data: Smith; Stone |
| 11 | Smith J and Car | N | As two identity data: Smith J; Car |
| 12 | Smith and x.y.x | N | As two identity data: Smith; x.y.z. |
| 13 | Smith, Bo & Tu | N | (1) as three identity data |
|   |   |   | (2) "Smith, Bo & Tu LLP" (V entities) |

In this table, "B" means basic match methods that are used in the system's default search methods; "S" means switchable functions; and "V" means that the match includes common variants that can be generated from the inputted identity datum. Some entity variants arise from entity designations such as LLP, LLC, INC, CORP, CO, and PC. "A" means that the search requires a special algorithm for searching firm names by initials.

It is straightforward to identify those identity data. Acronyms are capital letters with or without dots. Those with 2 to 3 letters can be used as human names and firm names. Email address is unique because it contains "@" and ".XYZ". For cases 4, 5, 6 and 9, the program needs to count letters. If a single word contains only 2-3 small letters, it may be a word or casual initials. If a single word has more than 3 letters, the word is treated as case 9. It is preferable to conduct match analysis for cases 10 to 13 before the program conducts other searches. Capital initials of more than 1 letters with or without separator period are often used as short names for law firms. Those matches are implemented as switchable functions.

The core program has many options for controlling search methods and the name table is configurable. Therefore, additional measures are necessary to ensure that searches are conducted as expected and the program will not hang due to a missing or wrong field name. A test file containing a list of names is used to conduct test searches against a long list of names in the name table to ensure that the program functions properly.

To avoid possible mishap from manager's mistake, it is also important to propose a convention for naming fields for the name table. In a typical name table, common fields include first name, last name, middle name, company, email address and comment. A simple rule is that all common fields are named by a single word in singular form or two single words connected by "_". The manager is required to know this rule before the manager can configure and modify the name table. Failure to follow this rule could make some search methods inoperable.

The program contains code for determining if certain target fields exist in the name table. For example, the program can determine if an email address field ("email" or "email_address") exists. If it does, the program searches email addresses in the email address field. If it does not, the program uses the comment field ("comment" or "note") as an alternative search target. The program can also detect the middle name field by looking for "middle" or "middle_name" in the name table. If a middle name field exists, the program searches middle names in the middle name field. Otherwise, the program ignores middle names with the assumption that all middle names in the key match the middle names in the name table. If the program determines that the type field doses not exist in the name table, matches are determined without regarding type value. This rule is applicable to all other fields used in this algorithm.

The program generates all possible name variants, initial variants, constructs a series of SQL statements for conducting searches according to the switches.

Initials variants and name variants in the comment field are the main reasons for using their variants as search keys. Ideally, if the database is constructed with a rule to eliminate all variants, the searches can be done more efficiently. All functions for generating initials variants are implemented as a single switchable feature. Unfortunately, a good rule for eliminating variants is not a sure solution because the confusion and uncertainty often come from the source data. This can be seen from the following examples.

If an identity datum is "J.M.S.," the letters are respectively for first name, middle name and last name, but could be in a wrong order. Second, project members may enter data without obeying the rule. For example, if a member copies a statement mentioning initials from a document and pastes it in the comment, the member may be unable to decipher the precise meanings of the initials at the time of entering the name. Third, foreign names may be written in the order inconsistent with English convention. Finally, an identity datum in the source data may be intended to confuse readers outside the communication cycle. If an identity datum is "jzs," where the first and last initials have been transposed, a search using "szj" could get the real person "Sam Z. Jackson."

In the alternative, a different rule may be placed by which a member is required to add possible variants next to the names or initials if the member is not sure of their meanings or format. For example, the rule may require that the member add a standard initials next to the casual initials: "The contact's code name is xyz (X.Y.Z.)." Thus, a search using "xyz" can be avoided here. Any member can retrieve this record by using the standard initials. The danger from not searching xyz is that if the member forgets to add the standard initials, all other members will not be able to find the record. The original identity data may be confusing, incorrect, incomplete or misleading.

The search process after the segment has been broken up is shown in FIG. 13F.

First, the program checks if the identity data has email address at Step 401. If it finds a good email address, the program gets the email address and uses it to conduct a search at the email field at Step 402. If a match is found, the record is retrieved. The program checks if a name component is left at Step 403. If yes, the name component is forwarded to Step 404 for identity data analysis. If the program finds no email address at Step 401, the program directly forward the identity data to the optional Step 404. At Step 404, the program looks for "and" and "&". If it finds one at Step 404, the program splits it as two words at Step 426 and conducts extended firm search at Step 428. If the program finds neither "and" nor "&" at Step 404, it then determines if the data contain two or more words at Step 405. If the program determines that the identity datum contains only one word at Step 405, the program determines if the datum is obvious or distinctive initials at Step 412. Obvious initials are 2-3 letters with solid periods or capital initials. If the identity datum is not obvious initials, the program determines if the identity datum is 2-3 small initials at Step 416. If the identity datum is not 2-3 small initials, it is treated as a single word. If the program finds that the datum contains two to three names at Step 405, the program gets first name, middle name, and last names and copies them into designated variables at Step 406. The program then conducts a search using first name and last name according to the match criteria at Step 407. The program also uses the identity datum to extract initials and generates initials variants at Step 408 and searches for all initials in the comments at Step 409. Like in Steps 408 and 409, the program also generates common name variants and searches them in the comments, or search the comment field using first name and last name as two independent keys. If the identity datum is of two names and if the small initial search is on at Step 410, the program also searches for small 2-3 initials on all comments at Step 411.

If the program finds that the identity datum is distinctive initials at Step 412, the program generates all possible initials variants at Step 413. It then searches for the names that could have the initials at Step 414 and finds all initials in comments or other initials fields at Step 415.

If the program finds that the identity datum is 2-3 small initials at Step 416, the program determines if the small initials search is on at Step 420. If it is on at Step 417, the program uses the 2-3 small initials to search comments and optional first name field. This identity datum is passed to Step 419 for further searches.

If the program finds that the identity datum is not 2-3 small initials at Step 416. The program determines if the option for search single key is on at Step 419. If the option is on, the program treats the key as a last name and uses it to search last names at Step 421; and then treats it as a first name and uses it to search first names at Step 423.

Optionally, one more step may be added for recognizing acronyms that contain more than 3 capital letters (not shown in the FIG). If the program finds it, a search is done to find the acronym in firm names and comments.

The steps of recognizing identity data at Steps 405, 412, and 416 (and the optional step of identifying a long acronym) may take place in any order. The objective of the program in those steps is to determine if the identity datum is a multi-part name, obvious initials, a long acronym, 2-3 small initials, or an ordinary name.

By using user-selected features, the program construct SQL statement. In order to keep track of the location of each of the identity data in the address field, one SQL statement is constructed dynamically for each of the identity data. However, when the same identity datum is also used for firm name search, additional SQL statement is required. After the SQL statement is constructed and run, the server returns a result page showing all records that actually match the identity data according to the selected match methods.

The program displays only the records for the types of people the user wants to see. The name table may contain data records for various types of parties. In this embodiment, the name table contains attorney names, client's employee names, client's partner names, and other parties names, the search page allows the user to determine which of those classes of people should appear in the search result. If the user selects only law firm, the program shows only attorney names in the result. Optionally, all records that are printed on a result table may be displayed in different background colors according to their types so that the user can instantly tell their types. One color scheme might be that blue for law firm, pink for client, yellow for partners, and gray for third parties, and an identity datum may be associated with several types (e.g., "Firm"), as shown in FIG. 13C.

The identity data found by the program can be displayed in one of several orders, which are shown in the setup page (FIG. 13B). In one version of the preferred embodiment, the identity data from the data source are shown in the first three columns (Block 236): full name, address fields, and their appearance order within the address field (FIG. 13C). "Fields" mean start marks for the search ranges. In this example, fields mean address fields such as "from" and "to." In the first column on the result page, the identity data are from the identity data in the input box. The number is the appearance order number of the identity data in the search range or the address field. When there are plural identical fields, some identity data could have same order number.

For each of the identity data, the program shows a list of found identity data (Block 237 in FIG. 13C) according to the order the user has chosen in the search settings (FIG. 13B). There are several sorting schemes available on the drop-down menu. The found identity data may be first sorted by firm name, then by email address, and then by last name in alphabetic order. The order will be changed upon selecting and releasing a selection.

On the top of the table shown in FIG. 13C (outside the FIG), there are four links: "Show names not found," "Hide names not matched," "Show matched names" and "Hide matched names." )Block 239 in FIG. 13D) Upon clicking "Show names not found," the browser shows those names that are not found in the name table (FIG. 13D). Those names may be embedded on the web page.

In an investigative environment, it is necessary to adjust search settings from time to time, depending upon source data, project task, the structure of the name table, and the characters of the data in the name table. The search may be conducted with different mark words for search ranges, different mark words for ignored ranges, and different ignored words. Also, it is desirable to change the scope of searches from time to time. Therefore, it is desirable to have the ability to setup search configuration. In one version of the present embodiment, there are three methods for setting up configurations.

(1) Program level configuration. The settings for system's configuration are written into the program, or saved as a program property file or database record that cannot be easily altered by users. It is the most robust configuration that is available for testing the system.

(2) User level configuration. The user-level configuration can be set by the user and permanently saved in the record for the user. One such record is saved in a database table for each of the users. The user can retrieve, change and save the settings when the user logs in the account. The same configuration will be available next time the user logs in the account.

On the setup page, which can be opened from the search page, the user can revert this configuration to the system's configuration by clicking "Revert to Prevalent Configuration."

(3) User's current search configuration. This is a search configuration, which can be set and used by the user any time by clicking the box preceding the option. The search settings are persistent throughout the login session. The values of the settings are not written to the data record. The settings are sent to the server each time when the user submits a search. If the user logs out and restarts the server, the values of the settings will come from the program level configuration.

The search page has one submission button, which may be used to submit with default search or current search, depending on whether Default Search or Current Search is selected (FIG. 13A). When Current Search is selected and the settings can be opened by clicking the View button, the user can quickly make adjustments to the search settings and press the Submit button. The page for setting up current settings is identical to the page for setting up default search shown in FIG. 13B. If the user needs to change search settings frequently, the user can use the current search method. The user can quickly adjust the settings on the search setting page and submit the page with source data to conduct a search.

The search page has a link, which is for showing a list of identity data that are not found in the name table. On the page showing unmatched identity data, the user may select any of them to be added into the name table. Upon selecting the box for an identity datum, (similar to the check box in FIG. 14D), the user then clicks the "Add Name to Table" button, the server responds with a page with multi-part names filled in the input boxes for names and with additional input boxes for accepting information. Upon filling the form, the user submits the page to the server to have the identity datum written into the name table. It is desirable to have the ability to pop up plural pages for adding plural names to the name table. The user just fills in missing information for each of the pop-up forms and submits each of the forms to the server to have the identity data added to the name table.

G. Identity Data Search, Sorting, and Duplicate Elimination

An identity data processing algorithm ("IDPA") may be used to process identity data lists. When a document containing privileged information has been circulated to many staff members, the identities of those who have access to the document must be identified in a privilege log so that the opposing party can ascertain whether the privilege claim is proper. It is very time-consuming to process email messages because they are often sent to many staff members. The identities of original senders, recipients, and cc recipients must be entered in the privilege log. In addition, the identities of those who later read the document are required to appear in the privilege log.

Law firms like to write identity data in different ways. One possible practice is that the identity data of all people are listed in one single field. The other practice is that the identity data of the original recipients and sender are listed in individual fields while all later recipients are listed in another field. In addition, identity data may be listed in an order of preference such as alphabetic order and the appearance order in the original document. Finally, law firms may use different formats for the identity data in the privilege log.

The above algorithm can be used to perform those functions. The Identity Data Processing Algorithm used in the present invention has a data input page (FIG. 14A) which contains two large input boxes: the bottom box 431 ("Group B") is for accepting identity data from a privileged document, and the top box 430 ("Group A") is for accepting identity data that are of subsequent recipients, including readers, recipients and cc recipients.

The user interface page has setup features similar to those for the investigative identity data search page. It has two processing modes: current processing mode and default processing mode. Default processing mode uses the settings saved in a database table while current processing mode uses the current settings that are sent to the server each time of processing name lists. Its current setup page is shown in FIG. 14B while the default setup page is identical to the current setup page except that default settings can be saved on the server and retrieved from the server. The format for group B has two options: output identity data grouped according to their statuses such as sender, recipients and cc recipients as shown in FIG. 14C or in a pooled group. The member can also decide how the identity data are sorted within each of the groups or subgroups.

In FIG. 14C, all output identity data are displayed in the option: first name in alphabetic order. However, if the member opens the drop-down menu 434, it has four options: first name in alphabetic order, first name in reverse alphabetic order, last name in alphabetic order and last name in reverse alphabetic order. The display order will be changed after selecting a new order and releasing the mouse on the new option.

There are four submission buttons 432 right below the data entry box for Group B (FIG. 14C), which allow the member to reuse the processing page. The user can clear up the source data from the Group A box or the Group B box by clicking one of the first two buttons, or clear all data by clicking the "Clear All" button. After the user fills new source data into one or two boxes, and clicks the Submit button, the source data are processed according to the settings that have been selected by the user, and results are displayed in one or two output boxes 433, 435 in an updated page.

This program also includes a call to a program that is substantially identical to the identity data search algorithm to find all the identity data that match at least one entry in the name table. Those identity data are marked with "Esq.*" next to the last name (Block 433 in FIG. 14C). Some examples are G. M. Homes, Esq* and Jack Smith, Esq.*. The mark along does not ensure that they are definite matches, but are possible matches. All the identity data without such a mark cannot have a match in the name table. Thus, the member does not have to examine all identity data to determine if they are attorneys. If the name table contains complete attorney names, the only thing the member needs to do is to remove the mark for those identity data that are really not of attorneys.

Since the name table contains attorneys, client's employees, business partners, and other parties, the program may be used to find identity data that belong to a specific type. If the purpose of using this algorithm is to find party's attorneys, the user can exclude all identity data of other types by checking only the law firm type under the search scope in FIG. 14B for output. The identity data search algorithm actually marks different types of parties in different colors, and it is easy to indicate their types, for example, by "Esq.*", "Clt.*", "Ptn.*", and "Trd.*".

Like the investigative identity data search algorithm's web module, this web module also allows the member to repeat processing operations. Each time, source data and setting values are sent to the server where their values are retrieved and source data are processed. The server returns the results in two output boxes with or without the original source data in the two original input boxes and with all necessary setting values on the page so that the user can change source data and repeat the same processing operation (FIG. 14E). The system may be implemented so that the user can fill source data conveniently.

The result page in FIG. 14C contains two links: Show names in a table format below each of the two result boxes. When the user clicks the link below the output box for Group B, the page shows a list of identity data in a table view where the member can select any of them for deletion (FIG. 14D). After one or more entries have been deleted from the table, the member can cause the server to hide the table again, and display the output box that no longer shows the deleted identity data. The member can copy the processed identity data from Group B (Sorted Names from Group B in FIG. 14C), respectively, to the input boxes for author, recipients and cc fields on the data entry form for a privilege log, and copy the identity data from Group A to the input box for a designated field on the data entry form for the privilege log.

On the page for showing sorted identity data (FIG. 14D), an additional button, "Add New Name", is placed for adding a selected identity datum to the name table. This function has also been added to the name search function (FIG. 13D) in the latest version of the embodiment (Not shown in all figures). In each case, the user selects an entry and clicks this button, the browser opens a page like the data entry page for the name table except that relevant fields have been filled by first name, last name, middle name, and email address if they are available. After the user fills in data in the remaining input boxes, the page is submitted to the server to have the data saved.

Additional features may be added to the setup page so that the member can have an option to pool all identity data in the output. However, there is a simple workaround for pooling identity data together. The user can input all source data into only one single box, and the output will be in one of the corresponding boxes.

H. Integrated Discovery Methods

Discovery is an extremely time-consuming and difficult process. Most of the times, software cannot successfully replace human intelligence because it is impossible to conceive all possible factors and parameters concerning litigation. Accordingly, it is preferred to develop a method that is highly adaptable.

There are more than a dozen discovery platforms commercially available and can be found on the Internet. Regardless of their brands, they are able to deliver documents to the user's terminal for review. Generally, all of them use HTML files, which allow the reviewers to copy any part of text from the Browser. Some systems use PDF file format that also allows users to copy data. If a document is displayed in images such TIFF or other formats, it is impossible to copy text from the image. In this case, the user must type information into an interface form of this system for submission.

In document review, the reviewer is asked to determine whether the document is responsive to any of the specified classes of documents or specifications. If the reviewer encounters a transaction, a person of interest, a product in litigation, or any other critical document, the reviewer may copy the information and paste it on the server pad. The reviewer can periodically update the server pad while adding more and more information. The reviewer can use the pad to find information by interactive search and conventional search.

If the reviewer believes that a particular piece of information is important to all reviewers on the project, the reviewer may input the information to a project-wide table. If the reviewer encounters the name of an attorney who is a counsel of the party, the reviewer may add the name to the name table by copying and pasting it in the input box for the name table and having the page submitted to the server.

The most efficient way of using this discovery information management system is to integrate a review platform with this system into one so that data transfer between the document from the review platform, and all tables on this system is fast and reliable. In an alternative, the review platform may be modified to have a page, which can get relevant data for background submission. The page is submitted to the address of this system for processing. The server sends responsive data foreground or background. In this arrangement, access privilege cannot be handled by using session objects. The data security must be maintained by using a private network connection and password verification.

The second method, which is a workaround method, is to use the right click menu of the browser. On the browser that supports right-click menu, when a user selects and activates some text on the browser and clicks the right button on the mouse, the browser displays a few drop-down menu items, which may include Copy and Property. Some commercial web pages may include a menu for conducting a Google search using selected text. More functions can be added to this menu list. For example, it is desirable to add a menu item "Add Attorney Name." Upon selection of an identity datum and clicking this new menu item, the browser calls with the data as a parameter to this system, which opens a page for adding the identity datum into the name table with the data pre-filled. The concept for this method is shown in the illustration in FIG. 17 for document log. After the user fills more data into the input boxes on the web form, the user can manually submit the form to the server to have the data saved. The system may briefly interrupt the browser for document review. It is preferable to select and send data by a single data block. The server program that accepts the data breaks up the source data so that each of the data components can be correctly written into the database table.

The third method is to use a menu embedded on the review platform's browser for direct submission. A JavaScript function gets user-selected data, uses the data and site address including program name as parameters to construct a URL to call a server program on this system. The server receiving the data processes the data without return message, or preferably with a returning status message without interrupting the review browser. In this case, the processing server must accept public clients with session object disabled. To maintain data security, the server may be run in a secured private network and password verification may be used.

The last method is to use the copy and paste method to transfer data from the review platform to the browser for this system. When an interesting datum is encountered, the datum is copied into the input boxes on a form, which is then submitted to the server of this system. If the source data contain plural identity data, the data may be submitted as one single data block. The server program that accepts the data breaks up the source data and processes them so that each of the data components can be correctly written into the database table. For maximum flexibility, the submission page should have a parameter to indicate the nature of the source data. The receiving program thus knows the source data and processes them by a method consisting with the source data.

For most discovery projects, one of the common tasks to construct a production log containing a list of documents responsive to a discovery request. Each of the fields in the production log may take certain information. For example, the field for document types may accept only about 10 type values such as email, letter, press release, spreadsheet, contract, governmental filing, and court pleadings. In this case, the data source for selection may be a fixed source. An interactive feed of all document types in the selection box can dramatically improve data entry speed. In comparison, the number of transactions for a transaction table may be very large. In this case, the interactive data source should be one or more database fields.

The system offers the flexibility to link a data input box for any field of a table to a data source. The data source for the author name in a production log may be the first name field and the last name field of the name table. The data source may be even the destination field to which data are entered. By using such an arrangement, previously entered data can be shared in later data entry. After a reviewer A resolves a name identity and enters it into the name table, reviewer A can use it again later. Reviewer B can also retrieve it and use it in building another log such as a hot document log. Any data in any table can be used by the same reviewer at two different stages, shared by different reviewers in building the same table, and shared by reviewers in building different tables. It is also clear that dynamically configurable ability can further increase the value of the system.

Similarly, the reviewer may be asked to produce information such as general subject matter or specific subject matter for a document. This information may directly sent into the relevant field of the production log, hot document log, or privilege document log. Such data are then used to generate a description automatically by one of the construction methods according to a language pattern provided by law firms. By using the method, the description for the description field can be generated automatically.

In most document review systems, the most serious problem is the limited space available for reviewers. The user may have only a small fraction of working space on computer display. Space utilization rate may be improved by properly designing the review platform.

The alternative solution is to use two-monitor display system. Currently, a large number of video display cards commercially available support twin-view display mode on both Windows and Linux systems. All NVIDIA series 5 to 9 video cards with the unified drivers support twin-view mode. After a proper card and a suitable driver are installed, it is easy to configure a twin-view mode. Two monitors can be arranged in different ways. The primary monitor displays the browser showing the document under review while the secondary monitor shows the browser of this system. When such a twin-view display system is used, the reviewer can pick up all information from a browser on one display and fill it in any of opened web forms placed on another display for submission. The user can also retrieve information by using the global search function.

The database tables in this disclosure serve as examples. Many different structures can be used to achieve the same objective. While the concept is implemented in Java and JSP in this disclosure, it can be implemented in other development environments such in Java EE, PHP, and service-oriented architecture ("SOA"). While the system is deployed in Fedora Core 5 to 8, they can run in Window XP, Windows Server, Solaris, Mac Operating System, and any of other Linux Operating Systems. Many programming languages may be used to implement the concept and its functions. For example, CGI C programs and apache HTTP can be used to implement the concept.

The system may be built to host a limited number of discovery projects. To show the concept of this invention, virtually any of the leading commercial database applications may be used to achieve the same objectives.

In those exemplary embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A system for collecting, storing and distributing information among plural users, the system comprising:
   a server having a network interface and being connected to a network or the Internet;
   at least one client computer being connected to the server, the client computer being used by a user;
   means for setting up a project with a project name;
   means for creating and modifying user accounts for a plurality of users for the project;
   means for tracking configurable database tables under a database application using a data table, said data table containing a data entry containing table name or navigation name, and a unique number or string for each of the configurable database tables;
   means for configuring at least one database table for the project by creating one or more database tables, deleting one or more database tables, overwriting one or more database tables, changing and/or the table structures of one or more database tables, and making all data entries in the data table consistent with the database tables under the database application;
   means for creating a navigation bar using navigation names or table names from the data entries of the data table for at least one database table;
   means for submitting information from client computer to the server for storage in any of the at least one database table; and
   means for retrieving information from any of the at least one database table and sending the retrieved information to the client computer for display,
   wherein one of the buttons of the navigation bar is for accessing the retrieving means, and at least one button on a web page associating with any of the at least one database table is for accessing the submitting means.

2. The system of claim 1, further comprising means for setting up a data source for a destination field of the at least one database table or means for uploading a file containing properly delimited data into a data source setup table, and means for supporting interactive data entry in an input box for the destination field.

3. The system of claim 2 further comprising means for constructing a phrase by combining plural user-selected data pieces in plural interactive input boxes or by combining a plurality of data pieces that have been selected in an interactive search box on a web page.

4. The system of claim 1 wherein the means for configuring database tables comprises means for uploading a configuration file containing table names and table structures to overwrite all of the at least one database table or specified database tables for the project or means for deleting existing database tables, creating new database tables, and modifying database tables for storing data.

5. The system of claim 4 further comprising means for exporting project data in a compressed file and means for uploading a compressed project file for rendering.

6. The system of claim 5 wherein each of the at least one database table has at least one correspondent web page, which is embedded with tools for searching, sorting and page number navigating.

7. The system of claim 5, further comprising means for posting web messages on a discussion board, sending web messages to the client computers, and displaying web messages on the discussion board, or means for exchanging email between the users.

8. The system of claim 1, further comprising means for setting up data validation table, means for setting up data validation method for each of the at least one database table, and means for validating data records on the validation table.

9. The system of claim 8 wherein the data validation table is a web table containing tentative records wherein tentative records are validated by selecting tentative records and submitting the web table to the server.

10. The system of claim 9 further comprising means for changing data access rule.

11. The system of claim 1 wherein at least one web page for the at least one database table is embedded with a global search button for opening a global search page.

12. The system of claim 11, further comprising means for setting up plural manager accounts respectively for plural projects by a server administrator and means for changing account passwords by each of the managers.

13. The system of claim 12 further, comprising means for exporting project data in a compressed file and means for uploading a compressed project file for rendering.

14. The system of claim 13, further comprising means for posting web messages, searching web messages, and displaying web messages on a discussion board, or means for exchanging email between the users.

15. The system of claim 14, further comprising means for setting up guidelines for the users.

16. The system of claim 1, further comprising means for generating for each user a server pad, means for saving data entered in the server pad in a database table on the server, means for searching and retrieving data from the database table, and means for displaying retrieved data on the client computer.

17. The system of claim 16, further comprising means for interactively retrieving data from the server pad by typing one or more characters in an interactive search box and displaying retrieved data in a selection box in response to the characters that a user has typed.

18. The system of claim 1, further comprising means for searching a plurality of identity data in a name table using a search page containing a search box.

19. The system of claim 18 wherein the means for searching identity data uses a full name match method and at least one optional match method, wherein the at least one optional match method comprises matching obvious acronym with firm names and matching inputted email address with email addresses, matching 2-3 small initials with initials in comments and with first and last initials of names, matching obvious initials and their variants with the first letters of names and with the initials in comments, matching single-word key with first names and last names, and/or matching any part of multi-part name with first names, last names, and firm names.

20. The system of claim 19, wherein the means for searching identity data further comprises means for selecting types of entities to appear in search result, means for changing the display order and the format of found identity data, means for defining ignored ranges and ignored words, means for setting up current search settings and default search settings and applying a search setting, and/or means for showing identity data that are not found in the name table and adding identity data into the name table.

21. The system of claim 1, further comprising means for processing two lists of identity data respectively in two input boxes, returning two lists of processed identity data, and displaying the processed identity data in a desirable format, desirable order with duplicate eliminated within each of the two lists of the identity data.

22. The system of claim 21, further comprising means for displaying unmatched identity data in a table format on the client computer and means for deleting any of the identity data from the name table.

23. A system for collecting, storing and distributing information among plural users, the system comprising:
a server having a network interface and being connected to a network or the Internet;
at least one client computer being connected to the server, the client computer being used by a user;
means for creating user accounts for plural users;
means for generating a data validation table in support of at least one data validation method for at least one database table, wherein the at least one data validation method comprises manager validation and/or voting validation;
means for submitting data to the server for storage in the at least one database table from the users;
means for storing data the at least one database table;
means for validating data for the at least one database table, wherein the validating means comprises means for retrieving data records and displaying the data records on the data validation table, marking the data records to be validated submitting the data validation table to the server, identifying the marked data records, and changing the data validation statuses of the marked data records; and
means for sending data from at least one database tables to the client computer.

24. The system of claim 23, further comprising means for setting up a data source for a destination field of one of the at least one database table and means for generating interactive data entry form containing at least one interactive input box, conducting an interactive search in the data source in response to the typing of each character, retrieving responsive data, sending the retrieved data to the client computer for selection by the user on the client computer, and repeating the interactive search by entering additional characters.

25. The system of claim 24, further comprising means for uploading a file containing properly delimited data into the server and being written in a data source setup table.

26. The system of claim 23, further comprising means for changing data access rule for any of the at least one database table.

27. The system of claim 26 further comprising means for constructing a phrase by combining plural user-selected data pieces in plural interactive input boxes or by combining a plurality of data pieces that have been selected in an interactive search box.

28. The system of claim 23 further comprising means for generating for each user a server pad, to save data entered on the server pad in a database table, searching and retrieving data from the database table, the and displaying the retrieved data on the client computer.

29. The system of claim 23 wherein one of the at least one database table is a name table containing first name, last name, firm name, entity type, and comment fields, the system further comprising means for conducting identity data search in the name table by using a search page containing an input box.

30. The system of claim 29, wherein the means for conducting identity data search uses at least one match method, wherein the at least one match method comprises matching two to three letters initials with initials in comments, matching obvious name initials and their variants with the first letters of names and with the initials in comments, matching single words with first names and last names, matching any of the multi-part names with first names and last names, and/or matching an obvious acronym with firm names.

31. The system of claim 30, further comprising means selected from the group consisting of means for selecting types of entities appearing in the search result, means for changing the display order of found identity data, means for displaying identity data that are not found, means for setting up and saving default search settings and current search settings and selecting a search setting, means for conducting a new search by providing new identity data in the input box and submitting the page, means for deleting any of the unmatched identity data a search result page, and means for writing identity data in the name table.

32. The system of claim 23, further comprising means for processing two lists of identity data respectively in two input boxes and means for displaying the processed identity data from each of the two input boxes according to a selected order, selected format, without duplicates between the two lists of processed identity data.

33. The system of claim 32 further comprising means for setting up processing ranges, delimiter, output format, and output order.

34. A method for collecting, storing and distributing information among plural users on a server-and-clients system, the method comprising the steps of:
creating user accounts for plural users;
designating a project with a project name;
configuring at least one database table within a project life or between two project life cycles, for the storage of information to be collected, stored, and distributed, by uploading and executing a configuration file or an exported project file containing table names and table structures, wherein the step of executing the configuration file or the exported project file containing table names and table structures further comprises overwriting database tables, deleting database tables, creating new database tables, and/or modifying database tables;
creating a navigation bar including a navigation button for each of the at least one database table which has been configured;
submitting information to the server for storage in any of the at least one database table;
retrieving information from any of the at least one database tables and sending the retrieved information to the client computers of the users; and
displaying the retrieved information on the client computers.

35. The method of claim 34, further comprising the steps of setting up a data source for a destination field of one of the at least one database table, generating a data entry form for the database table, conducting interactive search in the data source upon the typing of each character, retrieving responsive data, sending the retrieved data to the client computer, and presenting the retreived data to the user for selection.

36. The method of claim 34, further comprising the steps of constructing and saving a phrase by combining data pieces that a user selected in plural interactive input boxes and/or by combining a plurality of data pieces that the user has selected in an interactive search box on a web page.

37. The method of claim 34 further comprising the steps of searching any of the at least one database table, finding data records, sorting found data records, and displaying the found data records on a web page.

38. The method of claim 34, further comprising the steps of setting up a data validation table, selecting a data validation method for the at least one database table, and validating data records on the validation table, wherein the validating step further comprises retrieving data records and displaying the data records on the data validation table, marking the data records to be validated, submitting the data validation table to the server, identifying the marked data records, and changing the data validation statuses of the marked data records.

39. The method of claim 38 wherein the data validation table is a table containing tentative records or a table containing both validated records and tentative records, and the data validation method is either manager validation method or voting validation method.

40. The method of claim 34, further comprising the steps of selecting private edit or public edit for data access rule for one of the at least one database table.

41. The method of claim 34, further comprising the steps of searching all database tables, retrieving data from all the database tables, arranging the retrieved data according to use-designated order on the web page, sending the web page to a client computer, and displaying the web page on the client computer.

42. The method of claim 34, further comprising the steps of exporting project data in a compressed file and uploading a compressed project file for rendering.

43. The method of claim 34, further comprising steps of writing a web message on a discussion board, submitting the web message to the server, saving the web message on the server, sending the message together with other messages to the client computers, and displaying the web message and other messages on the client computers.

44. The method of claim 34, further comprising the steps of generating for each user a server pad, saving the data entered in the server pad in a database table on the server, searching and retrieving data from the pad database table interactively, and displaying the retrieved data on the server pad.

* * * * *